(12) United States Patent
Langen

(10) Patent No.: US 12,486,112 B2
(45) Date of Patent: Dec. 2, 2025

(54) WAREHOUSE SYSTEM FOR FULFILLING ORDERS

(71) Applicant: H. J. Paul Langen, Brampton (CA)

(72) Inventor: H. J. Paul Langen, Brampton (CA)

( * ) Notice: Subject to any disclaimer, the term of this patent is extended or adjusted under 35 U.S.C. 154(b) by 0 days.

(21) Appl. No.: 17/459,936

(22) Filed: Aug. 27, 2021

(65) Prior Publication Data
US 2022/0063914 A1 Mar. 3, 2022

Related U.S. Application Data

(60) Provisional application No. 63/072,008, filed on Aug. 28, 2020.

(51) Int. Cl.
*B65G 1/137* (2006.01)
*B65G 1/04* (2006.01)

(52) U.S. Cl.
CPC ......... *B65G 1/1376* (2013.01); *B65G 1/0464* (2013.01); *B65G 1/0407* (2013.01); *B65G 2201/0267* (2013.01)

(58) Field of Classification Search
CPC .. B65G 1/1376; B65G 1/0464; B65G 1/0407; B65G 2201/0267; B65B 5/045; B65D 77/06
See application file for complete search history.

(56) References Cited

U.S. PATENT DOCUMENTS

| | | | |
|---|---|---|---|
| 1,434,230 A | 10/1922 | Shawver et al. | |
| 1,471,924 A | 10/1923 | Saylor et al. | |
| 2,786,316 A | 3/1957 | Silva et al. | |
| 2,869,297 A | 1/1959 | Neer | |
| 2,879,638 A | 3/1959 | Hill | |
| 2,900,778 A | 8/1959 | Hartbauer | |
| 2,902,810 A | 9/1959 | McGihon | |
| 3,292,813 A | * 12/1966 | Roegner | B65D 77/06 383/7 |
| 3,461,642 A | 8/1969 | Langen et al. | |
| 3,619,967 A | 11/1971 | Alduk | |
| 3,698,151 A | 10/1972 | Arneson | |
| 3,716,962 A | 2/1973 | Langen et al. | |
| 3,757,486 A | 9/1973 | Feurston et al. | |
| 3,940,907 A | 3/1976 | Ganz | |

(Continued)

FOREIGN PATENT DOCUMENTS

| | | |
|---|---|---|
| CA | 2700657 C | 11/2007 |
| CA | 2712878 C | 2/2011 |

(Continued)

OTHER PUBLICATIONS

Notice of Allowance mailed by the USPTO on May 25, 2021, in the related U.S. Appl. No. 16/444,673.

(Continued)

*Primary Examiner* — Lynn E Schwenning

(57) ABSTRACT

A warehouse system and method for fulfilling orders comprising a plurality of products. As pallets containing cases of individual units are received, they are transported to a specific storage location within a warehouse. There, a picker arm is configured to retrieve individual units from the pallets and place in a tote according to a specified order. The totes are transported through the warehouse to the specific storage locations, then sent to a packing station.

34 Claims, 56 Drawing Sheets

(56) References Cited

U.S. PATENT DOCUMENTS

| | | | |
|---|---|---|---|
| 4,010,593 A | 3/1977 | Graham | |
| 4,010,597 A | 3/1977 | Nelson | |
| 4,031,817 A | 6/1977 | Raschke | |
| 4,061,081 A | 12/1977 | Pinto et al. | |
| 4,109,444 A | 8/1978 | Lee | |
| 4,163,414 A | 8/1979 | Bachman, Jr. et al. | |
| 4,213,285 A | 7/1980 | Mancini | |
| 4,414,789 A | 11/1983 | Pattarozzi | |
| 4,553,954 A | 11/1985 | Sewell et al. | |
| 4,569,182 A | 2/1986 | Leuvering | |
| 4,823,539 A | 4/1989 | Kuckhermann et al. | |
| 4,915,678 A | 4/1990 | Morita | |
| 4,942,720 A | 7/1990 | Berney | |
| 5,024,640 A | 6/1991 | Saitoh | |
| 5,060,451 A | 10/1991 | DeMay et al. | |
| 5,061,231 A | 10/1991 | Dietrich et al. | |
| 5,105,600 A | 4/1992 | DePoint, Jr. et al. | |
| 5,106,359 A | 4/1992 | Lott | |
| 5,115,625 A | 5/1992 | Barbulesco et al. | |
| 5,145,070 A | 9/1992 | Pallett et al. | |
| 5,207,630 A | 5/1993 | Decker et al. | |
| 5,341,626 A | 8/1994 | Beckmann | |
| 5,352,178 A | 10/1994 | Pazdernik | |
| 5,393,291 A | 2/1995 | Wingerter | |
| 5,411,464 A | 5/1995 | Calvert et al. | |
| 5,440,852 A | 8/1995 | Lam | |
| 5,456,570 A | 10/1995 | Davis et al. | |
| 5,531,852 A | 7/1996 | Walsh et al. | |
| 5,624,368 A | 4/1997 | Cromwell | |
| 5,626,002 A | 5/1997 | Ford et al. | |
| 5,720,156 A | 2/1998 | Bridges et al. | |
| 5,782,064 A | 7/1998 | Beeman | |
| 5,997,458 A | 12/1999 | Guttinger et al. | |
| 6,032,853 A | 3/2000 | Chevalier | |
| 6,099,450 A | 8/2000 | Schenone et al. | |
| 6,226,965 B1 | 5/2001 | Lam | |
| 6,378,275 B1 | 4/2002 | Andersson | |
| 6,588,175 B1 | 7/2003 | Gaudenzi | |
| 6,619,907 B1 | 9/2003 | Pajot | |
| 6,688,075 B2 | 2/2004 | Cristina | |
| 6,721,762 B1 | 4/2004 | Levine et al. | |
| 6,764,436 B1 | 7/2004 | Mazurek | |
| 6,799,671 B1* | 10/2004 | Sanchez Gomez | B65G 47/766 198/349.5 |
| 6,876,958 B1 | 4/2005 | Chowdhury et al. | |
| 6,912,762 B2* | 7/2005 | Lile | B65B 69/0025 29/709 |
| 6,913,568 B2 | 7/2005 | Frank et al. | |
| 6,955,032 B2 | 10/2005 | Smith | |
| 6,968,668 B1 | 11/2005 | Dimario et al. | |
| 7,093,408 B2 | 8/2006 | Duperray et al. | |
| 7,131,941 B2 | 11/2006 | Makar et al. | |
| 7,174,698 B2 | 2/2007 | Spatafora et al. | |
| 7,243,481 B2 | 7/2007 | Draghetti | |
| 7,326,165 B2 | 2/2008 | Baclija et al. | |
| 7,404,788 B2 | 7/2008 | Monti | |
| 7,510,517 B2 | 3/2009 | Goodman | |
| 7,682,122 B2 | 3/2010 | Maynard et al. | |
| 7,720,567 B2 | 5/2010 | Doke et al. | |
| 7,788,881 B2 | 9/2010 | Johnson et al. | |
| 7,828,708 B2 | 11/2010 | Huang et al. | |
| 7,832,183 B2 | 11/2010 | Jacob et al. | |
| 7,988,406 B2 | 8/2011 | Schafer | |
| 7,991,505 B2 | 8/2011 | Lert, Jr. et al. | |
| 8,156,013 B2 | 4/2012 | Dearlove et al. | |
| 8,340,812 B1 | 12/2012 | Tian et al. | |
| 8,365,389 B2* | 2/2013 | Taylor | B65G 47/90 83/909 |
| 8,622,883 B2 | 1/2014 | Flynn | |
| 8,671,654 B2 | 3/2014 | Langen | |
| 8,961,380 B2 | 2/2015 | Langen | |
| 9,061,477 B2 | 6/2015 | Chandaria | |
| 9,090,400 B2 | 7/2015 | Wurman et al. | |
| 9,114,897 B2 | 8/2015 | Kim et al. | |
| 9,126,380 B2 | 9/2015 | Dittmer et al. | |
| 9,315,344 B1 | 4/2016 | Lehmann | |
| 9,336,509 B1 | 5/2016 | Arun Singhal et al. | |
| 9,714,145 B1 | 7/2017 | Lehmann | |
| 9,718,570 B1 | 8/2017 | Ortiz et al. | |
| 9,796,080 B2 | 10/2017 | Lindbo et al. | |
| 9,927,815 B2 | 3/2018 | Nusser et al. | |
| 9,975,699 B2 | 5/2018 | Yamashita | |
| 10,074,073 B2 | 9/2018 | Stevens et al. | |
| 10,214,353 B2* | 2/2019 | Solignac | B66C 1/28 |
| 10,233,019 B2 | 3/2019 | Lert | |
| 10,248,112 B2 | 4/2019 | Zhu et al. | |
| 10,435,241 B2 | 10/2019 | Lert et al. | |
| 10,471,597 B1* | 11/2019 | Murphy | B25J 9/1674 |
| 10,489,870 B2 | 11/2019 | Asaria et al. | |
| 10,556,713 B2* | 2/2020 | Langen | G06Q 10/08 |
| 10,576,630 B1 | 3/2020 | Diankov et al. | |
| 10,618,736 B2 | 4/2020 | Khodl et al. | |
| 10,649,445 B2 | 5/2020 | Wagner et al. | |
| 11,142,413 B2 | 10/2021 | Hoofard et al. | |
| 11,332,311 B2* | 5/2022 | Fosnight | G05D 1/247 |
| 2003/0200111 A1 | 10/2003 | Damji | |
| 2004/0112520 A1 | 6/2004 | Hanschen et al. | |
| 2004/0148911 A1 | 8/2004 | Hermodsson et al. | |
| 2004/0168408 A1 | 9/2004 | Spatafora | |
| 2005/0079966 A1 | 4/2005 | Moshier et al. | |
| 2006/0096242 A1 | 5/2006 | Makar et al. | |
| 2006/0096712 A1 | 5/2006 | Makar et al. | |
| 2006/0277269 A1 | 12/2006 | Dent et al. | |
| 2007/0038673 A1 | 2/2007 | Broussard et al. | |
| 2007/0072755 A1 | 3/2007 | Monti | |
| 2007/0197364 A1 | 8/2007 | Monti | |
| 2007/0204567 A1 | 9/2007 | Wintring et al. | |
| 2008/0067225 A1 | 3/2008 | Moore | |
| 2008/0110135 A1 | 5/2008 | Jacob et al. | |
| 2008/0141632 A1 | 6/2008 | Monti | |
| 2009/0239726 A1 | 9/2009 | Huang | |
| 2009/0277134 A1 | 11/2009 | Jacob et al. | |
| 2009/0319395 A1 | 12/2009 | Chandaria | |
| 2010/0263333 A1 | 10/2010 | Angen | |
| 2011/0111939 A1 | 5/2011 | Bassi | |
| 2011/0297559 A1 | 12/2011 | Davis | |
| 2013/0218799 A1 | 8/2013 | Lehmann et al. | |
| 2013/0247519 A1 | 9/2013 | Clark et al. | |
| 2014/0260119 A1 | 9/2014 | Baltes et al. | |
| 2015/0032252 A1 | 1/2015 | Galluzzo et al. | |
| 2015/0072847 A1 | 3/2015 | Graham et al. | |
| 2015/0072848 A1 | 3/2015 | Graham et al. | |
| 2015/0073587 A1 | 3/2015 | Vliet et al. | |
| 2015/0087491 A1 | 3/2015 | Langen | |
| 2015/0225104 A1 | 8/2015 | Reed | |
| 2015/0291295 A1 | 10/2015 | Langen | |
| 2015/0321437 A1 | 11/2015 | Lai | |
| 2015/0324893 A1 | 11/2015 | Langen | |
| 2016/0129587 A1* | 5/2016 | Lindbo | B25J 9/0096 700/218 |
| 2016/0176562 A1 | 6/2016 | Pettersson et al. | |
| 2016/0304281 A1 | 10/2016 | Elazary et al. | |
| 2017/0348939 A1 | 12/2017 | Langen | |
| 2018/0065807 A1 | 3/2018 | Lert, Jr. | |
| 2018/0086019 A1 | 3/2018 | Langen | |
| 2018/0126683 A1 | 5/2018 | Johnson et al. | |
| 2018/0150793 A1 | 5/2018 | Lert, Jr. et al. | |
| 2018/0327161 A1* | 11/2018 | Helms | B65D 75/58 |
| 2019/0135555 A1 | 5/2019 | Wagner et al. | |
| 2019/0152703 A1 | 5/2019 | Sellner et al. | |
| 2019/0160774 A1* | 5/2019 | Langen | B31B 50/0042 |
| 2020/0039744 A1 | 2/2020 | Lert et al. | |
| 2020/0087010 A1 | 3/2020 | Almogy et al. | |
| 2020/0147813 A1 | 5/2020 | Esfahani | |
| 2020/0239233 A1 | 7/2020 | Johnson et al. | |
| 2020/0254707 A1 | 8/2020 | Iwasa et al. | |
| 2020/0319648 A1 | 10/2020 | Eckman | |
| 2020/0406570 A1 | 12/2020 | Hirata et al. | |
| 2021/0016905 A1* | 1/2021 | Lindbo | B65B 51/046 |
| 2021/0138755 A1 | 5/2021 | Langen | |
| 2021/0138756 A1 | 5/2021 | Langen | |
| 2021/0237385 A1 | 8/2021 | Fridolfsson | |

(56) References Cited

U.S. PATENT DOCUMENTS

| | | |
|---|---|---|
| 2022/0380129 A1 | 12/2022 | Kim |
| 2023/0002162 A1 | 1/2023 | Chang et al. |

FOREIGN PATENT DOCUMENTS

| | | | |
|---|---|---|---|
| CA | 3023959 A1 | 11/2017 | |
| CA | 3044850 A1 | 6/2018 | |
| CA | 3213070 A1 | 10/2022 | |
| CN | 108891698 A | 11/2018 | |
| CN | 113003127 A | 6/2021 | |
| CN | 215883863 U | 2/2022 | |
| DE | 2250667 C3 | 9/1980 | |
| DE | 19726593 * | 1/1998 | ............ B65G 1/137 |
| EP | 0559604 A1 | 9/1993 | |
| EP | 1177980 A2 | 2/2002 | |
| EP | 3337739 B1 | 2/2020 | |
| EP | 4079657 A1 | 10/2022 | |
| GB | 2 096 093 A | 10/1982 | |
| JP | 2013226661 A | 11/2013 | |
| WO | 96/32322 A1 | 10/1996 | |
| WO | 2013/142106 A1 | 9/2013 | |
| WO | 2014/161644 A2 | 10/2014 | |
| WO | WO 2014/161644 * | 10/2014 | ............... B65G 1/04 |
| WO | 2017/081281 A1 | 5/2017 | |
| WO | 2018/197400 A1 | 11/2018 | |
| WO | 2019/021281 A2 | 1/2019 | |
| WO | 2021065977 A1 | 4/2021 | |

OTHER PUBLICATIONS

Non-Final Office Action dated Apr. 12, 2022, mailed in the related U.S. Appl. No. 16/808,140.
Non-Final Office Action dated Mar. 3, 2022, mailed in the related U.S. Appl. No. 16/262,163.
Non-Final Office Action dated Mar. 26, 2018, mailed in the related U.S. Appl. No. 14/646,321.
International Search Report issued by the Canadian Intellectual Property Office on Aug. 8, 2013, in connection with International PCT Patent Application No. PCT/CA2013/000230, 5 pages.
Written Opinion of the International Searching Authority issued by the Canadian Intellectual Property Office on Aug. 8, 2013, in connection with International PCT Patent Application No. PCT/CA2013/000230, 8 pages.
International Preliminary Report on Patentability issued by the Canadian Intellectual Property Office on May 26, 2015, in connection with International PCT Patent Application No. PCT/CA2013/000230, 9 pages.
International Search Report issued by the Canadian Intellectual Property Office on Nov. 30, 2021, in connection with International Patent Application No. PCT/CA2021/051193, 4 pages.
Written Opinion of the International Searching Authority issued by the Canadian Intellectual Property Office on Nov. 30, 2021, in connection with International Patent Application No. PCT/CA2021/051193, 5 pages.
Non-Final Office Action mailed by the USPTO on Mar. 28, 2024, for related U.S. Appl. No. 17/968,689.
International Search Report issued by the Canadian Intellectual Property Office on Feb. 12, 2021 in connection with International Patent Application No. PCT/CA2020/051502, 6 pages.
Written Opinion of the International Searching Authority issued by the Canadian Intellectual Property Office on Feb. 12, 2021 in connection with International Patent Application No. PCT/CA2020/051502, 9 pages.
"RCE Random Robotic Case Erector Bottom Taper", Video available online at: https://youtu.be/WEHgWYnSDmk, Oct. 10, 2017.
International Search Report issued by the Canadian Intellectual Property Office on Jun. 27, 2013 in connection with International PCT Patent Application No. PCT/CA2013/000245 filed on Mar. 15, 2013, 5 pages.
Written Opinion of the International Searching Authority issued by the Canadian Intellectual Property Office on Jun. 27, 2013 in connection with International PCT Patent Application No. PCT/CA2013/000245 filed on Mar. 15, 2013, 6 pages.
International Preliminary Report on Patentability issued by the International Bureau of WIPO on Oct. 28, 2014 in connection with International PCT Patent Application No. PCT/CA2013/000245 filed on Mar. 15, 2013, 7 pages.
XPAK USA, LLC, XPAK ROBOX™—Robotic Random-Size Box Erector Brochure, http://www.xpakusa.com/pdf/XPAK%20-%20ROBOX%20Robotic%20Case%20Erector%20Model%20XP-E3000R.pdf (last printed Mar. 22, 2016).
"I went undercover as an Amazon delivery driver. Here's what I learned about the hidden costs of free shipping", Title retrieved at: https://www.thestar.com/news/investigations/2019/12/19/i-went-undercover-as-an-amazon-delivery-driver-heres-what-i-learned-about-the-hidden-costs-of-free-shipping.html, Dec. 19, 2019.
Non-Final Office Action dated Mar. 26, 2019, mailed by the USPTO, in the related U.S. Appl. No. 16/230,979.
Notice of Allowance dated Aug. 30, 2019, mailed by the USPTO, in the related U.S. Appl. No. 16/230,979.
Non-Final Office Action dated Aug. 17, 2021, mailed by the USPTO, in the related U.S. Appl. No. 16/677,139.
U.S. Appl. No. 61/862,499, filed with the USPTO on Aug. 5, 2013.
International Search Report issued by the Canadian Intellectual Property Office on Jan. 30, 2024, in connection with International Patent Application No. PCT/CA2023/051504 (7 pages).
Written Opinion issued by the Canadian Intellectual Property Office on Jan. 30, 2024, in connection with International Patent Application No. PCT/CA2023/051504 (15 pages).
International Search Report issued by the Canadian Intellectual Property Office on Apr. 23, 2024, in connection with International Patent Application No. PCT/CA2024/050151 (8 pages).
Written Opinion issued by the Canadian Intellectual Property Office on Apr. 23, 2024, in connection with International Patent Application No. PCT/CA2024/050151 (9 pages).

* cited by examiner

660

| Product_ID | Cell_Location_X | Cell_Location_Y | Cell_Location_Z | Cell_ID |
|---|---|---|---|---|
| 424234 | 001 | 001 | 001 | 424234 |
| 834588 | 001 | 001 | 002 | 834588 |
| 911003 | 001 | 001 | 003 | 911003 |
| 911004 | 001 | 001 | 004 | 911004 |
| 811001 | 002 | 001 | 001 | 811001 |
| 811002 | 002 | 001 | 002 | 811002 |
| 811003 | 002 | 001 | 003 | 811003 |

| Order ID | Tote ID | Product_IDs | Case Size | Dunnage_Type | Dunnage_Length | Packing Cell |
|---|---|---|---|---|---|---|
| 90001 | 9114 | 424234; 424234; 834588; | 5 | Bubble | 6.35 | 1 |
| 9000 | 9117 | 235873; 932293; | 7 | Paper | 2.73 | 6 |
| 90005 | 9118 | 578678 | 3 | Paper | 1.57 | 3 |
| 90006 | 9119 | 2235238 | 8 | Paper | 3.47 | 4 |
| 90007 | 9120 | 667868; 281584; 273641; | 5 | Bubble | 4.41 | 5 |
| 1002 | 1004 | 1006 | 1008 | 1010 | 1012 | 1014 |

| Case Size ID | Total Product Vol Min. | Total Product Vol Max. | Height | Width | Depth | Packing Cell |
|---|---|---|---|---|---|---|
| 1 | 500 | 1000 | 10 | 10 | 10 | 1,2,3 |
| 2 | 1001 | 3375 | 15 | 15 | 15 | 2,3,4 |
| 3 | 3376 | 8000 | 20 | 20 | 20 | 1,3,4 |
| 4 | 8001 | 15625 | 25 | 25 | 25 | 1 |
| 5 | 15626 | 27000 | 30 | 30 | 30 | 4 |

1452　1454　1456　　　1458　　　1460

| Order ID | Bin ID | Case Size | Dunnage_Type | Dunnage_Length | Packing Cell |
|---|---|---|---|---|---|
| 90011 | 9124 | 2 | Paper | 6.34 | 1 |
| 90012 | 9127 | 3 | Paper | 3.47 | 1 |
| 90013 | 9128 | 3 | Paper | 9.38 | 1 |
| 90014 | 9129 | 1 | Paper | 2.73 | 1 |
| 90015 | 9120 | 4 | Paper | 1.57 | 1 |

3302  3304  3308  3310  3312  3314

WAREHOUSE SYSTEM FOR FULFILLING ORDERS

CROSS-REFERENCE TO RELATED APPLICATIONS

This application claims priority from U.S. provisional application 63/072,008 filed on Aug. 28, 2020 and is related to U.S. application Ser. No. 16/230,979 filed on Dec. 21, 2018, U.S. application Ser. No. 16/677,139 filed on Nov. 7, 2019, and U.S. application Ser. No. 16/808,140 filed on Mar. 3, 2020, the entire contents of which are incorporated herein by reference.

FIELD

This present invention relates generally to methods and systems of warehouse operation, order fulfillment, and order packing.

BACKGROUND

Distribution warehouses are often used as a middleground between a manufacturer and a retailer. Manufacturers produce commercial units of a product type (herein referred to as a shop keeping unit or 'SKU'). Multiple units of a single SKU may be grouped into a container or ('case'), and multiple cases may be grouped onto a pallet. A pallet may refer to a stacked structure of cases, resting on a pallet base, also referred to as a skid, for handling using machines such as forklifts.

SKUs are generally shipped from manufacturer facilities to warehouses or distributions centers in single-SKU pallets. For example, each pallet typically contains a standardized number of cases of the same size, each holding the same number of individual units of a particular SKU. In a warehouse or distribution center, mixed pallets may be assembled for shipping to retail facilities. Such mixed pallets generally contain a plurality of case types, where each case type corresponds to a particular SKU.

Thus, products are typically packed and shipped from manufacturers "by the pallet", i.e. in units of pallets. A pallet disassembly is performed at an intermediate facility to break down pallets into units of cases, which are then shipped to retail facilities. At the retail facilities, cases are disassembled into individualized units suitable for sale to end customers.

This traditional approach is inefficient and labour-intensive. Shipping units produced by manufacturers are broken down in two separate stages, and at two separate facilities in order for individual be units to be sold and transferred to customers. Moreover, this approach is not suitable for newer retail models, such as e-commerce.

SUMMARY

An example warehouse system for fulfilling orders comprising a plurality of products, comprises: a plurality of storage cells, each storage cell for receiving palletized products, the palletized products packed in cases each comprising a plurality of units, the cases arranged on a pallet in a shipping configuration; a conveyor system operable to sequentially advance a tote to a plurality of the storage cells corresponding to a plurality of products in an order, for collecting the order in the tote; a plurality of robotic pickers at the storage cells, each for engaging individual units of a product, to transfer the individual units from the pallets to a tote of the order assembly system.

In some embodiments, the warehouse system further comprises a packing subsystem for transferring the order to a shipping case for shipping.

In some embodiments, the packaging subsystem comprises a case erector operable to erect said case.

In some embodiments, the case erector is operable to erect cases of a plurality of different sizes.

In some embodiments, the case erector is operable to erect a case of a selected one of the plurality of different sizes, based on sizes of the products of the order.

In some embodiments, the warehouse system comprises a liner insertion station adjacent to a conveyor of the conveyor system, the liner insertion station for placing a removable liner in said tote.

In some embodiments, the liner is a bag for transferring said order to said shipping case by removal of the bag.

In some embodiments, the plurality of robotic pickers comprise pickers mounted overhead at said cells.

In some embodiments, the plurality of robotic pickers comprises pickers movable between ones of the cells.

In some embodiments, the robotic pickers are operable to remove packing material from pallets at the cells.

In some embodiments, the robotic pickers are operable to cut the packing material.

In some embodiments, the robotic pickers are operable to remove empty cases from pallets at the cells.

In some embodiments, the warehouse system comprises a plurality of zones maintained at different temperature conditions.

In some embodiments, the conveyor system comprises a plurality of branching conveyors, each of the branching conveyors passing proximate a subset of the storage cells.

In some embodiments, the warehouse system comprises a plurality of diverters selectively operable direct a specific individual tote along a defined path to any of the storage cells.

An example warehousing method, comprises: receiving a plurality of pallets of goods, the pallets containing a plurality of cases, each containing a plurality of individual units of the goods; transporting each the pallet to a storage cell corresponding to goods on that pallet; removing individual units of the goods from the pallets with robotic pickers at the storage cells; assembling an order of products by advancing an order tote sequentially to a plurality of the storage cells to receive products from the robotic pickers.

In some embodiments, the warehousing method comprises transferring the order to a shipping case for shipping.

In some embodiments, the warehousing method comprises automatically erecting the shipping case.

In some embodiments, automatically erecting said case comprises selecting one of a plurality of possible case sizes based on sizes of the products of the order, and conveying a blank corresponding to the selected one of a plurality of case sizes to a case erector.

In some embodiments, the warehousing method comprises automatically inserting a removable liner in said tote.

In some embodiments, the removable liner is a bag, and transferring said order comprises placing said bag in said shipping case.

In some embodiments, the warehousing method comprises removing packing material from the pallets with said robotic pickers.

In some embodiments, the warehousing method comprises cutting the packing material with the robotic pickers.

In some embodiments, the warehousing method comprises maintaining multiple warehouse zones at different temperatures.

In some embodiments, the assembling an order comprises conveying a tote along a branching conveyor, wherein each branch of the branching conveyor passes proximate a subset of the storage cells.

In some embodiments, the warehousing method comprises defining a path for a specific individual to a storage cell by selective operation of diverters on the branching conveyor.

BRIEF DESCRIPTION OF DRAWINGS

In the Figures which illustrate example embodiments,

FIG. 49 is an example cell location repository;

FIG. 50 is an example order sequence;

DETAILED DESCRIPTION

Disclosed herein are warehouse systems and methods that allow for efficient receiving and storage of palletized products, and shipping of mixed orders of individual product units, e.g. to consumers. Pallets comprising cases full of individual articles are dismantled in a single stage, such that individual articles can be directly removed from pallets for shipping. Packing apparatus and methods are disclosed, permitting shipping of orders in any of a variety of different shipping cases. Operation of the warehouse systems and execution of the methods may be automated, such that few or no human operators are required. Embodiments disclosed herein may be compatible with features disclosed in U.S. application Ser. No. 16/230,979, filed on Dec. 21, 2018, U.S. application Ser. No. 16/677,139 filed on Nov. 7, 2019, and U.S. application Ser. No. 16/808,140 filed on Mar. 3, 2020, the entire contents of which are incorporated herein by reference.

System Overview

Figure 1:
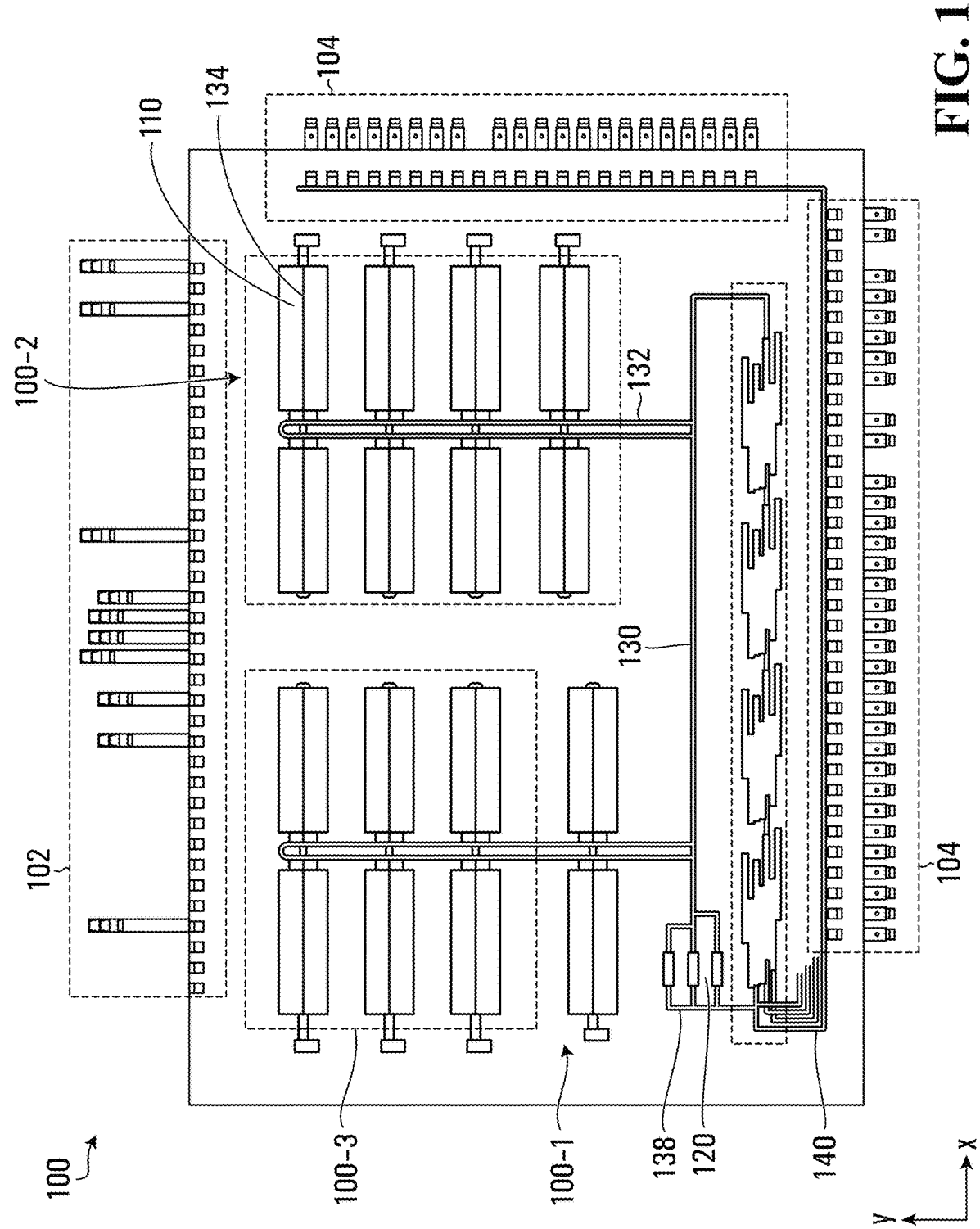
FIG. 1 is a top view of a floor plan of a warehouse system for fulfilling orders.

FIG. 1 is a top view of a floor plan of an example warehouse system 100 for fulfilling orders. The system includes receiving bays 102, output bays 104, storage units 110, packing system 120, and a conveyor system 130. The warehouse system 100 can generally be described in terms of three axes: y and x representing longitudinal and lateral horizontal axes, and z representing a vertical axis.

In operation, pallets containing cases of products are received from a delivery trucks at receiving bays 102. Each pallet contains products of a particular SKU. Pallets are transported from the delivery trucks to specific corresponding locations in a storage unit 110. Such transportation may be done using forklifts. The forklifts may be autonomous devices referred to as automated guided vehicles (AGVs). There, the pallet will be placed in the corresponding storage location in the storage unit 110. An example of a suitable AGV model is the narrow aisle forked automatic guided vehicle (FAGV) model made by JBT, having a capacity of 1,100 kg and lift heights up to 9.2 m. The AGV may have a load detection sensor that may verify load presence and load placement, and motors configured to allow for 180 degree turning in a specific position. Individual units may be later removed from the storage location to fulfil customer orders.

Each storage unit 110 has a number of discrete, individual storage locations, referred to as cells, each of which may be associated with a SKU. In some examples, the SKUs handled in warehouse system 100 may be a specific, defined set. In other examples, the warehouse system 100 may handle an open-ended set of SKUs, subject to physical space constraints.

Storage locations may be uniquely identified, e.g. by numbers. The numbers assigned to each location may also identify the position of the storage location in warehouse system 100 using its x, y, and z axis. For example, the x and y axis may be used to represent the horizontal position where the pallet should be placed, and the z axis may represent a cell height.

According to some embodiments, the specific storage locations in storage unit 110 may be grouped according to a property of the specific item. For example, items with similar shapes, similar sizes, or similar packages may be positioned close to one another.

Warehouse system 100 is divided into a plurality of zones. Specifically, in the depicted example, warehouse system 100 is divided into three zones 100-1, 100-2, 100-3. The zones 100-1, 100-2, 100-3 are maintained at different conditions. For example, a first zone 100-1 is maintained at moderate temperature and humidity conditions; a second zone 100-2 is maintained at reduced temperature; and a third zone 100-3 is maintained at a temperature at or below freezing. The three zones 100-1, 100-2, 100-3 provide three different storage conditions for storage of different products. For example, warehouse system 100 may house grocery goods. Non-perishable goods may be kept in zone 100-1; perishable goods such as fresh produce may be kept in zone 100-2; and frozen goods may be kept in zone 100-3.

Storage units 110 and conveyor system 130 define a branching structure. Conveyor system 130 has one or more main lines 132, also referred to as arteries. A plurality of branch lines 134 extend from main lines 132 and communicate therewith, so that articles can be transferred between the main lines 132 and branch lines 134.

Storage units 110 are positioned adjacent branch lines 134. Each branch line 134 passes adjacent a subset of storage units and cells. Goods at storage locations in storage units 110 can be transferred from the storage locations to the branch lines 134 for transportation.

Warehouse system 100 further comprises an output conveyor 140. Output conveyor 140 is a belt or roller conveyor configured to deliver completed cases 334 from order packing system 120 to specific ones of output bays 104. At each output bay 104, a delivery truck may be positioned. According to some embodiments, completed cases 334 are delivered to the output bay 104 randomly. Alternatively, completed cases 334 may be delivered to the output bay 104 based on a delivery destination. For example, each delivery vehicle at output bay 104 may be assigned to a particular route or territory. Orders may likewise be assigned to routes or territories based on destination addresses. After packing, completed orders are sent to the corresponding output bay 104 and delivery vehicle. The completed case 334 will then be transferred from the output conveyor 140 onto the truck, either by an automated guided vehicle, by a person, or another pick-and-place electromechanical system.

The above-described components and functions of warehouse system 100 may be partially or fully automated such that the warehouse may function with very few human operators or entirely without human operators.

Storage Units

Figure 2:
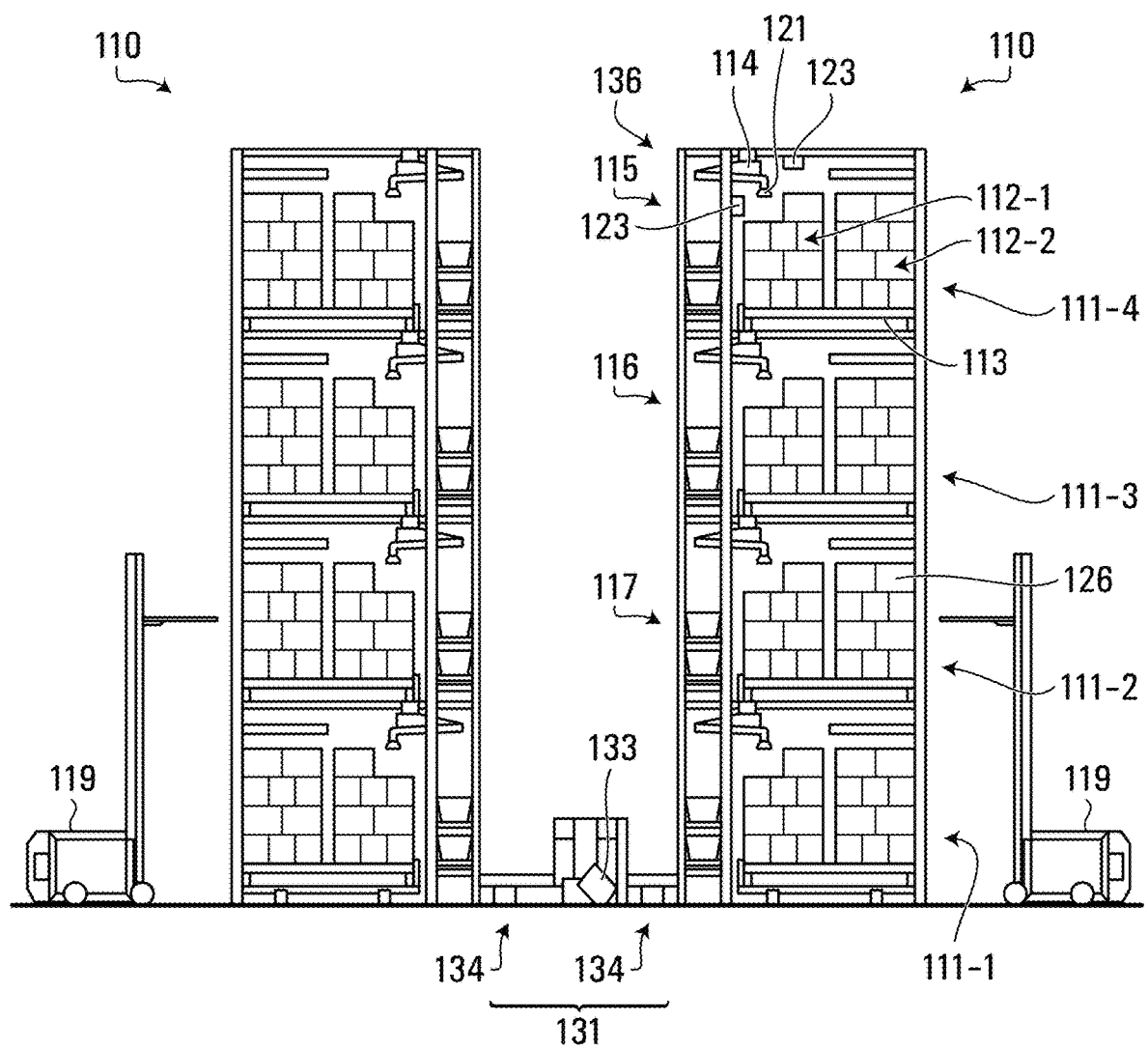
FIG. 2 is a cross-sectional view of a storage unit in the warehouse system for fulfilling orders of FIG. 1.

FIG. 2 is a cross-sectional view showing two storage units 110 on opposite sides of a branch line 134 of conveyor system 130. Each of the pictured storage units 110 has four shelves formed by a frame and defining cells 111 (individually 111-1, 111-2, 111-3, and 111-4), each at a different height along axis z. A storage location is defined at each cell 111 for pallets 112 containing a single SKU.

Figure 3A:
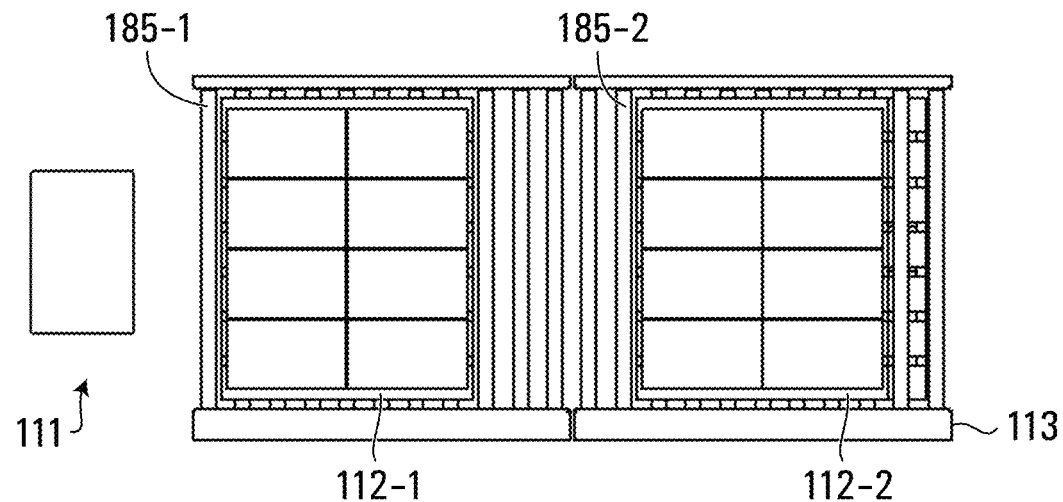
FIG. 3A is a top view of a shelf in the storage unit of FIG. 2.
Figure 3B:
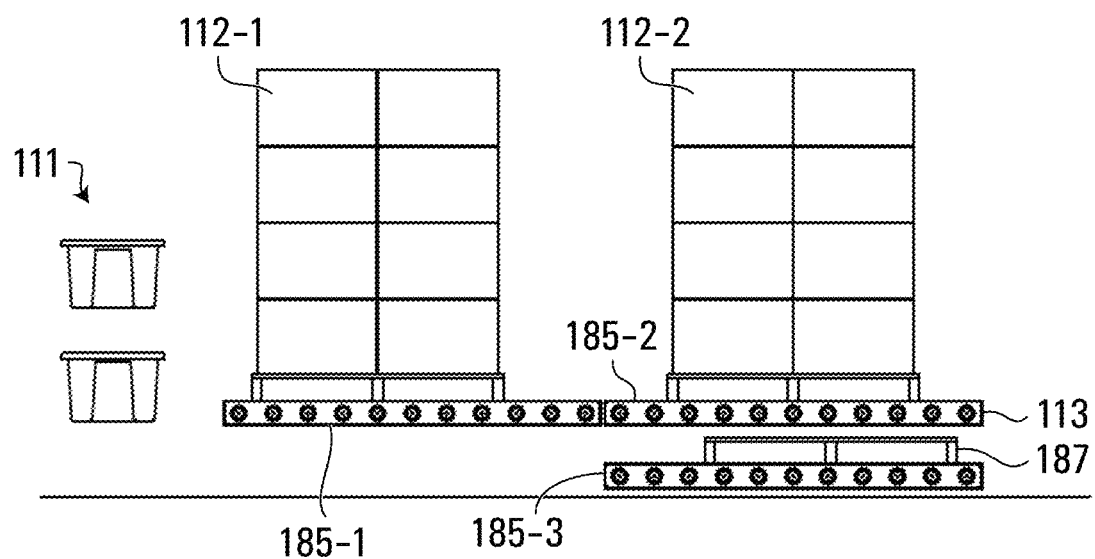
FIG. 3B is a side view of the shelf of FIG. 2.

FIGS. 3A and 3B respectively depict top and side views of an individual cell 111. In the depicted example, each cell 111 has depth sufficient to receive a plurality of pallets. For example, each cell holds a processing pallet 112-1 at a processing section 185-1, a queued pallet 112-2 at a standby section 185-2, and may hold an empty pallet 187 in a retrieval section 185-3. The processing pallet 112-1 is located at a processing position closest to branch line 134 of conveyor system 130 and is in the process of being dismantled. That is, as shown in FIG. 3A, some packaging has been removed from processing pallet 112-1 and a process of removing individual units from pallet 112-1 is in progress. Queued pallet 112-2 is in a standby position behind processing pallet 112-2, awaiting dismantling. An empty pallet 187 may be held in the retrieval position, which may be vertically above or below the standby position. Packaging on queued pallet 112-2 is intact, and no individual articles have been removed. Empty pallet 187 may have already had all individual articles, empty cases, dunnage, or slip sheets removed therefrom. At the processing position, material handling machines such as AGVs 119 may retrieve the empty pallets for disposal.

Each cell 111 is equipped with a cell conveyor 113. Pallets 112 are positioned atop the cell conveyor 113. Cell conveyor 113 has three main conveyor sections 185, namely, a processing section 185-1, a standby section 185-2 and a retrieval section 185-3, for handling pallets at the processing, standby and retrieval positions, respectively. Each section 185 of cell conveyor 113 may be, for example, a belt conveyor or roller conveyor or combination thereof. Each section 185 may be individually controllable. For example, each section may have a separate conveyor belt and the sections may be driven by separate motors controllable by a PLC or control system.

Conveyor sections 185 are configured to transport pallets to one another. Standby section 185-2 is configured to receive a standby pallet 112-2 from the material handling machine such as an AGV, and, in response to a control signal, to advance a pallet from standby section 185-2 to be received by processing section 185-1. Processing section 185-1 is configured to position a pallet for unloading and, in response to a control signal, advance an empty pallet 187 to the retrieval section 185-3. Retrieval section 185-3 is configured to receive an empty pallet and transfer the pallet to an AGV or another robotic device for removal.

Figure 4:
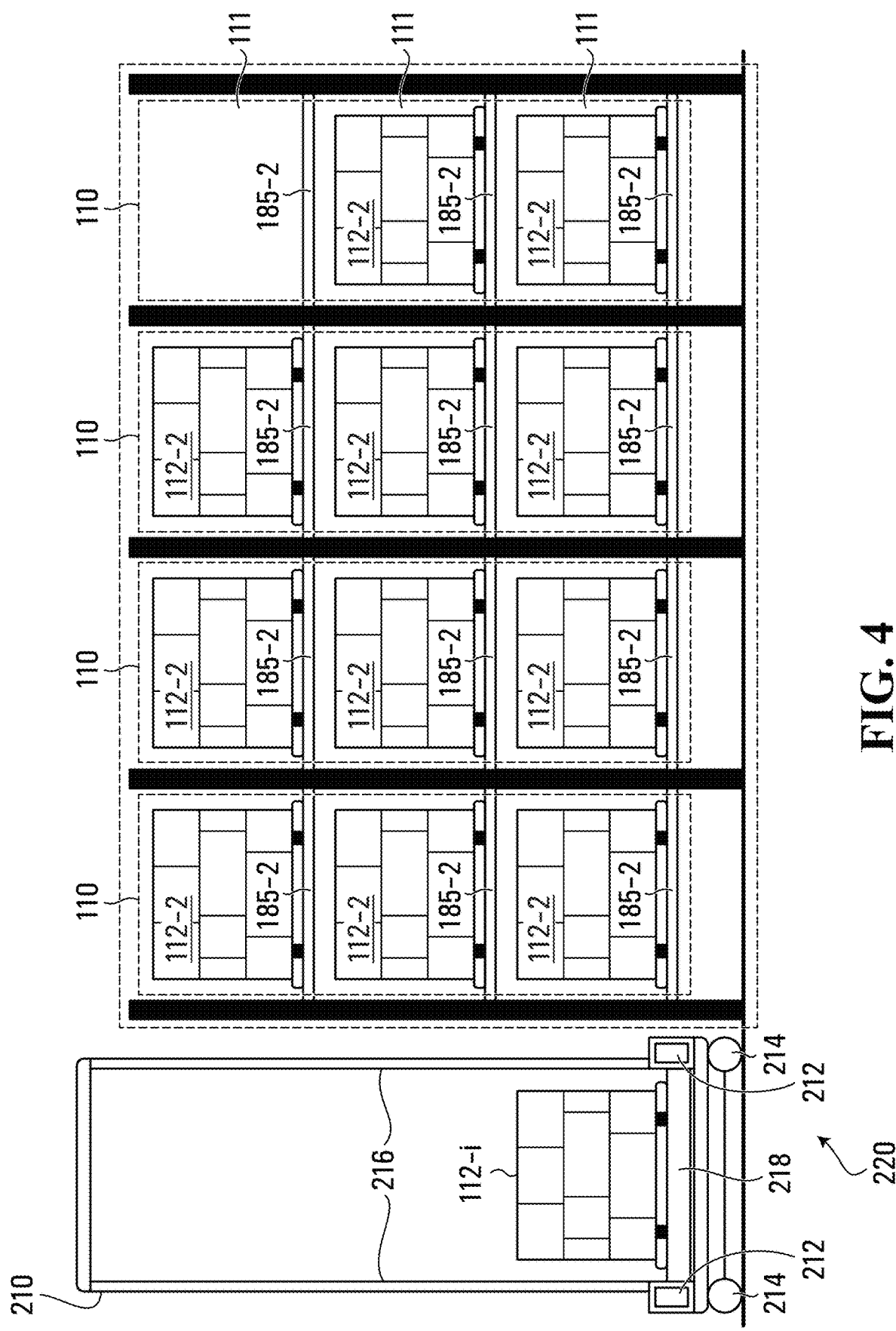
FIG. 4 is a rear view of a storage unit having a pallet elevator device in a first position.

According to some embodiments as shown in FIG. 4, the material handling machine may include a separate pallet elevator device 210 configured to serve multiple cells 111 in the storage locations 110 along an individual branch line 134. The cells along each individual branch line 134 may be serviced by one or more pallet elevator devices 210. Pallet elevator device 210 may include a receiver dock 218 positioned between vertical rails 216. Pallet elevator device 210 may be configured to move horizontally using horizontal actuators 214 and to move vertically using vertical actuators 212, to position the receiver dock 218 at a selected cell 111. Receiver dock 218 may be a conveyor system configured to move a pallet from receiver dock 218 and onto the appropriate standby section 185-2. Pallet elevator device 210 may be configured to receive an input pallet 112-*i* from an AGV (such as a forklift) at a point pickup point 220, depicted in FIG. 4, and move the input pallet 112-*i* in both vertical and horizontal direction, so that the pallet elevator device can present a pallet to the standby section 185-2 at any one of multiple cells 111 at different positions along the branch line. The pallet elevator device 210 may include a track, chain, belt, lead screw, or any other motorized system. A suitable pallet elevator device 210 may include the Unit Load AS/RS made by Interlake Mecalux.

Figure 5:
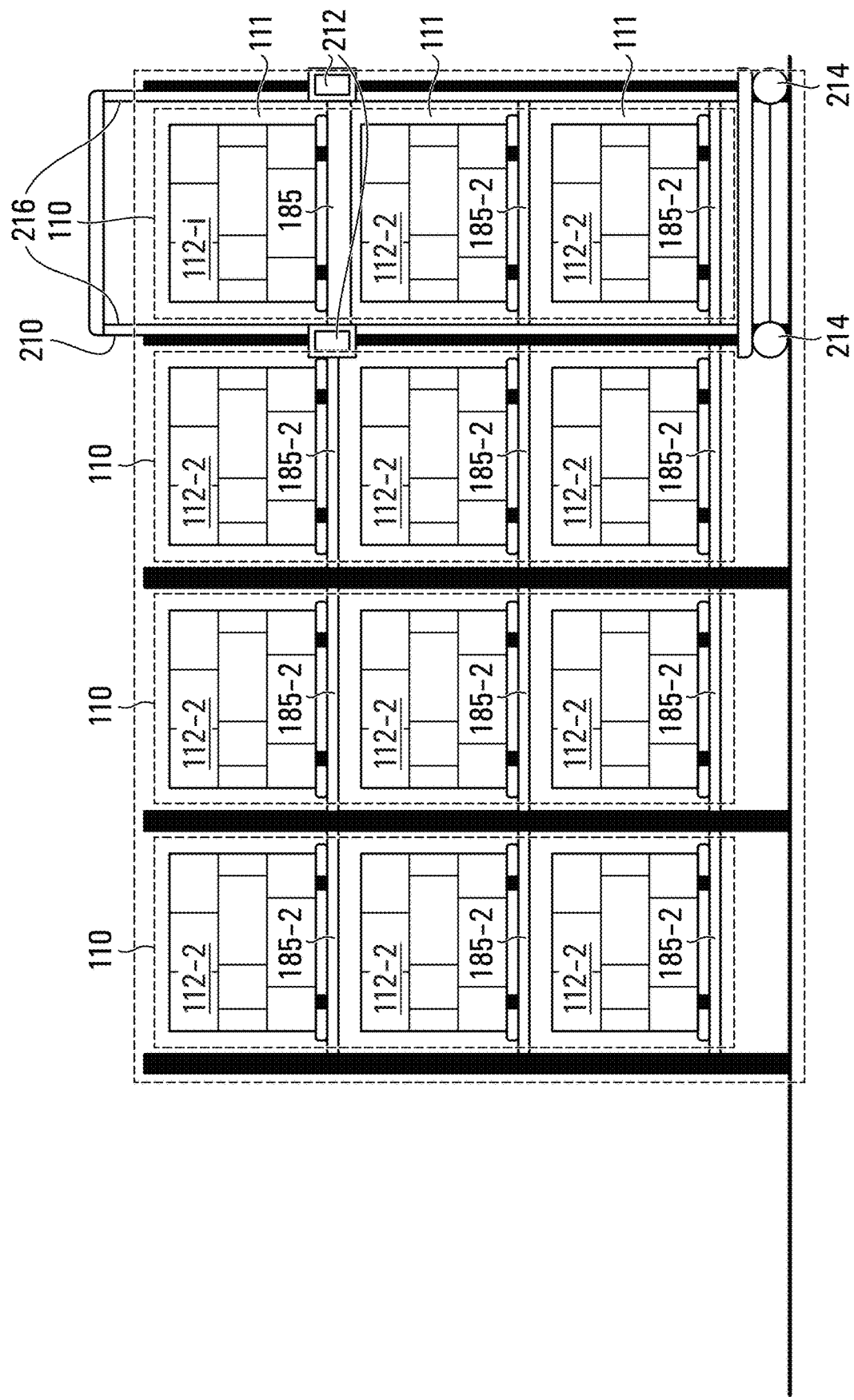
FIG. 5 is a rear view of a storage unit having a pallet elevator device in a second position.

As illustrated in FIG. 5, pallet elevator device 210 and input pallet 112-*i* are positioned at a selected cell 111 (i.e. the top right cell 111). Movement of pallet elevator device 210 may include a horizontal movement using horizontal actuators 214, a vertical movement using vertical actuators 212, or both. In operation, pallet elevator device 210 may activate the horizontal actuators 214 and vertical actuators 212 sequentially or at the same time. Upon reaching the appropriate cell 111, pallet elevator device may advance input pallet 112-*i* onto the standby section 185-2 at the cell, then return to the pickup point 220 to await a new input pallet 112-*i*.

Returning to FIGS. 3A and 3B, according to some embodiments, processing section 185-1 may be movable vertically along a guide such as a rail or track. The processing section 185-1 may be movable between the heights of standby section 185-2 and retrieval section 185-3. In a first position, the processing section 185-1 may be aligned with the standby section 185-2 for receipt of the standby pallet 112-2. In a second position, the processing section 185-1 may be aligned with the retrieval section 185-3 to advance an empty pallet 187 to retrieval section 185-3.

According to some embodiments, a plurality of standby sections 185-2 may be employed. This may allow multiple standby pallets 112-2 to be received by warehouse system 100. Each standby section 185-2 may be arranged to feed into a successive standby section 185-2. The foremost standby section 185-2 may feed into a processing section 185-2, while the rearmost standby section 185-2 may receive the pallet 112-2 from a material handling machine such as an AGV. Additionally or alternatively, a standby section 185-2 may be used to receive multiple pallets to be sequentially advanced to processing section 185-1. Thereby, greater than one standby pallet 112-2 may be held in place within warehouse system 100. When processing pallet 112-1 is emptied, the foremost standby pallet 112-2 will be placed in the processing section 185-1, and each standby pallet 112-2 will advance to the next standby section 185-2.

Returning to FIG. 2, an elevator 115 is placed intermediate branch line 134 and cells 111. Alternatively, an elevator 115 may be placed between main line 132 and branch line 134, or at a position within the branch line 134, wherein each branch line is configured to serve an individual height of cell 111. One or more carriages 117 are mounted on elevator 115 and are movable along elevator 115 in the z axis between a base position adjacent branch line 134 for transfer of articles to the conveyor, and any of a plurality of cell positions adjacent cells 111 for receiving articles.

At each cell, a robotic picker such as a picker arm 114 may be provided. Picker arm 114 may be a suitable pick-and-place robot. Picker arm 114 is able to move in multiple axes. Picker arm 114 may be configured to move a payload of up to 12 kg or more, and have a reach up to or greater than 2000 mm. An example of a suitable picker arm 114 is the FANUC M-20iA/12 Series Robot having a payload of 12 Kg, reach 2009 mm and movable in six axes. Examples of suitable picker arms are ABB model IRB-1300-en, ABB model IRB-1660-ID, ABB model IRB-2660-8-2, Fanuc model M-10iA/10M and Fanuc model M-16iB/10L.

The picker arm 114 is configured to retrieve individual items from the palletized cases 126, and place the retrieved items into a nearby tote 116, e.g., supported on elevator 115. Picker arm 114 may be further configured to perform de-palletizing operations. For example, each picker arm 114 may be configured to remove packing material from a pallet 112 at the corresponding storage location, or to open or dismantle cases on the pallet in order to access individual units.

Each picker arm 114 may be further configured to dispose of removed packaging material, for example by grasping material to transfer it to a disposal site such as a chute (not shown).

As depicted, each picker arm 114 is mounted above its respective cell 111. Such mounting provides effective access to articles through the tops of cases. However, other mounting arrangements are possible. For example, picker arm 114 may be mounted below the pallet, or suspended on a side frame. According to some embodiments, the picker arm 114 can be mounted and traversable along a track, such that a picker arm 114 can be operated in a number of positions, each proximate a cell 111 for dismantling a pallet 112 at that cell. Each picker arm 114 has an operating envelope 136 defined by geometry and range or motion of the pickers. The operating envelope 136 is the spatial region in which the picker is capable of grasping or otherwise interacting with items. As is apparent from FIG. 2, the operating envelope 136 of each picker arm 114 reaches a portion of the corresponding cell 111 and elevator 115. Specifically, elevator 115 and each processing pallet 112-1 lies within operating envelope 136.

Figure 6:
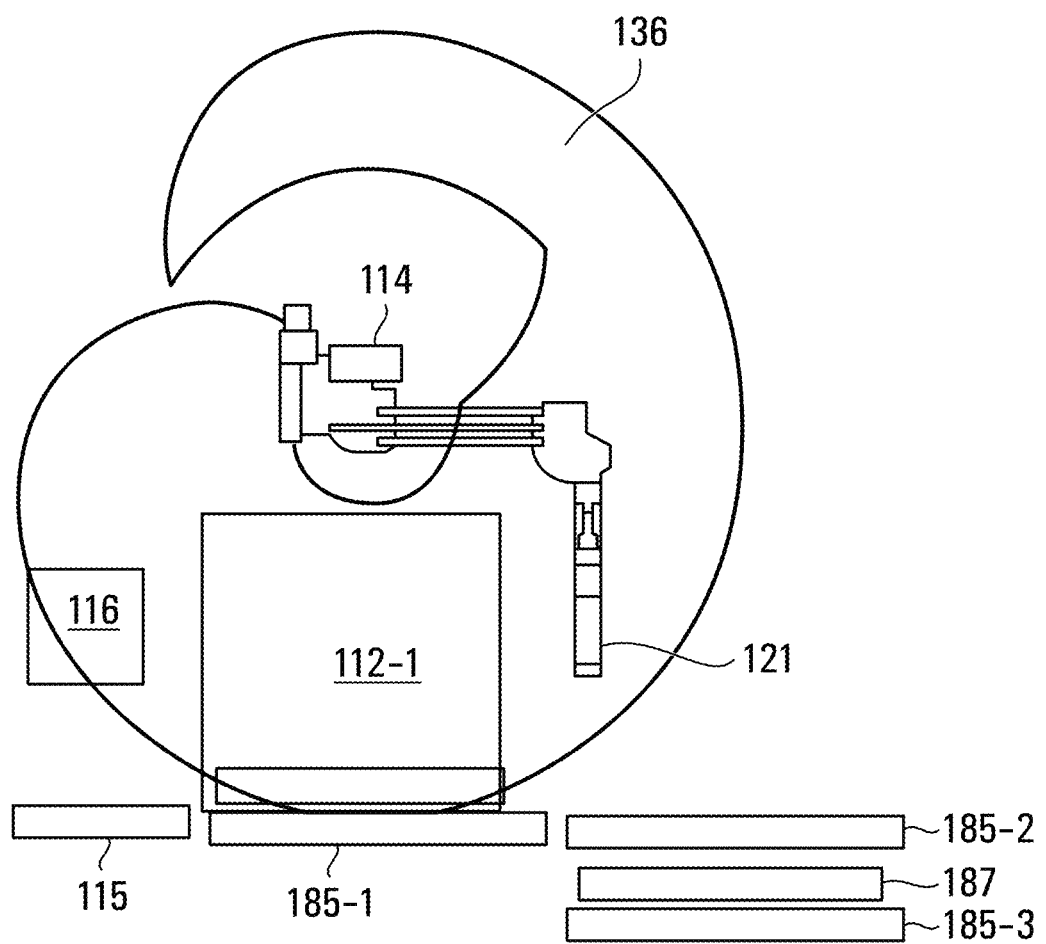
FIG. 6 is another side view of the shelf of FIG. 2.

Turning to FIG. 6, a side view of an example operating envelope 136 for picker arm 114 is illustrated. As can be seen, the picker arm 114 may reach the bottom of processing pallet 112-2. Additionally, the picker arm 114 can reach to tote conveyor 116, as well as on the sides and behind processing pallet 112-1. It can be noted that the physical constraints of picker arm 114 may provide a larger or smaller operating envelope. Similarly, based on joints defining rotational axes of picker arm 114, "dead zones" or "blind spots" may occur, where the picker arm is unable to articulate to. These zones may be known and defined within a control system for picker arm 114.

According to some embodiments, processing section 185-1 may be further configured to lift processing pallet 112-1 vertically as the picker arm 114 is retrieving the individual items from the palletized cases 126. For example, the processing pallet may be lifted as layers of cases 126 are removed, such that each successive case is processed approximately at a consistent height. In these embodiments, the picker arm 114 may not require an operating envelope 136 extending to the base of processing pallet 112-1. Rather, the processing pallet 112-1 may be lifted to ensure that the case 126 at the top of processing pallet 112-1 is positioned with operating envelope 136.

Each picker arm 114 is equipped with an end effector 121 suitable for selectively holding individual articles on pallets 112 and releasing the articles for transport along conveyor system 130. The configuration of end effector 121 may depend on characteristics of articles to be moved. For example, objects with planar surfaces and relatively low weight may be effectively engaged using an end effector with one or more vacuum cups. Other objects having curved or irregular surfaces or larger weights may be grasped with claws or clamping devices of corresponding size and shape.

In some embodiments, each picker arm 114 may have a unique end effector 121. In other embodiments, some pickers may have common end effectors. For example, a first type of end effector may be present on all picker arms 114 used to manipulate boxed articles, and a second type of end effector may be present on all pickers used to manipulate bottled articles.

According to some embodiments, multiple, interchangeable end effectors may be available. For example, the picker arm 114 may be equipped with a releasable linkage, the linkage configured to engage with or disengage with a selected one of a plurality of end effectors. The releasable linkage may include physical connection, electric communication and vacuum communication. The available end effectors may be placed in a rest position within the operating envelope 136. When needed, picker arm 114 may move to engage, via the linkage, with a suitable end effector at the rest location, based on the characteristics of a pallet to be dismantled. Once engaged, the swappable end effector can be employed to perform a specific task. After the task has been performed, picker arm 114 may return the swappable end effector to the rest location and release the linkage.

Figure 7:
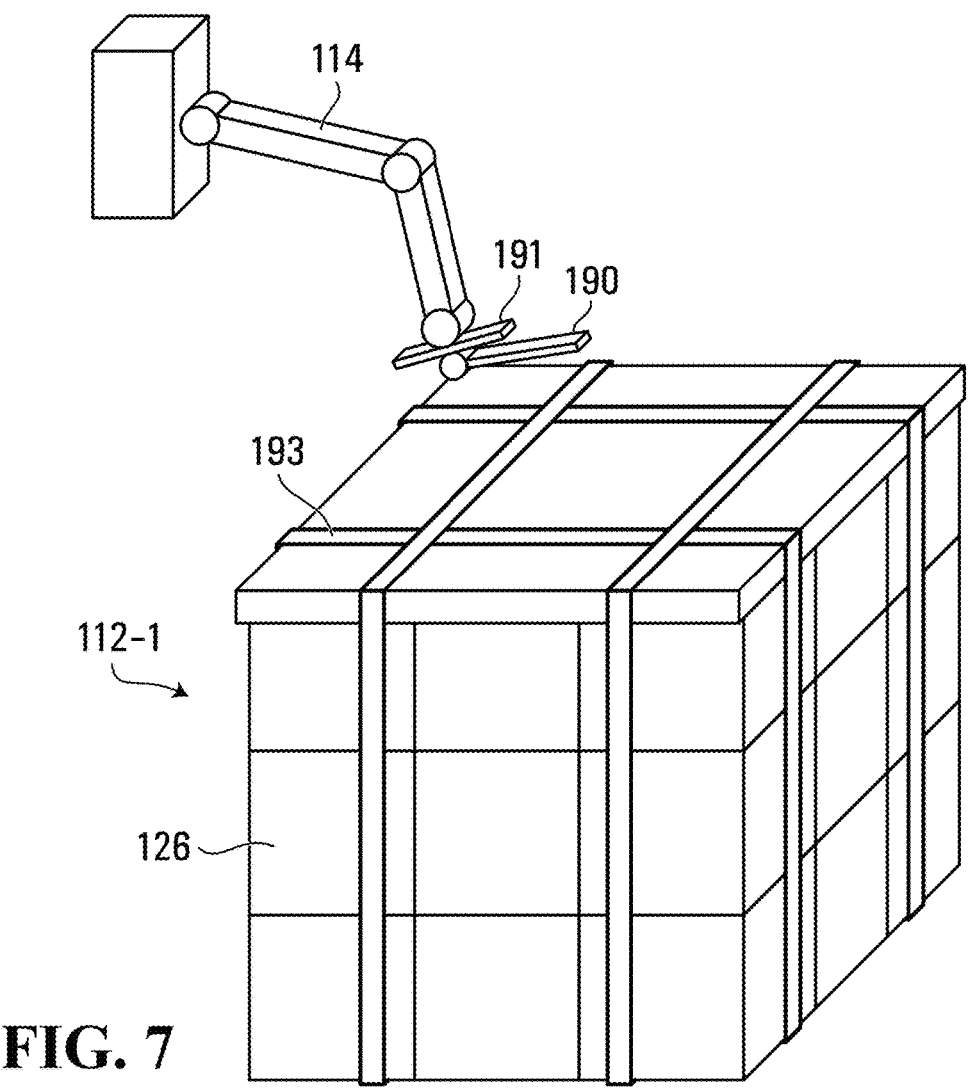
FIG. 7 is an isometric view of an example tool used on a robotic arm in the storage unit of FIG. 2.

FIG. 7 illustrates an example end effector 121. The specific end effector is a destrapper-debander 190. The destrapper-debander 190 is configured to remove strapping 193 that is used to secure cases 126 onto the pallet base. Strapping 193 may be metal, nylon, plastic, or any other material having tensile strength to maintain individual case 126 placement on the pallet base. The strapping 193 may be looped about the pallet.

Destrapper-debander 190 may be connected (releasably or fixedly) to the robotic arm 114 via connector 191. Connector 191 may include physical linkages, such as quick connects for electrical connections, and pneumatic connections. Connector 191 may be further configured to connect to other end effectors 121. For example, another end effector 121 may be a suction plate or plurality of suction cups, configured to lift, move, and release plastic, paper or corrugated products.

Figure 8A:
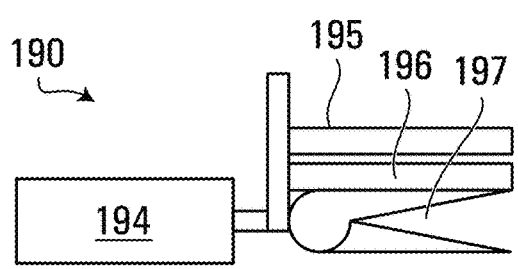
FIGS. 8A and 8B are a top and side view of the example tool of FIG. 7.
Figure 8B:
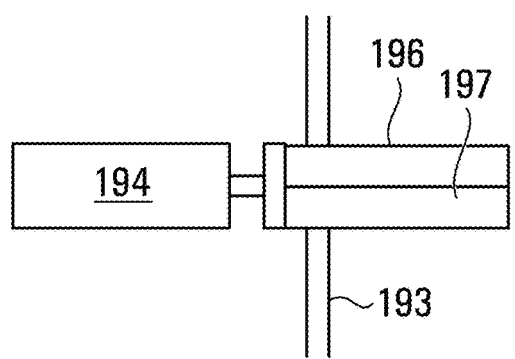

FIGS. 8A and 8B respectively show detailed side and top views of the destrapper-debander 190. Destrapper-debander 190 comprises a motor 194, roller 195, scissor 196, and clamp 197. In operation, robotic arm 114 positions the destrapper-debander 190 proximate the strapping 193. Clamp 197, using a pinching mechanism, holds strapping 193 in place. Once strapping 193 is held in place, scissor 196 slice the strapping 193. Because clamp 197 is holding the strapping 193 in place, the strap maintains its position while the tension is released (avoiding undesired unpredictable movement). Once strapping 193 is cut, motor 194 spins destrapper-debander to wind the strapping 193 about the entire destrapper-debander 190. Roller 195 may be a spring-loaded roller employed to maintain the position of the strapping 193 on the destrapper debander as strapping 193 is wound.

Once strapping 193 is completely wound, arm 114 may place the strap in a dunnage drop zone or chute. Specifically, the arm 114 may move destrapper-debander 190 to be positioned above a dunnage drop zone or chute. There, the clamp 197 will disengage from holding strapping 193, and allow or push the wound reel of strapping 193 down the chute. This cycle may be repeated as necessary to remove any/all straps from processing pallet 112-1.

Figure 9A:
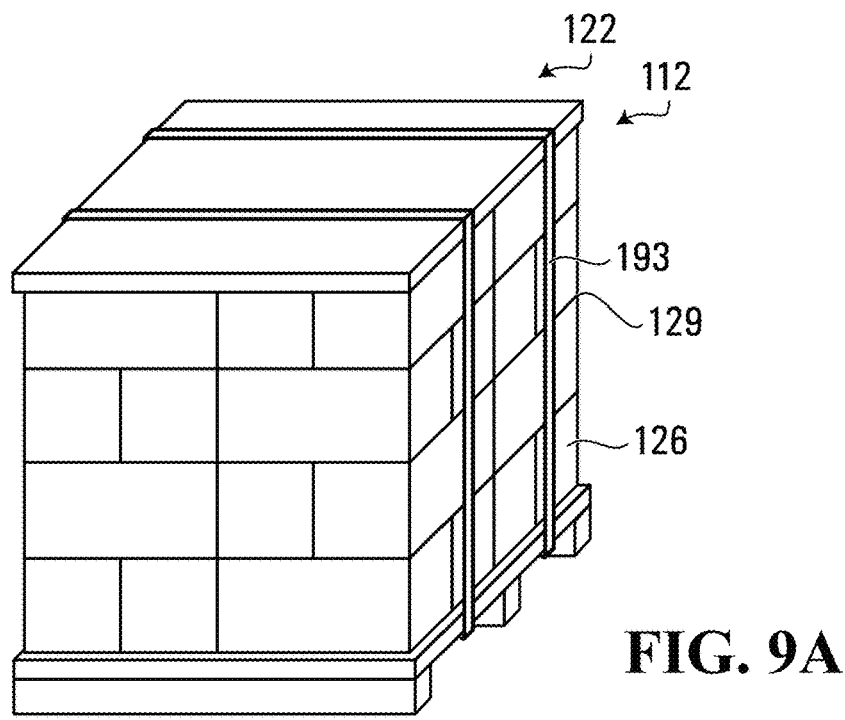
FIGS. 9A and 9B are isometric views of a pallet to be used in a warehouse system for fulfilling orders.
Figure 9B:
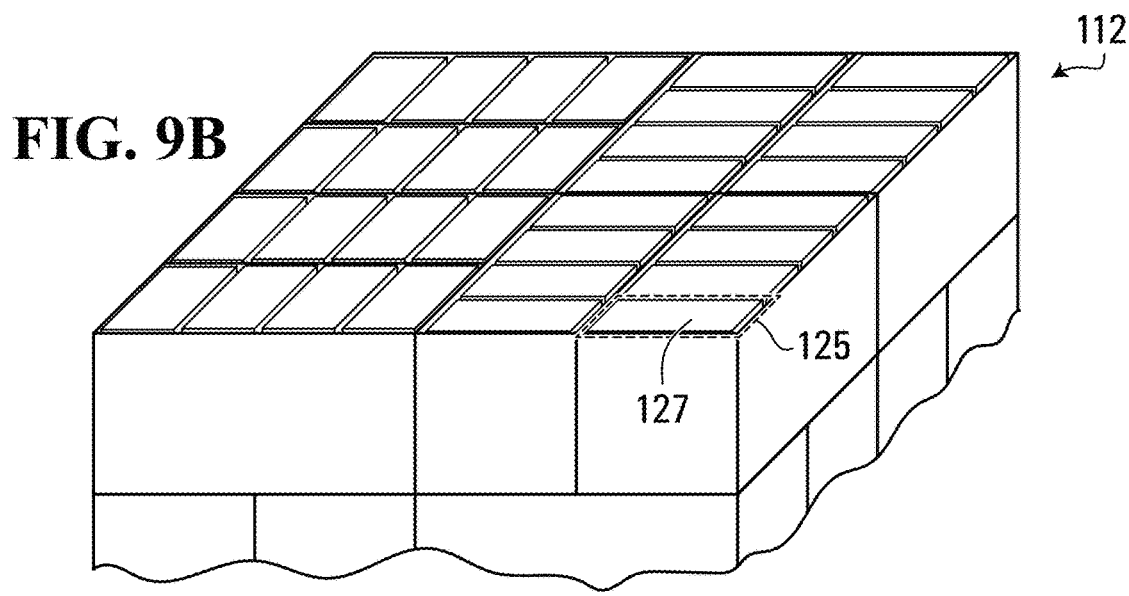

An example pallet 112 is depicted in FIGS. 9A-9B. As depicted, pallet 112 includes a plurality of cases 126, arranged in vertically-stacked layers, each layer having a defined arrangement of cases. The layers may be separated by cardboard or polymer sheets 129 referred to as slip sheets. In addition, lids 122 may be secured atop the stack of cases 126. Binding material such as strapping 193 may be wrapped around each pallet 112 to hold cases 126 together during shipment. Cases 126 may have open or closed tops.

The cases of FIG. 9A are half-slotted cases (or 'HSCs'), namely cases with a sealed bottom and open top. An open top may be free from any flaps. Use of HSC provides open top-access to retrieve the individual packaged products from within the case. In other embodiments, cases may be sealed at both ends (e.g. regular slotted cases, "RSCs"). Picker arms 114 may be configured to open or remove case tops without removing cases from the pallet 112.

The end effectors 121 of picker arms 114 may have other auxiliary tools for dismantling packaging. For example, end effectors may be equipped with blades for cutting binding material such as strapping 193, and for cutting or otherwise removing tops of closed-top cases 126. The auxiliary tools may further including auxiliary holding mechanisms for pulling packaging material away from pallets 112. For example, an end effector may have a downwardly-facing suction device for holding articles and withdrawing them vertically, and a laterally-facing suction device for pulling objects such as binding material away from the sides of a pallet 112.

According to some embodiments, removed packing material is dropped by the picker arm 114 at a specific location, such that an AGV may be able to remove the excess cardboard to a disposal location. The AGV may be configured to compact the corrugated material, along with receive an empty pallet base. In other embodiments, packing material may be placed into a receptacle for subsequent disposal.

Picker arms 114 may be operated under control of a guidance system. For example, in the depicted embodiment, picker arms 114 are optically guided, e.g. using a suitable machine vision system. The machine vision system includes one or more cameras 123 mounted proximate to each picker arm 114 to capture overhead images of pallets 112, and one or more cameras 123 positioned laterally of each cell 111 to acquire side images of pallets 112. Acquired images may be registered to a three-dimensional coordinate system and processed to detect locations of articles on pallets 112. For example, suitable image processing techniques may include use of edge detection algorithms to locate contours corresponding to edges 125 of individual articles. Located edges may be matched to known article shapes to infer positions of articles 127.

Alternatively, the picker arm 114 may be controlled according to a representation of the geometry of pallet 112, its cases 126, and individual articles 127. That is, a representation may be stored for each SKU handled within warehouse system 100, describing a standard arrangement of pallets and cases for that SKU, e.g., based on a coordinate system. The standard arrangements may be used to direct picker arms 114 and track progress of dismantling each pallet. Based on removing an individual article 127 from the case 126, the picker arm 114 may modify the memory to indicate that the specific individual article 127 from the virtual representation of the pallet 112 has been removed.

Referring again to FIG. 1, conveyor system 130 includes a series of sub-conveyors. The conveyors may be belt conveyors, roller conveyors or a combination thereof. Disposed on the surface of conveyor system 130 are a plurality of totes. The totes may be reusable bins made of a hard plastic or similar durable material, such as the AST3220-12 made by the Obris Corporation. Each individual tote may have a unique identifying label, such as an ID, RFID Tag or bar code. The unique identifying label may be configured to be scanned and tracked by readers in warehouse system 100. For example, each tote may have a unique RFID tag identifying the tote, and the position of each RFID tag may be tracked in real-time as totes traverse warehouse system 100. Alternatively, totes may be identified using visual tags such as bar codes which may be tracked using a series of cameras or optical scanners within warehouse system 100. According to some embodiments, the totes may be constructed cases made from a corrugated material.

Conveyor system 130 may be equipped with a high-friction surface, such that totes may be supported on the conveyor without inadvertent movement along the conveyor.

Conveyor system 130 operates to transport individual totes through the warehouse system 100. Throughout operation of conveyor system 130, the totes may be brought from a tote staging station 138 to cells 111 and to packing system 120. From the packing system 120, totes are returned to a tote staging station 138.

Figure 10:
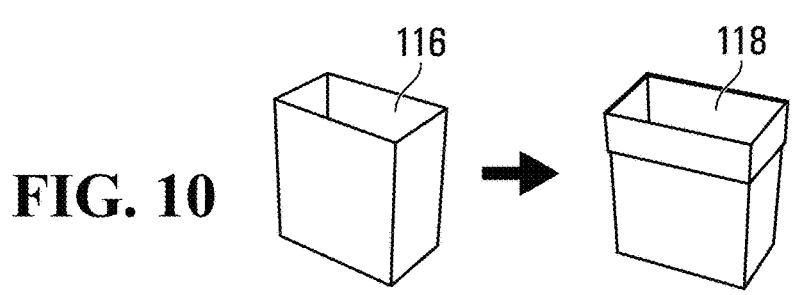
FIG. 10 is an isometric view of tote for use in a warehouse system for fulfilling orders, with and without a liner.

FIG. 10 shows an example tote 116 for use in a warehouse system for fulfilling orders. According to some embodiments, a plastic liner or other bag may be placed in the tote (i.e. a lined tote 118).

Tote staging station 138 is configured to prepare a tote for reception of an order. At tote staging station 138, each tote may be sent through a machine configured to insert a liner into the tote. The plastic liner of lined tote 118 may be placed inside the tote by a liner machine such as the Bagmaker inserter Flexim-31 manufactured by Pattyn. Such a liner machine may form a bag from a roll of polyethylene film or other product, automatically cut the film, and cuff the other edge of the bag around the to edge. The liner is intended to protect against any cross contamination of products placed into tote 116, provide a moisture containment barrier between products placed in tote and tote 116, aid case loading at the packing system 120, and add additional dunnage for extra product protection if the order is to be shipped. Placing liners in totes 116 also assists with handling of orders. Specifically, as products are placed in a lined tote 118, the liner unitizes the order so that the entire order can be moved by manipulation of the liner. Accordingly, assembled orders may be very easily transferred from a lined tote 118 to a case for shipping.

Returning to FIG. 1, a main line 132 may be defined as a transport conveyor configured to transport a tote from tote staging station 138 to a specific storage unit 110. Once tote as been delivered to a specific storage unit 110, a branch line 134 may transport the tote within the specific storage unit 110 to a picking position at a cell 111.

Conveyor system 130 further includes a transfer mechanism including diverters at junctions between individual conveyors. The diverters are operable to selectively direct objects on the conveyors, e.g. from a main line 132 to a specific branch line 134, such that a specific path may be defined between arbitrary locations within conveyor system 130 by operation of the diverters. Diverters may also be employed to divert between multiple main lines 132. For example, a path may be defined from tote staging station 138 to a first cell 111 in a first storage unit 110 to a second cell 111 in a second storage unit 110, etc. Main lines 132 and branch lines 134 can include multiple sub-conveyors positioned at different vertical heights (in the z dimension), and vertical actuators or elevators configured to lift a tote from one sub-conveyor to another.

Responsive to an order received, conveyor system 130 is operable to transport totes via main lines 132 and branch line 134 to picking positions for cells 111 corresponding to items in the order. Once the tote has been transported to all necessary cells 111, the tote is delivered to the packing system 120. The order packing system 120 is configured to erect a case having specified dimensions for the specific order, pack the order, then insert packing materials (also known as 'dunnage'), seal and label the erected case for shipments.

Order Packing System

Figure 11:
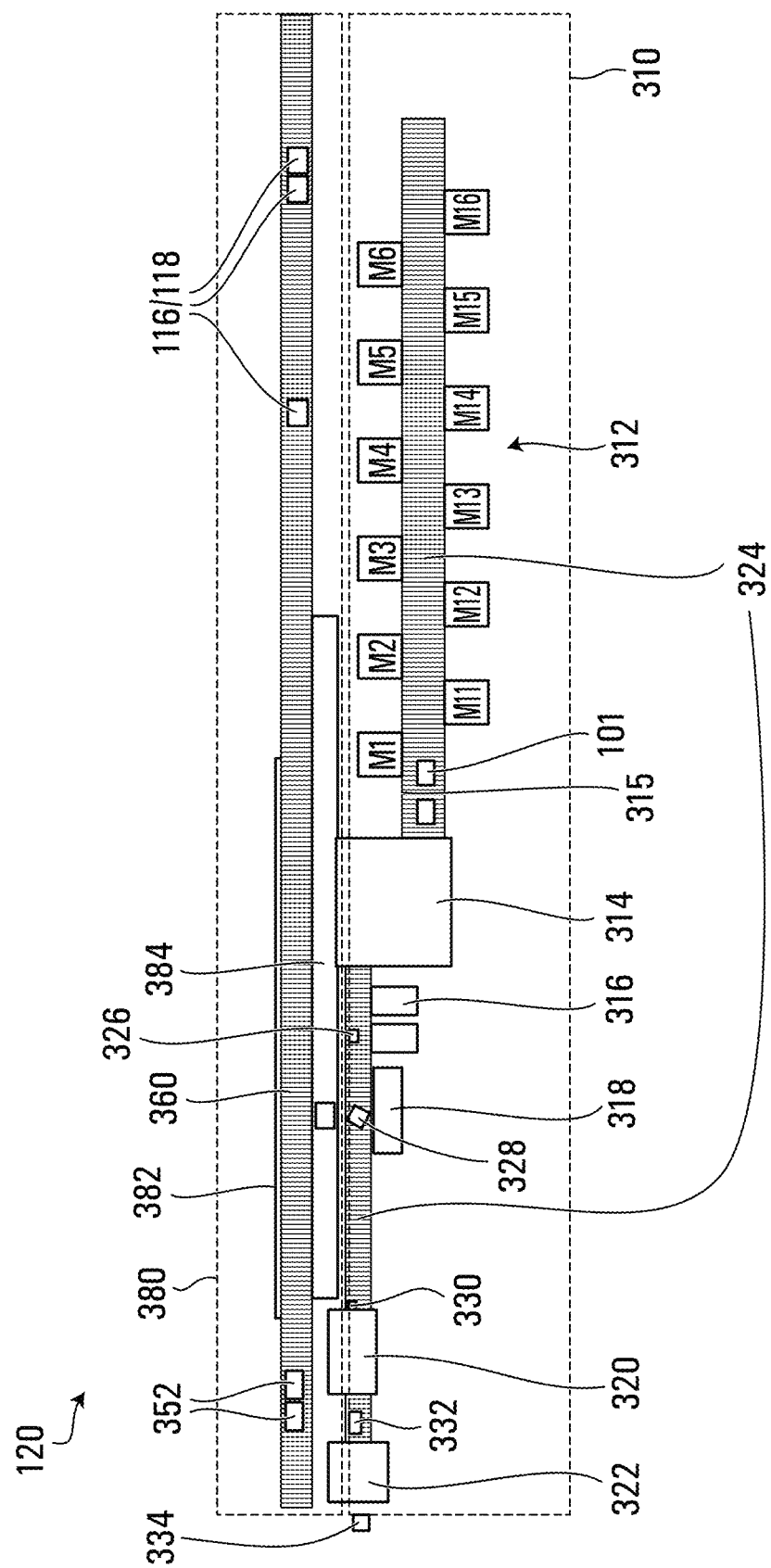
FIG. 11 is a packing cell in a warehouse system for fulfilling orders.

Turning to FIG. 11, an example of an order packing system 120 is depicted. The order packing system 120 comprises a random case erector 314, an order staging subsystem 380 and a packing cell 310. Although a single packing cell 310 is shown, embodiments may include multiple packing cells.

Order staging subsystem 380 carries a sequence of individual orders of products to be packaged and shipped. In the depicted example, each order of products is held in a container such as the tote 116 or a lined tote 118, e.g. a reusable bin. Order staging subsystem 380 transports orders of products from the tote transportation conveyor system 130 to a packing station 318 at which products may be packed for shipping. Specifically, order staging subsystem 380 comprises a tote conveyor 382 for carrying totes 116 or lined totes 118 to a packing station 318 and carrying out, from the packing station 318, empty totes 352. In the depicted example, a branch conveyor 384 is provided, onto which filled totes 116 may be diverted for packing at packing cell 310.

The tote conveyor 382 according to some embodiments may be a series of sub-conveyors. The conveyor has multiple input and output points such that totes 116 or lined totes 118 may be introduced to or removed from the conveyor at multiple locations. An exchange mechanism including one or more diverters may be provided, such that a path for each tote 116 or lined totes 118 may be defined by selectively operating the mechanism. The tote conveyor 382, according to some embodiments, may be configured to orient or tilt a filled tote 116 or lined totes 118 to a specific angle.

The packing cell 310 comprises a plurality of case blank magazines 312, random case erector 314, a dunnage dispenser 316, a packing station 318, a case sealer 320, and a label station 322. These components of the packing cell 310 are connected by a case conveyor 324.

Multiple case blank magazines M1-M16 may be present, containing a plurality of case blanks 101 of different types. Although the depicted embodiment illustrates sixteen magazines M1-M16, more or less may be employed. Each magazine M1-M16 may contain case blanks of a single type, and each type of case blanks may have different dimensions or other properties (such as thickness or material). Random case erector 314 receives an individual blank 101 from case blank magazine M1-M16 by way of case conveyor 324, and forms erected cases in a manner as will be described in relation to later figures.

Blanks may be released from magazines M1-M16 along case conveyor 324 in a defined order, so that cases can be erected in a sequence corresponding to a sequence of orders.

According to some embodiments, random case erector 314 is configured to construct a sequence of cases of different sizes, from the blanks of different sizes based on control instructions. Case erector may if necessary, modify its construction mechanism as will be described in relation to later figures to construct the case to said size.

Erected cases are transported by case conveyor 324 to dunnage dispenser 316 to receive dunnage. Dunnage can be generally defined as packing material to protect products during shipping. For example, types of dunnage include bubble wrap, packing peanuts, paper or corrugated cardboard inserts. Dunnage dispenser 316 may include any mechanisms suitable for providing dunnage of one or more types. For example, dunnage dispenser 316 may include one or more of: rolls for dispensing wrap such as bubble wrap, or hoppers for dispensing particles such as packing peanuts. At dunnage dispenser 316, according to some embodiments, the type of dunnage, the length or amount of dunnage are selected, and the dunnage is dispensed into the constructed case.

Next, cases with dunnage 328 are transported by case conveyor 324 to the packing station 318 to become packed cases 330.

At packing station 318, products from a filled tote 116 or lined tote 118 at packing position 360 are removed from the tote and placed into the constructed case with dunnage 328. Products may be manually transferred from filled tote 116 to the constructed and dunned case 328 by a human operator, or automatically transferred by a suitable machine, or a combination thereof. In an example, the products may be transferred by a mechatronic system including a robotic arm.

After being packed at packing station 318, the packed cases 330 are transported by case conveyor 324 to sealing station 320 to be closed and sealed. Sealing station 320 is configured to control the selection, dispensing, and application of the sealing material. For example, a type of tape may be selected and applied to a case. Sealing station 320, according to some embodiments, may be a robotic articulated arm, or any other electromechanical device that can apply the seal to the box. According to some embodiments, sealing station 320 can include individual or combined electromechanical systems for dispensing of a sealing material and the application of the sealing material to a case.

Sealed cases 332 are transported by a case conveyor 324 to label station 322 to be labelled for shipment. Cases outputted from label station 322 are completed cases 334, ready for postal/courier distribution. The label station is configured to generate the shipping label, print the shipping label, and apply the shipping label. A shipping label can include information such as the postal address, and the method of shipping to be applied to the case. According to some embodiments, shipping information may be encoded in a barcode or any other encoded visual data structure. Label station 322, may be a robotic articulated arm, or any other electromechanical device that can apply the shipping label to the case. According to some embodiments, label station 322 can include individual or combined electromechanical systems for printing the shipping label and the application of the shipping label to a case.

The tote conveyer 382 and the case conveyor 324 are configured to deliver to the packing station 318 the totes and constructed cases in corresponding sequences. That is, a case may be selected for each order, based on the physical size or weight of the products in the order. As will be described in greater detail, the sequence of orders and cases presented at packing station 318 may be matched to one another such that a case that corresponds to the size of each order is brought to the packing station along with the tote containing that order.

Figure 12:
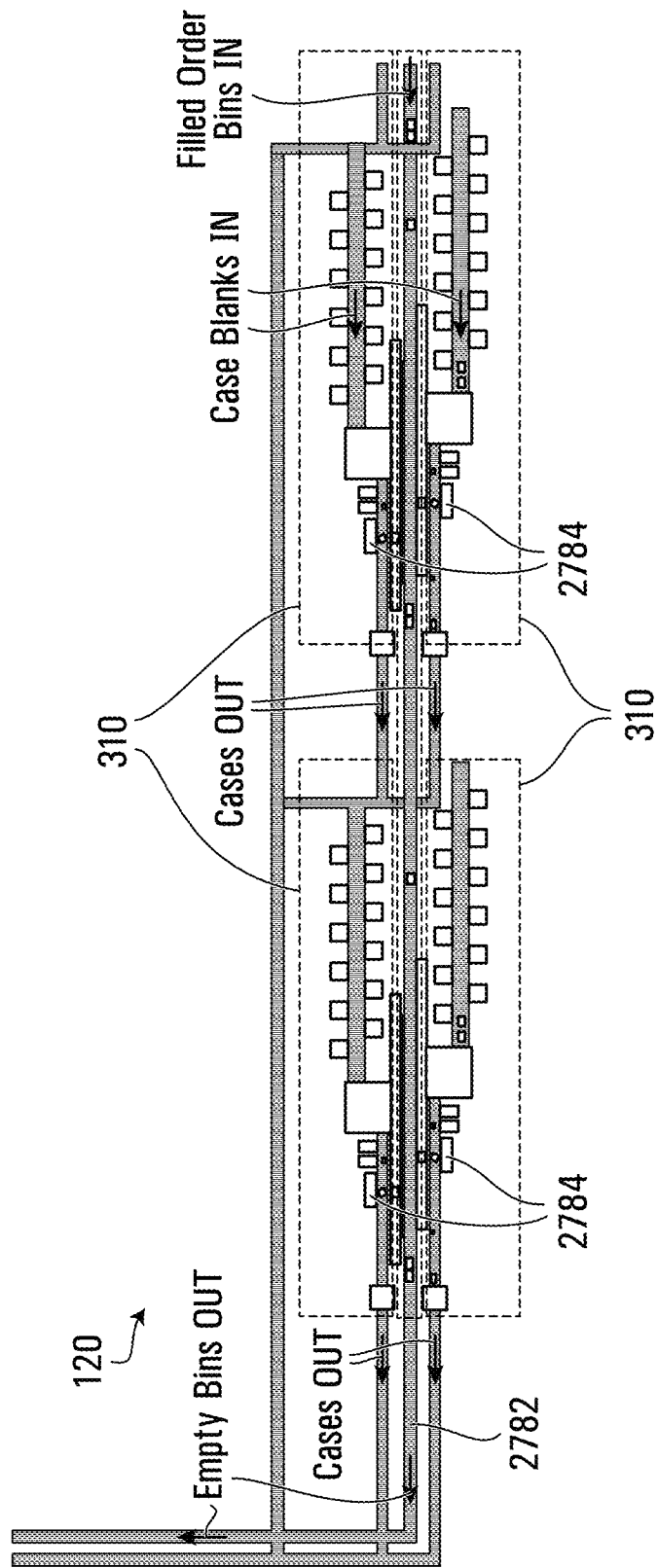
FIG. 12 is an example of an order packing system having multiple packing cells.

As shown in in FIG. 12, the order packing system 120 comprises four packing cells 310. Each packing cell 310 may contain the components as described in relation to FIG. 11. However, any number of packing cells may be present, subject to space and logistical limitations. As depicted, the four packing cells are commonly fed by a single order bin conveyor 2782. However, in other embodiments, multiple separate order bin conveyors may be provided.

Increasing the number of packing cells 310 may enable greater throughput of orders through the system. Further, the plurality of packing cells 310 may enable optimization through configuration of the individual packing cells. For example, when multiple packing cells 310 are present, a greater range of case and dunnage types and sizes may be accommodated. For example, certain packing cells 310 may only have case blanks 101 corresponding to smaller cases, to be used for totes that contain smaller products.

Order packing system 120, according to some embodiments, may further include branch conveyers 2784 to feed the various packing cells 310. The order packing system 120 and packing cell 310 may also use the branch conveyor 2784 and the order bin conveyor 2782 to transport the empty totes for reuse, and the case conveyor 2724 to transport the completed orders (i.e. with a constructed case from a selected blank, filled with dunnage and products, sealed and labelled) towards an output for delivery to a customer.

According to some embodiments, order bin conveyor 2782 may orient the totes at an angle for easy unloading of the contents from the tote. For example, totes may be oriented with an opening facing packing position 318.

Order packing system 120, branch conveyors 2784 and packing cells 310, may be controlled by a control system, which will be described in relation to later figures. For example, the control system may dictate any of the speed and position of orders and cases within the system, and the sequences of totes and cases that are presented at packing station 318 of any given packing cell. Control system may be implemented in any combination of programmable logic controllers (PLCs) and computing devices such as PCs. Each PLC associated with a particular packing cell 310 can form part of control system.

As shown, a sequence or queue of totes is formed on branch conveyor 384 by diverting totes from the tote conveyor 382. The sequence of totes are positioned so that the tote at the front of the sequence is located proximate packing position 360. Similarly, a sequence or queue of constructed cases is formed on the case conveyor 324 approaching the packing position 360. Each case in the sequence of cases corresponds to a filled tote 116 containing products. The size of the case constructed in the sequence of cases is based on the products in the corresponding filled tote 116.

Figure 13:
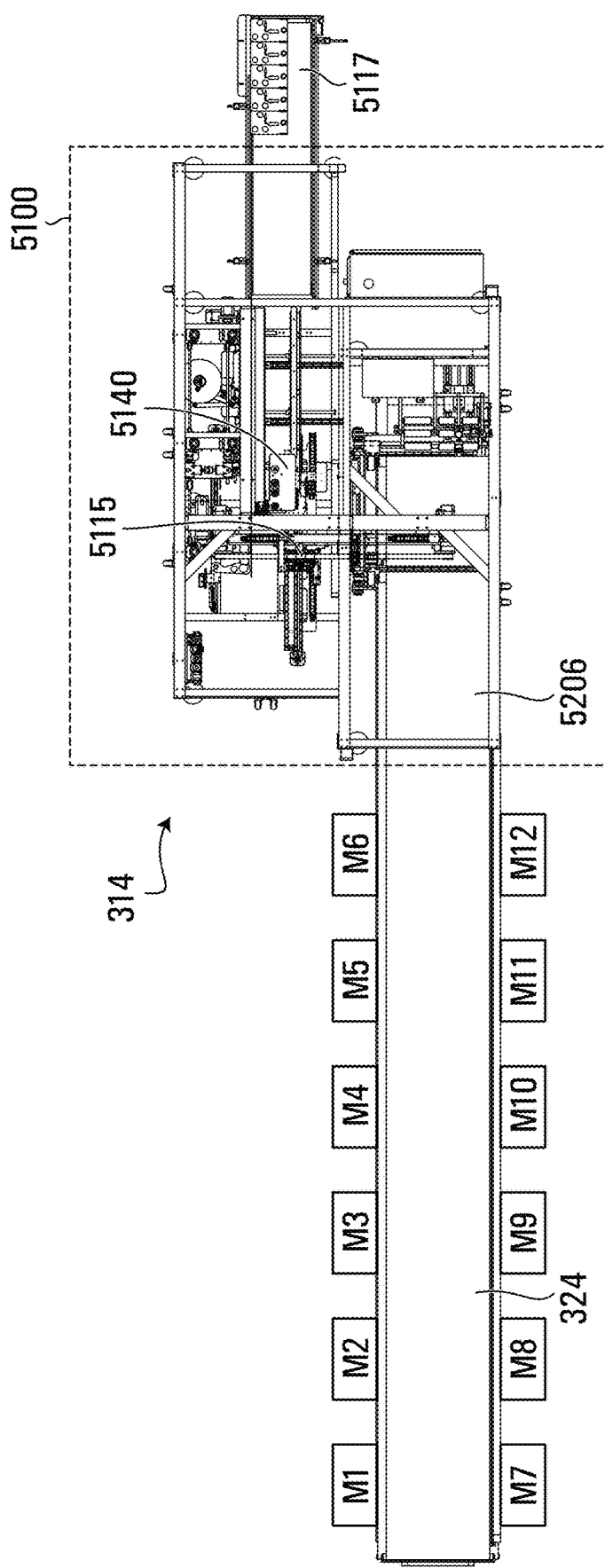
FIG. 13 is a top view of a random case erector used in the packing cell of FIG. 11.

FIG. 13 is a random case erector 314 used in the warehouse system of FIG. 1, within a packing cell 310. As illustrated, this random case erector 314 has 12 magazines M1-M12 feeding to case forming system 5100. Once the tote has been filled with all the order items according to specification, the tote is transported via the conveyor system 130 to the packing station 218. In the random case erector 314, a plurality of magazines M1-M12 may be supported by one or more frame structures above a common case conveyor 324. Magazines M1-M12 may be arranged in spaced longitudinal relation to each other vertically above case conveyor 324. Case conveyor 324 feeds an alignment conveyor 5206.

It may be observed in FIG. 13 that the overall configuration of random case erector 314 provides for a generally S-shaped path (or, if mirrored, a Z-shape) for case blanks through random case erector 314. More specifically, incoming blanks are conveyed on case conveyor 324 in a downstream X-axis direction to the case discharge conveyor 5117, to pick-up location. However, any other configuration (such as a C-shape) may be employed.

Figure 18:
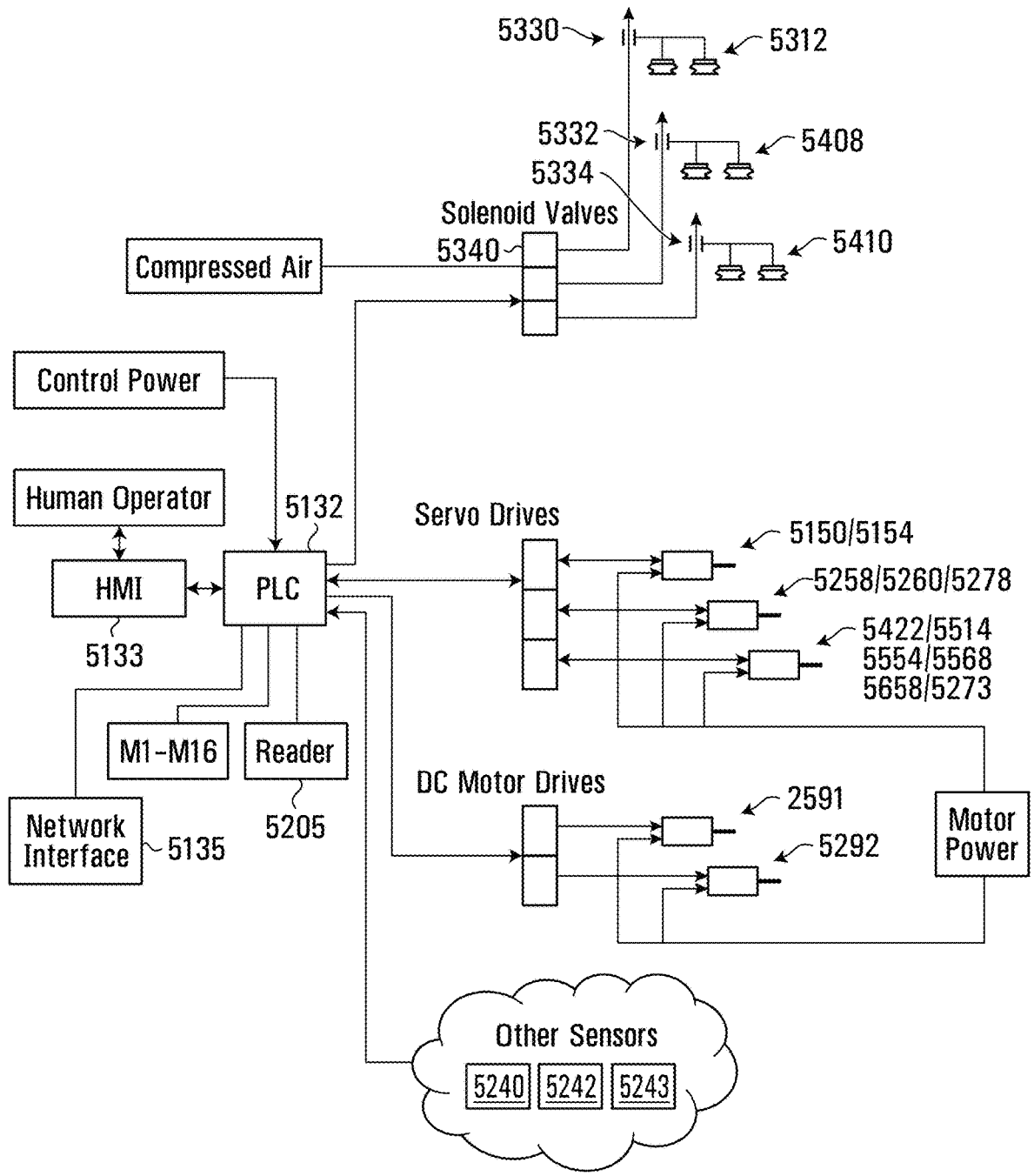
FIG. 18 is a schematic control diagram for the case erector system.

Magazines M1-M12 may each contain one or more stacks of product packaging, such as case blanks, with at least some and possibly each of the magazines M1-M16 containing different types/sizes and/or configurations of packaging/case blanks compared to other magazines. The size, configurations and types of case blanks (and the cases that can be formed therefrom) can vary to provide a range of case sizes, configurations and types that can be automatically processed by the random case erector 314 without the need for any manual intervention to modify any components of the system. A PLC 5132 (FIG. 18) of random case erector 314 may be programmed such that the particular dimensions/overall size/configuration (e.g. such as regular slotted case or "RSC")/type of each of the blanks held in each one of the magazines M1-M12 is stored in the memory of the PLC 5132 (FIG. 18).

Each magazine M1-M12 may provide a vertical stack of case blanks above case conveyor 324 and be operable to dispense single case blanks on demand under the control of PLC 5132 (FIG. 18), in a flattened orientation onto case conveyor 324. An example arrangement of a suitable type of vertical case dispensing magazine, is the magazine that forms part of the 310E case erector made by Wepackit Inc. of Orangeville, Ontario, Canada (http://www.wepackitmachinery.com/310E/310E.pdf).

PLC 5132 (FIG. 18) may give an instruction to form a case, and if required, PLC 5132 (FIG. 18) may cause one of magazines M1-M12 to dispense a blank of an appropriate configuration/size onto case conveyor 324 for delivery to alignment conveyor 5206. PLC 5132 (FIG. 18) is able to selectively move and transfer a single blank at a time onto case conveyor 324 from any one of magazines M1-M12. Therefore, separate individual case blanks may be fed in series and longitudinally in a desired sequence by case conveyor 324 to alignment conveyor 5206. The particular sequence/order of case blanks that are placed onto case conveyor 324 of random case erector 314 may be determined and selected by PLC 5132 (FIG. 18) or another control system as described hereinafter, such that case blanks may arrive at alignment conveyor 5206 in such a desired sequence in which it is desired to process the blanks within random case erector 314.

PLC 5132 (FIG. 18) may maintain in its memory, each available blank 111 size, the quantity of blanks 111 in each magazine M1-M16, and the dimensions of each available blank 111. Additionally, PLC 5132 may store a sequence of cases to construct, in the form of a queue.

Once transferred from case conveyor 324 to alignment conveyor 5206, the alignment conveyor 5206 may then under the control of PLC 5132 (FIG. 18) move each blank sequentially to a packing location.

A sensor (not shown) such as an electronic eye model 42KL-D1LB-F4 made by ALLEN BRADLEY, may be positioned and operable to detect the presence of the front edge of a blank as each blank approaches the end of case conveyor 324 and start of alignment conveyor 5206. Upon detecting the front edge, sensor may send a digital signal to PLC 5132 (FIG. 18) signalling that a particular blank (the size/configuration/type of which PLC 5132 (FIG. 18) is aware) has moved to a position where alignment conveyor 5206 can start to move. PLC 5132 (FIG. 18) can then cause the motor for alignment conveyor 5206 to be activated to move the blank downstream. In this way, there can be a "hand-off" of each blank from case conveyor 324 to alignment conveyor 5206.

Once the rear edge of each blank passes the sensor, a signal may be sent to PLC 5132 (FIG. 18) which can then respond by sending a signal to shut down the motor driving case conveyor 324. Case conveyor 324 is then in a condition to await a further signal thereafter to feed the next blank in the series of blanks on case conveyor 324 to alignment conveyor 5206. Meanwhile random case erector 314 can be operated to move the blank on alignment conveyor 5206 to the packing location.

Optionally, and as in the system described above, in random case erector 314, PLC 5132 (FIG. 18) may verify that the type/size/configuration of the case blank at the pick-up location matches the expected case blank. For example, the top surface of each case blank may include a bar code identifying its type/size/configuration, and this bar code may be read at the pick-up location by a suitably positioned bar code reader. The type/size/configuration of the case blank read from this bar code may be compared to the expected type/size/configuration of case blank, which may be determined from a record of the next scheduled case blank stored in memory of the PLC, as described above. Verification is successful when there is a match. When there is not a match, PLC 5132 (FIG. 18) may issue a signal requesting manual operator intervention.

Figure 14:
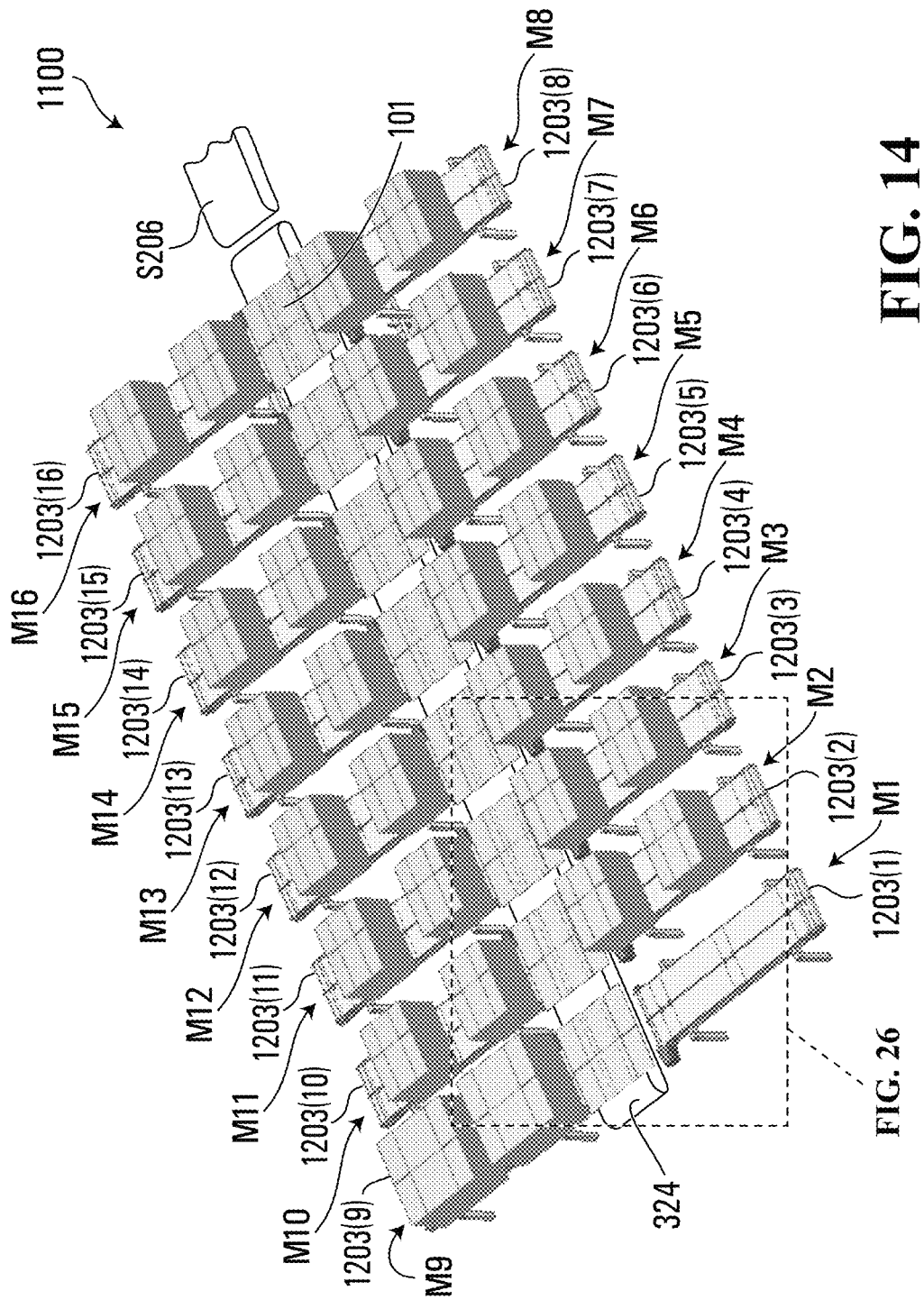
FIG. 14 is an isometric view of a plurality of magazines used in the random case erector of FIG. 13.
Figure 15:
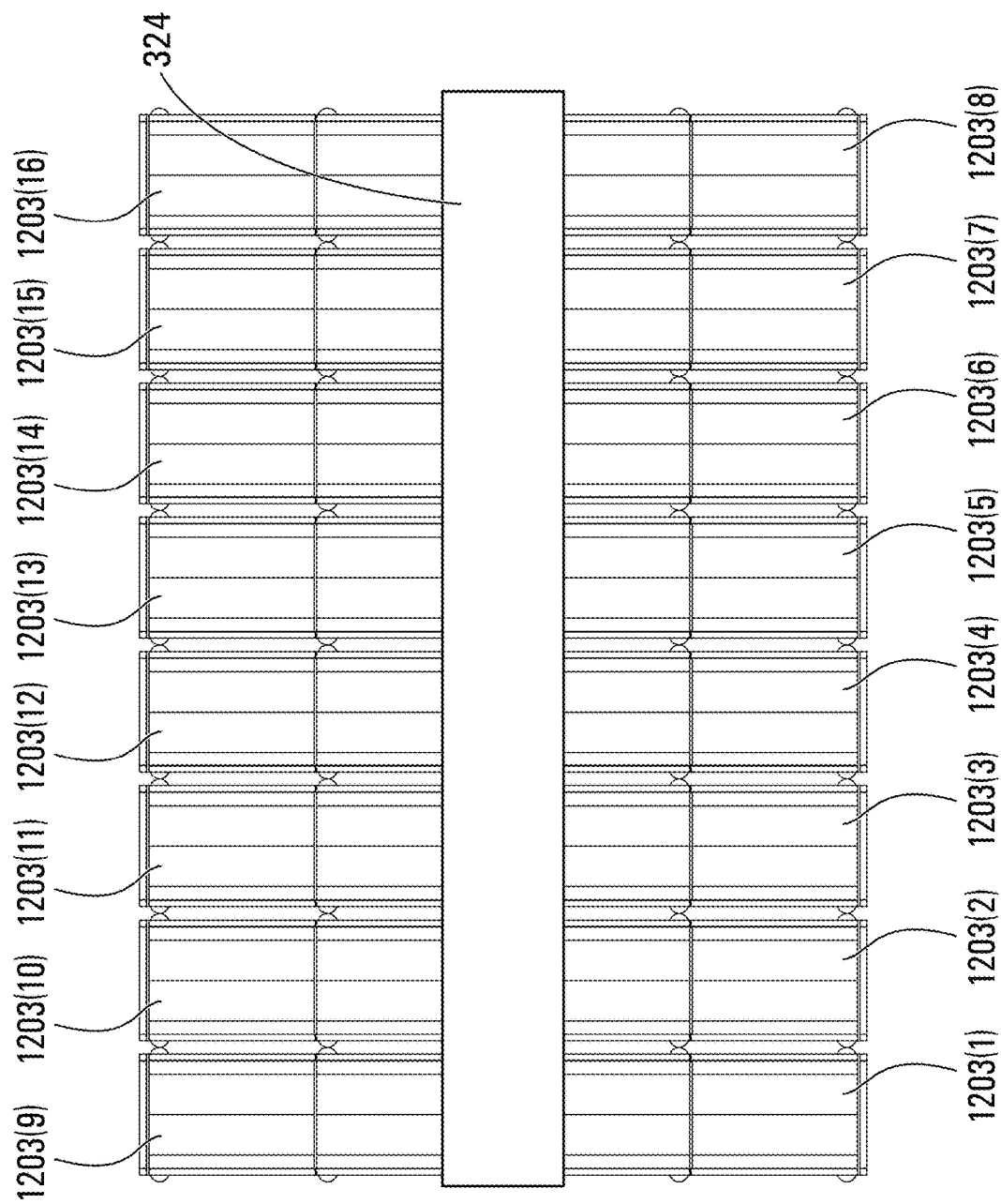
FIG. 15 is a top view of a plurality of magazines used in the random case erector of FIG. 13.

FIGS. 14 and 15 illustrate the input end a plurality of magazines M1-M16 that may be configured to feed to a common case conveyor 324. The case conveyor 324 feeds to alignment conveyor 5206. Alignment conveyor 5206 is configured to output a blank to a case forming system, which will be described in relation to later figures.

A sensor (not shown) may be provided in at each magazine M1-M16 to monitor each supply of blanks 101. Sensor may be operable to send a warning signal to PLC 5132 (FIG. 18) that can alert an operator that the magazine is low and needs to be replenished. The sensor may be a part number 42GRP-9000-QD made by Allen Bradley.

Figure 16:
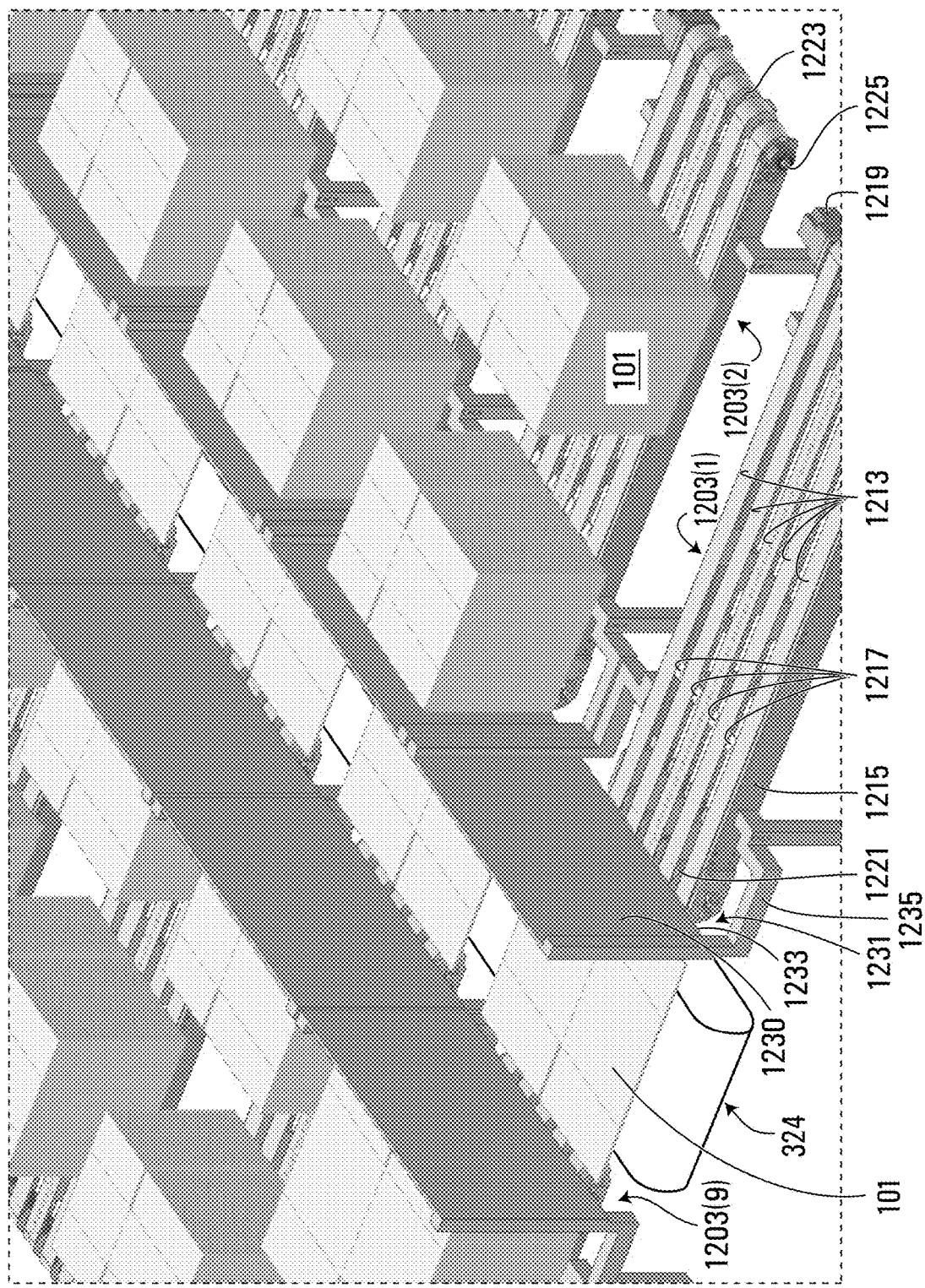
FIG. 16 is a detailed isometric view of a blank conveyor used in the random case erector of FIG. 13.

With reference now to FIG. 16, by way of representative example of the construction of a magazine, magazine conveyor 1203(1) may include a frame 1215 that supports five, generally parallel, and spaced continuous belts 1213 that may be made of any suitable flexible material such as Ropanyl. The belts 1213 may each extend between rotatable idler wheels 1221 mounted on a freely rotatable shaft and rotatable drive wheels 1223. Drive wheels 1223 may be mounted for rotation with and to a common drive shaft 1225 of a servo motor 1219 that may be interconnected via and in communication with a servo drive to the PLC 5132 (FIG. 18) of case forming system 5100. Conveyor belts 1213 may each have an upper belt portion that together may support one or more stacks of blanks 101 thereon. PLC 5132 (FIG. 18) may give an instruction to form a case, and if required, PLC 5132 (FIG. 18) may cause upper belt portion of belt 1213 to move towards case conveyor 324 by operation of servo motor 1219 rotating drive wheels 1223. In this way belt 1213 can, if necessary, move a blank 101 to a position adjacent to the case conveyor 324.

Positioned proximate the end of each magazine conveyor 1203 adjacent case conveyor 324 may be a vertically and longitudinally oriented plate. Each plate 1230 may be supported by a plurality of plate support members 1235 that may be part of frame 1215. A lower longitudinally extending edge 1233 of plate 1230 may be positioned so that only the bottom blank in a stack of blanks (i.e. the blank that is immediately above the upper portions of the belts) can pass through a slot provided beneath lower edge 1233 of plate 1230 and the horizontal plane formed by the upper surface of the upper portions of the belts 1213. In this way, a slot 1231 can be provided that can permit a single blank at a time from the bottom of the stack to be pushed transversely through the slot and onto the case conveyor 324.

A pushing mechanism may be provided to respond to signals from PLC 5132 (FIG. 18) of the case former to push a blank in a magazine from the bottom of the stack though the slot 1231 and onto case conveyor 324. The pushing mechanism may be any suitable type of device and may for example include a plurality of lugs 1217 located in the spaces between belts 1213. The lugs may be driven in a cyclical path by a common type crank mechanism (not shown) that may include a common pneumatic or hydraulic cylinder with a piston controlled by PLC 5132 (FIG. 18) by activating appropriate valves to suitably control the flow of pressurized air/hydraulic fluid to the cylinder. The cylinder may have a piston arm attached to a longitudinally oriented bar member that may be mounted for rotation. The crank mechanism may be configured to provide a path for the lugs 1217 that commences in a position behind the bottom blank in a stack, then moves transversely between the belts 1213 while engaging the rear side edge of the bottom blank thereby pushing the bottom blank through the slot 1231. Once the crank mechanism reaches the end of the stroke, the lugs 1217 will descend downwards beneath the stack of blanks and move transversely in an opposite direction back to the starting position, while at the same time not engaging the next bottom blank on the stack and passing beneath the stack. The path returns the lugs 1217 back to the start position so that when signalled by PLC 5132 (FIG. 18) to load another blank onto case conveyor 324, the operation can be repeated.

In summary, PLC 5132 (FIG. 18) can thus control motor 1219 and thus the movement of each conveyor 1203 as well as the movement of the lugs 1217, and thus is able to selectively move and transfer a single blank at a time onto case conveyor 324 from any one of magazines M1 to M16.

Therefore, in a multi-magazine system, separate individual case blanks may be fed in series and longitudinally by case conveyor 324 to alignment conveyor 5206. The particular sequence/order of case blanks that are placed onto case conveyor 324 of case forming system 5100 may be determined and selected by PLC 5132 (FIG. 118) such that case blanks may arrive at alignment conveyor 5206 in such a desired manner in which it is desired to process the blanks at least within case forming system 5100.

Further, PLC 5132 (FIG. 118) may maintain in its memory records of case blanks that have been placed onto case conveyor 324. For example, this information may include the type/size/configuration of the case blank and, where the case forming system 5100 includes a labeller, the label information to be applied to the case blank. A new record can be added each time a request for a new case is received and, optionally, records can be removed once a case has been formed (and labelled). Thus, such records may be organized and maintained in sequence in the memory of PLC 5132 (FIG. 18) using a conventional shift registering technique. In this way, the record for the next case blank scheduled to arrive at alignment conveyor 5206 may be provided at the output of the shift registers as that case blank arrives, and the type/configuration/size of that case blank and the label information for that case blank may be determined from the provided output.

The belt of case conveyor 324 may be driven by a suitable motor such as a DC motor or a variable frequency drive motor 2591/5292 (see FIG. 18) controlled through a DC motor drive (all sold by Oriental under model AXH-5100-KC-30) by PLC 5132.

Case Forming System

FIGS. 17A to 46 illustrate case forming system 5100. Case forming system 5100 may be used in the random case erector 314 at the packing station 120.

Figure 17A:
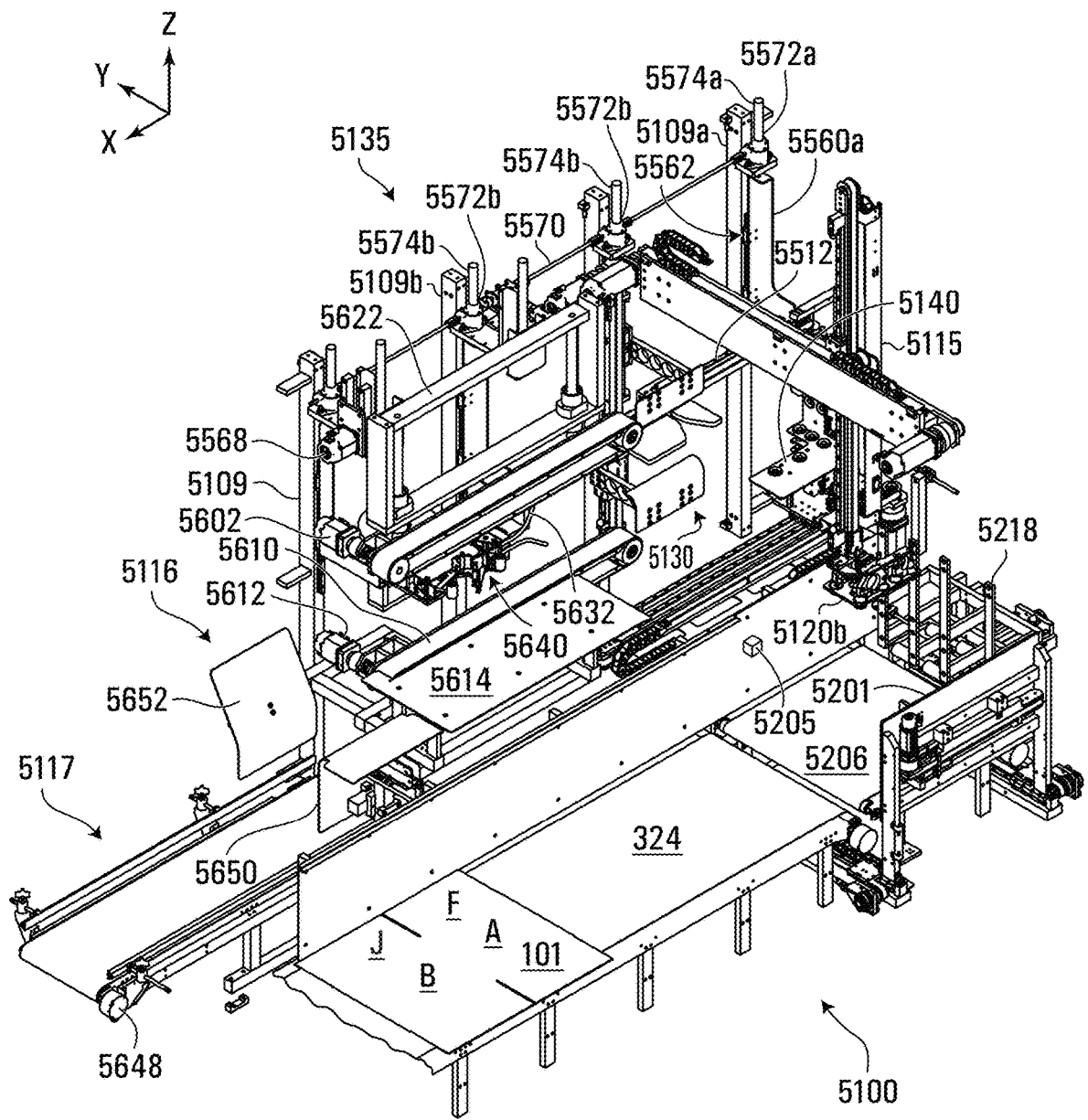
FIGS. 17A and 17B are top perspective views of a case erector system.
Figure 17B:
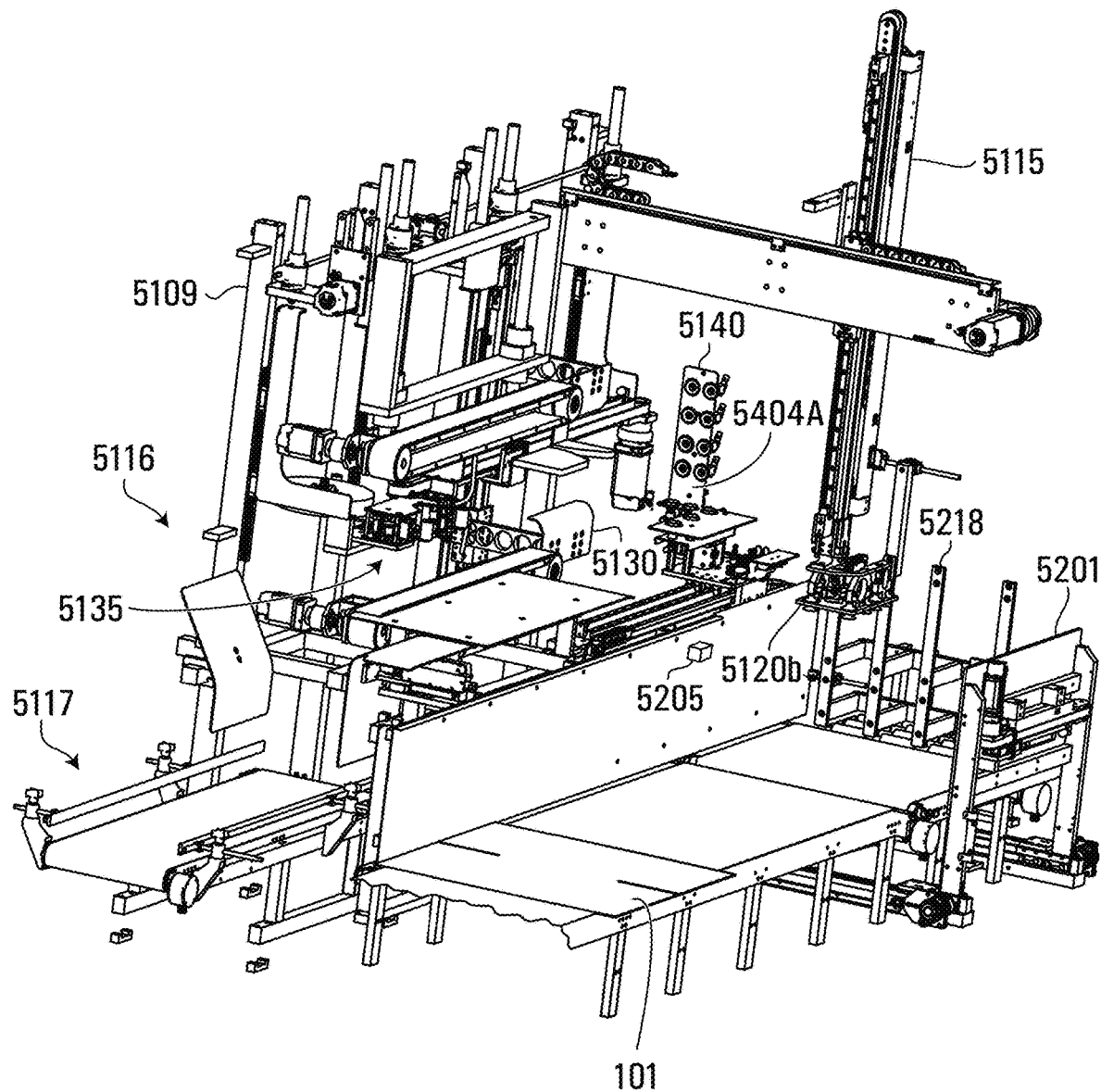

With reference initially to FIGS. 17A and 17B, a case forming system 5100 is illustrated. Case forming system 5100 may be connected to multiple magazines in a configuration as described in relation to FIGS. 13 to 16. Case forming system may receive blanks 101 via case conveyor 324, at a pickup area. There, an end effector 5120 for retrieving the knock-down case blanks may pick up the blank 101 from the pick-up area and place the blank 101 on a shuttle 5140. As will be described hereinafter, the end effector 5120 and shuttle 5140 co-operate to manipulate the knock-down blanks in such a way as to erect them into sleeves.

Case forming system 5100 may also include a folding apparatus generally designated 5130, configured to fold one or more flaps of each sleeve, and a sealing station 5135 at which flaps of the cases are sealed. Case forming system 5100 may also include a case re-orienting station 5116 and a case discharge conveyor 5117 for receiving and moving cases away once they have been fully erected.

An example of a scheme for the power and data/communication configuration for system case forming 5100 is illustrated in FIG. 18. The operation of the components of case forming system 5100 may be controlled by a programmable logic controller ("PLC") 5132, which may receive instructions from or be integrated with a control server 600 for warehouse system 100. PLC 5132 may be accessed by a human operator through a Human Machine Interface (HMI) module 5133 secured to a frame 5109 (FIG. 17A) of the system. HMI module 5133 may be in electronic communication with PLC 5132. PLC 5132 may be any suitable PLC and may for example include a unit chosen from the Log ix 5000 series devices made by Allen-Bradley/Rockwell Automation, such as the ControlLogix 5561 device. HMI module 5133 may be a Panelview part number 2711P-T15C4D1 module also made by Allen-Bradley/Rockwell Automation. PLC 5132 may be in communication with other control components by way of a network interface 5135 for sending and receiving information and instructions. In some embodiments PLC 5132 may be implemented as a virtualized device, e.g. on a PC.

Electrical power can be supplied to PLC 5132/HMI 5133, and to all the various servo motors and DC motors that are described further herein. Compressed/pressurized air can also be supplied to the vacuum generators and pneumatic actuator through valve devices such as solenoid valves that are controlled by PLC 5132, all as described further herein. Servo motors may be connected to and in communication with servo drives that are in communication with and controlled by PLC 5132. Similarly, DC motors may be connected to DC motor drives that are in communication with and controlled by PLC 5132, again all as described further herein. Additionally, various other sensors are in communication with PLC 5132 and may (although not shown) also be supplied with electrical power.

Figure 19A:
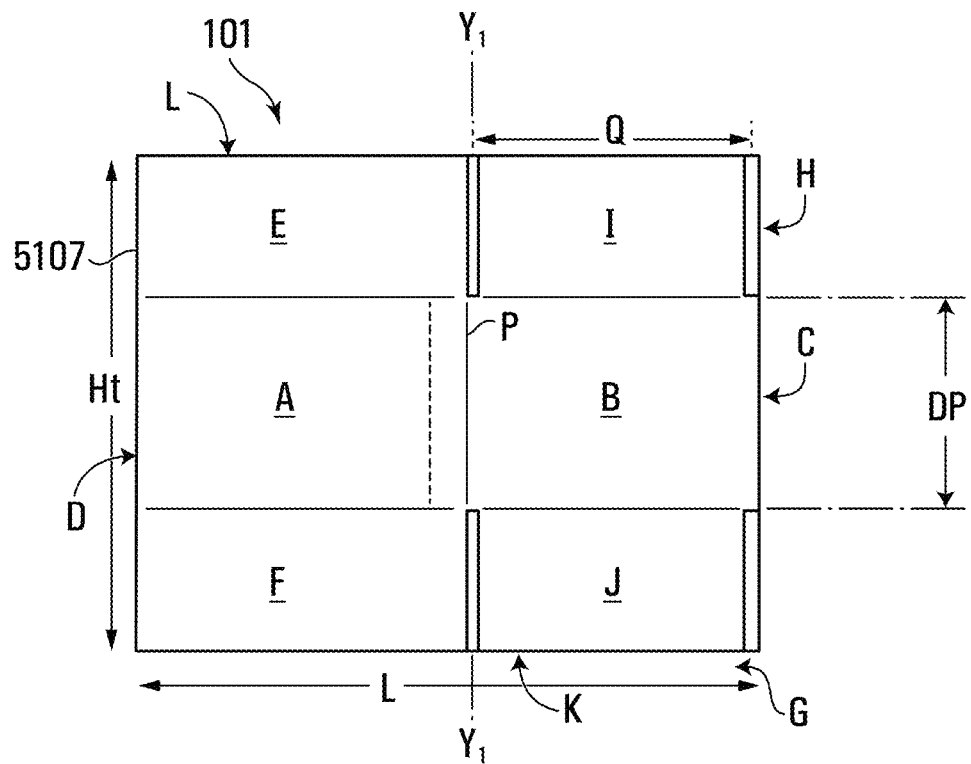
FIG. 19A is a plan view of one side of a knock-down blank that may be processed by the system.
Figure 19B:
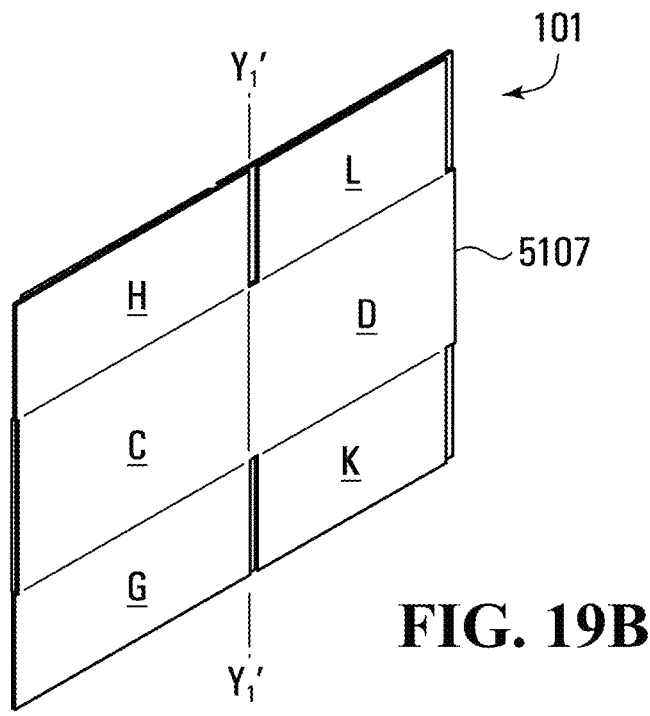
FIG. 19B is an isometric view an opposite side of the knock-down blank of FIG. 19A.
Figure 20:
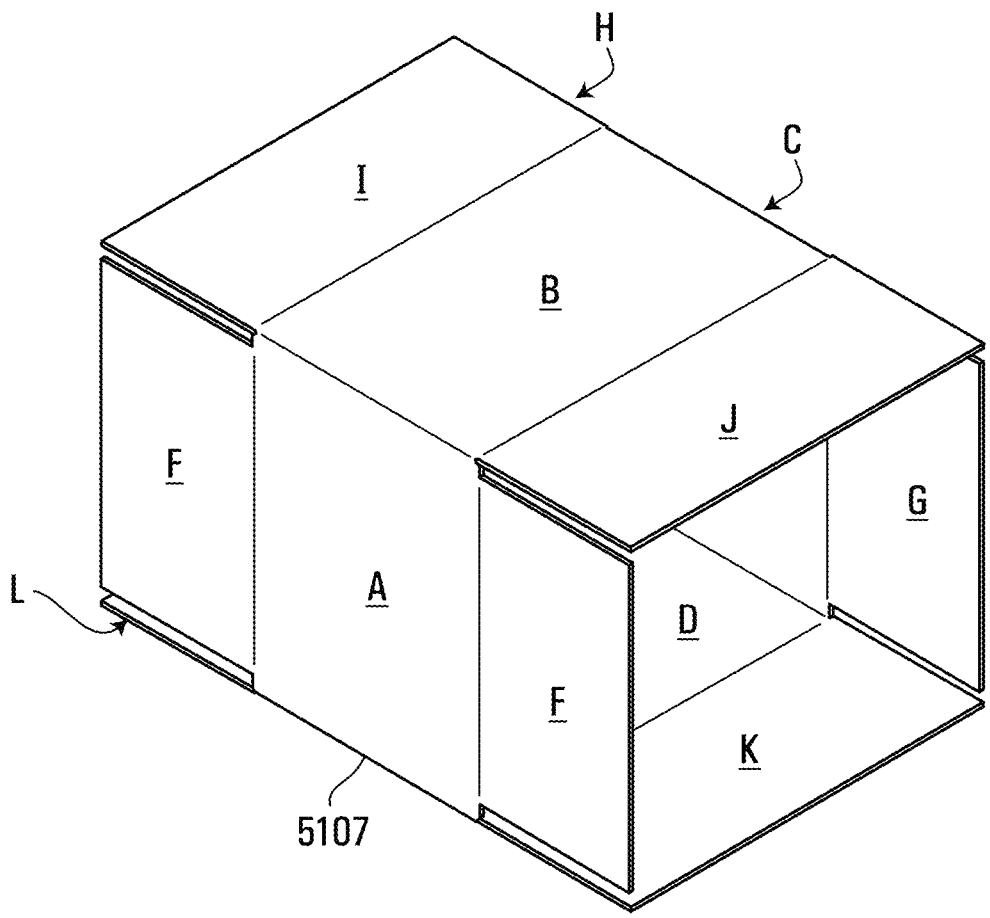
FIG. 20 is an isometric view of a case erected from the knock-down blank of FIGS. 19A and 19B.

With reference now to FIGS. 19A, 19B, and 20, an example of one kind of knock-down case blank 101 that can be processed by case forming system 5100 to form a regular slotted case (RSC) is disclosed. Other types of knock-down case blanks, and knock-down case blanks of different sizes can also be processed by case forming system 5100.

Each case blank 101 may be generally initially formed and provided in a knock-down configuration—i.e., a flattened tubular configuration—as shown in FIGS. 19A and 19B. Each blank 101 has a height dimension "Ht"; a length dimension "L"; and a major panel Length "Q" (see FIG. 19A). By inputting each of these three dimensions for a blank to be processed by case forming system 5100 into PLC 5132, PLC 5132 can determine if the case forming system 5100 can process that size blank without the necessity for manual intervention to make an adjustment to one or more components of the case forming system 5100. If PLC 5132 determines that the adjustment can be made without human intervention, the PLC may make the necessary adjustments to positions and/or movements of at least some of the components forming case forming system 5100.

Blank 101 may have opposed major side panels A and C integrally interconnected to a pair of opposed minor side panels B and D to form a sleeve, seen in FIG. 20, when opened. An overlap strip of case blank material may be provided between panel B and panel A that can be sealed by conventional means such as a suitable adhesive, to provide an overlapping seam joint in the vicinity of "P" (see FIG. 19A). This seam joint at the overlap forms a knock-down case blank in which the panels A, B, C and D are joined into a continuous blank that is of generally flattened tubular configuration, as shown in FIGS. 19A and 19B.

Also, as shown in FIGS. 19A, 19B and 20, are major and minor end flaps E, H, L, I that are provided at one end of the respective major and minor side panels A-D. A second set of major and minor end flaps F, G, K and J are provided on the opposite, lower/bottom end of the major and minor side panels A-D. However, in other embodiments, cases having other panel configurations can be formed. The panels and flaps are connected to adjacent flaps and/or panels by predetermined fold/crease lines as shown in FIGS. 19A and 19B. These fold/crease lines may for example be formed by a weakened area of material and/or the formation of a crease with a crease forming apparatus. The effect of the fold lines is such that one panel such as for example panel A can be rotated relative to an adjacent panel such as D or B along the fold lines. Flaps may also fold and rotate about fold lines that connect them to their respective panels.

As will be described hereinafter, case blank 101 may be transformed from a knock-down blank (i.e., a generally flattened tubular configuration) to an open sleeve (open tubular configuration) and the flaps may be folded and sealed to form the desired erected case configuration. Case forming system 5100 is configured to deliver each case with an upwardly facing opening suitable for top loading. In another embodiment, case forming system 5100 may be configured to deliver each case with a sidewards facing opening suitable for side loading.

Case blanks 101 may have flaps that provide material that can, in conjunction with a connection mechanism (such as for example with application of an adhesive, sealing tape or a mechanical connection such as is provided in so-called "Klick-Lok™" case blanks) interconnect flap surfaces, to join or otherwise interconnect, flaps to adjacent flaps (or in some embodiments flaps to panels), to hold the case in its desired erected configuration.

Case blanks 101 may be made of any suitable material(s) configured and adapted to permit the required folding/bending/displacement of the material to reach the desired configuration. Examples of suitable materials are chipboard, cardboard or creased corrugated fiber-board. It should be noted that the blank may be formed of a material which itself is rigid or semi-rigid, and not easily foldable but which is divided into separate panels and flaps separated by creases or hinge type mechanisms so that the case can be erected and formed.

Figure 32:
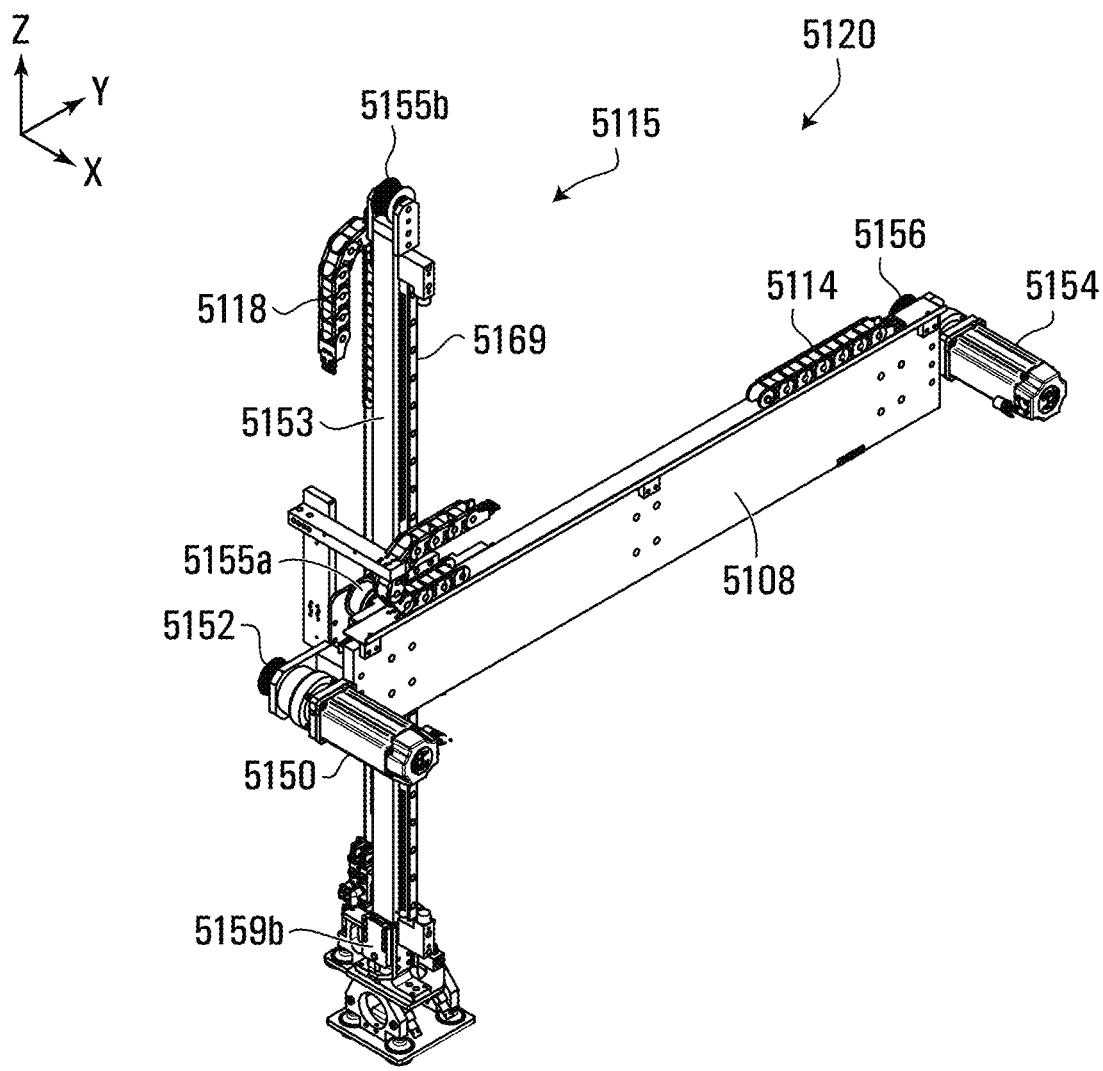
FIG. 32 is an isometric view of a sub-assembly of the random case erector of FIG. 13.
Figure 33:
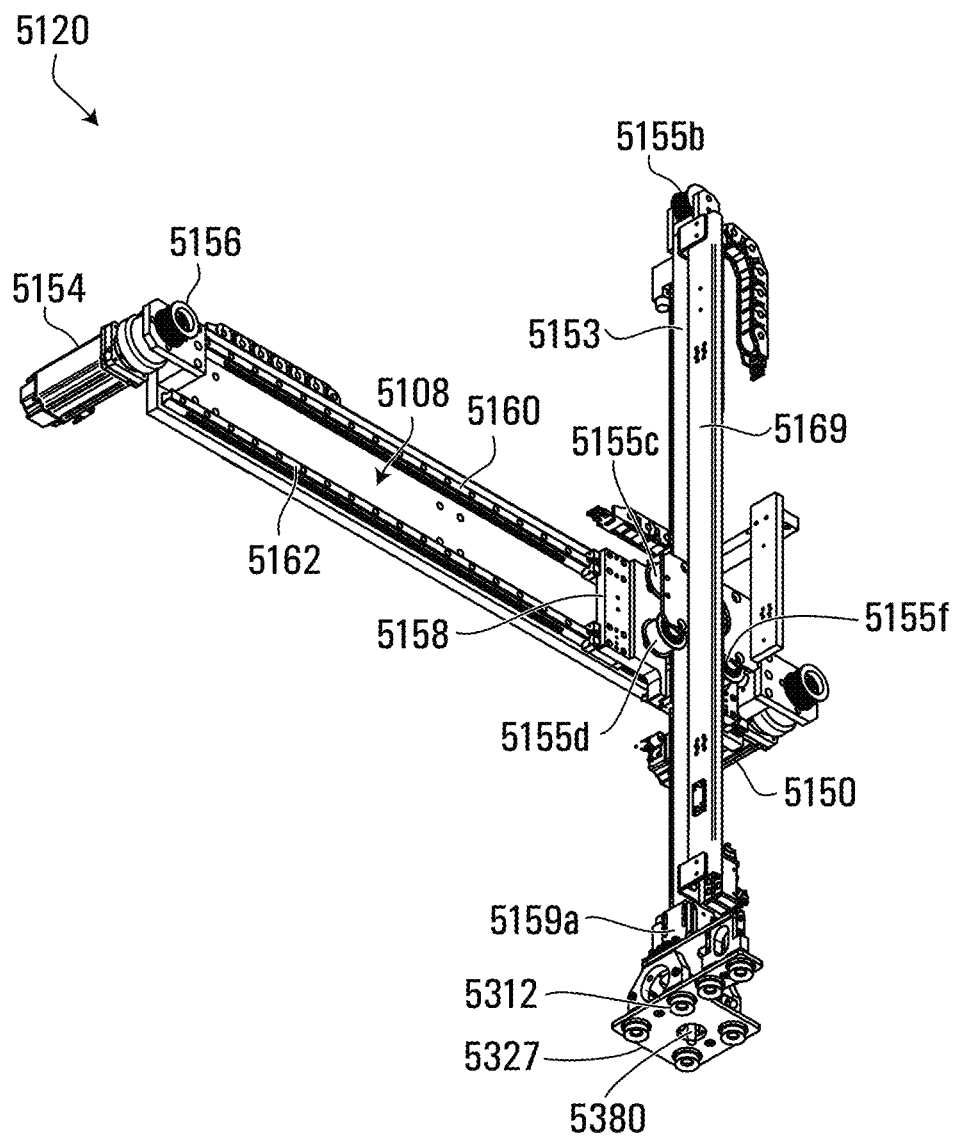
FIG. 33 is an isometric view of a sub-assembly of the random case erector of FIG. 13.

Turning to FIGS. 32 and 33, end effector 5120 has a dedicated, independently driven and controlled movement apparatus 5115 that allows end effector 5120 to move in a plane defined by both vertical axis Z and horizontal axis Y in FIG. 32. Thus, movement of the end effector 5120 can only be in the vertical Z and horizontal Y directions (i.e. directions parallel to axes Z and Y in FIG. 32)—the end effector cannot move in a horizontal X direction (i.e. a direction parallel to axis X in FIG. 32). If the movement of the end effector 5120 is restricted to only Z and Y directions, a moving apparatus can be constructed that is relatively less complex than if movement in all three directions is required.

Movement apparatus 5115 includes a vertically oriented support tube 5169 that may be generally rectangular in cross section to which end effector 5120 is mounted by mounting blocks 5190 so that end effector 5120 moves in space with support tube 5169.

The support tube 5169 is slidably mounted to a slide block 5158 for vertical movement and slide block 5158 is, in turn, mounted to a horizontal rail system for horizontal movement. More specifically, slide block 5158 has a pair of spaced, longitudinally and horizontally extending short inner blocks, each one fitting on one longitudinally extending rail 5160, 5162 that holds the blocks securely but allows blocks to slide horizontally relative to the rails. An example of a suitable rails system is the Bosch Rexroth ball rail system in which the rails are made from steel and the blocks have a race of ceramic balls inside allowing the block to slide on the rails. Rails 5160, 5162 are generally oriented horizontally are attached to a horizontally extending beam 5108 that is connected to frame 5109. Slide block 5158 may be mounted to rails 5160 or 5162 for horizontal sliding movement along the rails. Slide block 5158 has a rail system allow support tube 5169 to be connected to it so as to be able to move vertically relative to slide block 5158. More specifically, a rail extends vertically along a back surface of tube 5169 and is interconnected to a runner of slide block 5158. Again, a suitable rail system is the Bosch Rexroth ball rail system referenced above. Thus, support tube 5169 can slide vertically relative to slide block 5158 and will move horizontally with the slide block.

To drive the end effector 5120 horizontally and vertically, a drive apparatus is provided which includes a left side servo motor 5150 and a right side drive motor 5154 (both of which may be servo motors such as the model MPL-B330P-MJ24AA made by Allen Bradley) mounted to either end of beam 5108. Servo motor 5150 has a drive wheel 5152 and servo motor 5154 has a drive wheel 5156. Both servo motors 5150 and 5154 can be independently driven in both directions at varying speeds by PLC 5132 (FIG. 18) through servo drives. In this regard, both servo motors 5150 and 5154 may be provided with two separate ports, one for connection to a power line and the other for connection to a communication line to provide communication with the servo drive and PLC 5132. Servo motors 5150, 5154 may also have a third input which may provide input for an electric braking mechanism. It should be noted that all of the servo motors described herein may be similarly equipped.

Four freely rotatable pulley wheels 5155*a*, 5155*c*, 5155*d* and 5155*f* are secured to the front face of the slider block 5158 and a further freely rotatable pulley wheel 5155*b* is attached to the upper end of support tube 5169. One end of a drive belt 5153—that may for example be made from urethane with steel wires running through it—is fixedly attached to the bottom of support tube 5169 by a belt block 5159*b*. From there the belt extends upwardly to block pulley 5155*f*, around the upper side of block pulley 5155*f* and then horizontally to servo drive wheel 5152. The belt loops around the servo drive wheel 5152 and extends around the underside of pulley 5155*a* and then upwards to pulley 5155*b*. From there belt extends around pulley 5155*b*, downwards to block pulley 5155*c*, around block pulley 5155*c* and then to servo drive wheel 5156. After passing around servo drive wheel 5156, belt 5153 extends to the upper side of block pulley 5155*d*. From block pulley 5155*d*, belt 5153 then extends vertically downwards to the bottom of the support tube 5169 where it attached to the support tube by a belt block 5159*a*. With this arrangement, by adjusting the relative rotations of servo drive wheels 5152 and 5156 through the operation of the servo motors 5150 and 5154, the vertical position of support tube 5169 relative to slide block 5158 can be adjusted. Additionally, by adjusting the relative rotations of servo drive wheels 5152 and 5156, the horizontal position of slide block 5158 on rails 5160, 5162 can be adjusted thus altering the horizontal position of support tube 5169 and end effector 5120. It will thus be appreciated that by adjusting the direction and speeds of rotation of drive wheels 5152, 5156 relative to each other the support tube 5169 can be moved vertically and/or horizontally in space within the physical constraints imposed by among other things the position of the servo drive wheels 5152 and 5156, the length of the belt 5153, and the length of support tube 5169. The following will be appreciated in particular:

- If wheels 5152 and 5156 both remain stationary then the position of support tube 5169 will not be altered;
- If wheels 5152 and 5156 both rotate in the same clockwise direction and at the same speed relative to each other, then support tube 5169 (and thus end effector 5120) will move horizontally from right to left;
- If wheels 5152 and 5156 both rotate in the same counter-clockwise direction and at the same speed relative to each other, then support tube 5169 (and thus end effector 5120) will move horizontally from left to right;
- If wheel 5152 rotates counter-clockwise, and wheel 5156 rotates in opposite clockwise rotational directions, but both wheels rotate at the same rotational speed relative to each other, then support tube 5169, and thus end effector 5120, will move vertically downwardly;
- If wheel 5152 rotates clockwise, and wheel 5156 rotates in opposite counter-clockwise rotational directions, but both wheels rotate at the same rotational speed relative to each other, then plates 5164, 5166 will move vertically upwardly.

It will be appreciated that if the speeds and directions of the two servo motors are varied in different manner, then the motion of the support tube 5169 (and thus end effector 5120) can be created that has both a vertical component as well as a horizontal component. Thus any desired path within these two degrees of freedom (vertical in the Z direction and horizontal in the Y direction) can be created for support tube 5169—and thus for the end effector 5120 (such as a path having curved path portions). Thus, by controlling the rotational direction and speed of the servo motors 5150, 5154 independently of each other, PLC 5132 can cause support tube 5169 (and thus end effector 5120) to move along any path within these two degrees of freedom, within the physical constraints imposed by the spacing of the drive wheels 5152, 5156 and pulley wheel 5155*b*, and the bottom of support tube 5169.

An encoder may be provided for each of the servo motors 5150 and 5154 and the encoders may rotate in relation to the rotation of the respective drive wheels 5152, 5156. The encoders may be in communication with, and provide signals through the servo drives to PLC 5132. Thus PLC 5132 can in real time know/determine/monitor the position of the belt 5153 in space and thus will determine and know the position of the end effector 5120 in space at any given time. The particular types of encoders that may be used are known as "absolute" encoders. Thus the system can be zeroed such that due to the calibration of both encoders of both servo motors 5150 and 5154, the zero-zero position of the end effector in both Z and Y directions is set within PLC 5132. The zero-zero position can be set with the end effector at its most horizontally left and vertically raised position. PLC 5132 can then substantially in real time, keep track of the position of the end effector 5120 as it moves through the processing sequence for a blank 101.

Also associated with moving apparatus 5115 is a first, generally horizontally oriented caterpillar device 5114 and a second generally vertically oriented caterpillar device 5118. Each of the caterpillars 5114 and 5118 have a hollow cavity housing hoses and wires carrying pressurized air/vacuum and electrical/communication wires. Caterpillar 5114 allows such hoses and wires to move longitudinally as the support tube 5169 and erector head 5120b are moved longitudinally. Caterpillar 5118 allows such hoses and wires to move vertically as the support tube 5169 and erector head 5120b are moved vertically. The caterpillars allow hoses and wires to supply end effector 5120. In this way both pressurized air/vacuum and/or electrical communication wires may be brought form locations external to the frame 5109 onto the moving end effector 5120. An example of suitable caterpillar devices that could be employed is the E-Chain Cable Carrier System model #240-03-055-0 made by Ignus Inc. It should be noted that electrical communication between the PLC 5132 and the end effector 5120 could in other embodiments be accomplished using wireless technologies that are commercially available.

End effector 5120 has a bottom suction plate 5327 with a generally square shape and four peripheral flanged openings, each receiving a suction cup 5312. It should be noted that while many types of suction cups may be employed on the end effector, a preferred type of suction cup is the model B40.10.04AB made by Piab. Each suction cup 5312 is connected to an outlet from a vacuum generator 5330 (FIG. 18). The vacuum generator may be any suitable vacuum generator device such as for example the model VCH12-016C made by Pisco. Vacuum generators each have an inlet interconnected to a hose (not shown) that can carry pressurized air from an air compressor or other vacuum source to the vacuum generator. The vacuum generator converts the pressurized air supplied to the inlet port into a vacuum at one of the outlet ports. That vacuum outlet port is interconnected to a suction cup 5312 so that the suction cup can have a vacuum force. A solenoid valve device 5340 (FIG. 18) is interposed along the pressurized air channel running between each vacuum generator and the source of pressurized air. The solenoid valve device 5340 may for example be a model CPE14-M1BH-5L-⅛ made by Festo. Valve device 5340 is in electronic communication with PLC 5132 and controlled by PLC 5132. In this way PLC 5132 can turn on and off the supply of vacuum force to the suction cups 5312.

End effector 5120 also has a reciprocating sensor rod 5380 which, when not in contact with a case blank, extends downwards through a central aperture in plate 5327, below the level of the plane of suction cups 5312. When the end effector 5120 is brought vertically downwards to retrieve a blank 101, the erector head's movement just prior to suction cups 5312 contacting with the upper surface of the blank will be generally vertically downwards. Prior to the suction cups 5312 contacting the surface of a top panel of a blank, sensor rod 5380 will impact the top panel and cause sensor rod 5380, which may be resiliently displaced due to a spring mechanism biasing the rod downwards, to be pushed upwards. This movement upwards of sensor rod 5380 relative to plate 5327 will cause a sensor (not shown) to be activated and send a signal to PLC 5132. The sensor may be an inductive proximity sensor where a metal cylinder fixed on the rod is sensed by the sensor's circuitry due to changes in the inductance of an induction loop inside the sensor. Such a sensor may be an 871FM-D8NP25-P3 sensor made by ALLEN BRADLEY. When the PLC 5132 receives a signal from the sensor, it may respond to that signal by causing servo drive motors 5150 and 5154 to slow down so that the final few centimeters (e.g. 3.5 cm) of movement downwards towards contact between suction cups 5312 and the top panel of the blank occurs at a much slower rate. The sensor also allows the PLC to know how much further vertically downwards end effector 5120 must be lowered to establish proper contact between suction cups 5312 and the top panel of the case blank. It should also be noted that sensor rod 5380 and its associated sensor device can also be used to ensure that PLC 5132 is aware of whether, once a blank has been engaged, it remains engaged with the end effector 5120 until it is intentionally released.

Figure 34:
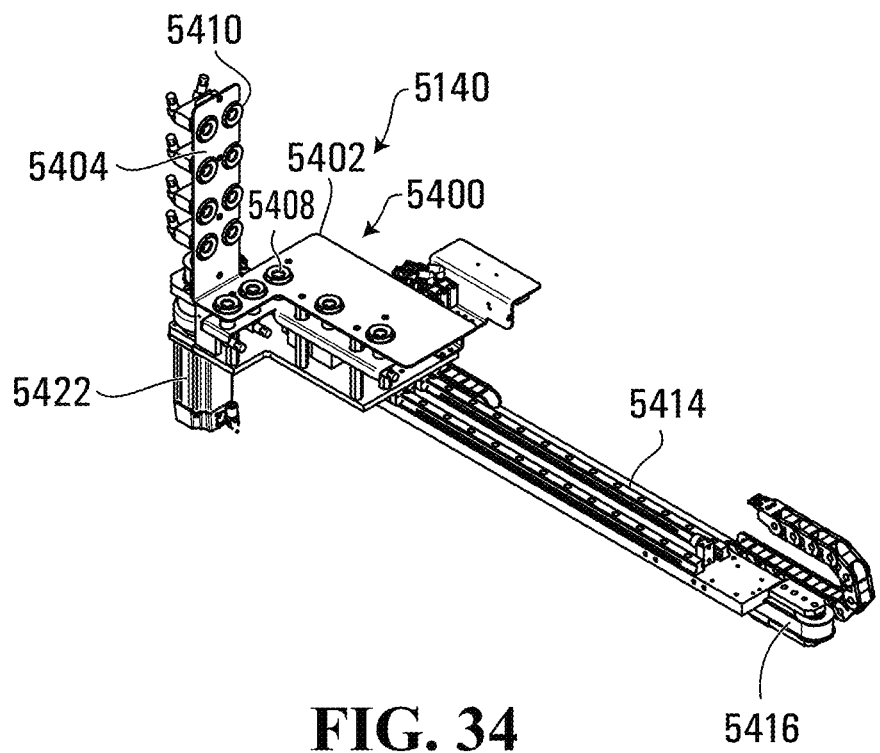
FIG. 34 is an isometric view of a sub-assembly of the random case erector of FIG. 13.
Figure 35:
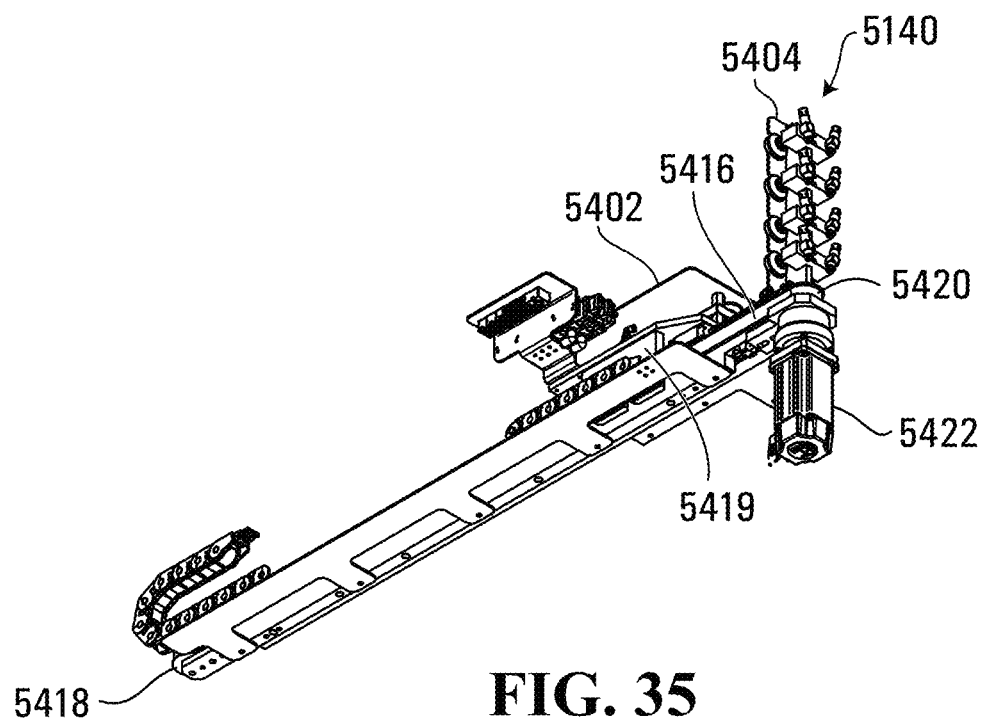
FIG. 35 is an isometric view of a sub-assembly of the random case erector of FIG. 13.

Turning to FIGS. 34 and 35, shuttle 5140 of case forming system 5100 has an L-shaped bed 5400 with a horizontally extending base 5402 and a vertically extending back wall 5404. The base has openings receiving suction cups 5408 which are coupled to a solenoid controlled vacuum generator 5332 (FIG. 18). Similarly, back wall 5404 has openings receiving suction cups 5410 coupled to a solenoid controlled vacuum generator 5334 (FIG. 18). The shuttle rides on a horizontal rail 5414 extending in the X-direction. Rail 5414 is supported on the factory floor. The shuttle has a depending belt block 5419 attached to an endless drive belt 5416. From the belt block, the drive belt extends along rail 5414 to free-wheel 5418 located at one end of rail 5414, around the free-wheel 5418 and back along the rail 5414 to the its other end where the belt passes around drive wheel 5420 of a servo motor 5422 and then returns along the rail 5414 again to the belt block 5419. Given this arrangement, operating the servo motor in a counter-clockwise direction will move the shuttle in a downstream direction (toward the free-wheel 5418) and operating the servo motor in a clockwise direction will move the shuttle in an upstream direction (toward servo motor 5422).

Figure 36:
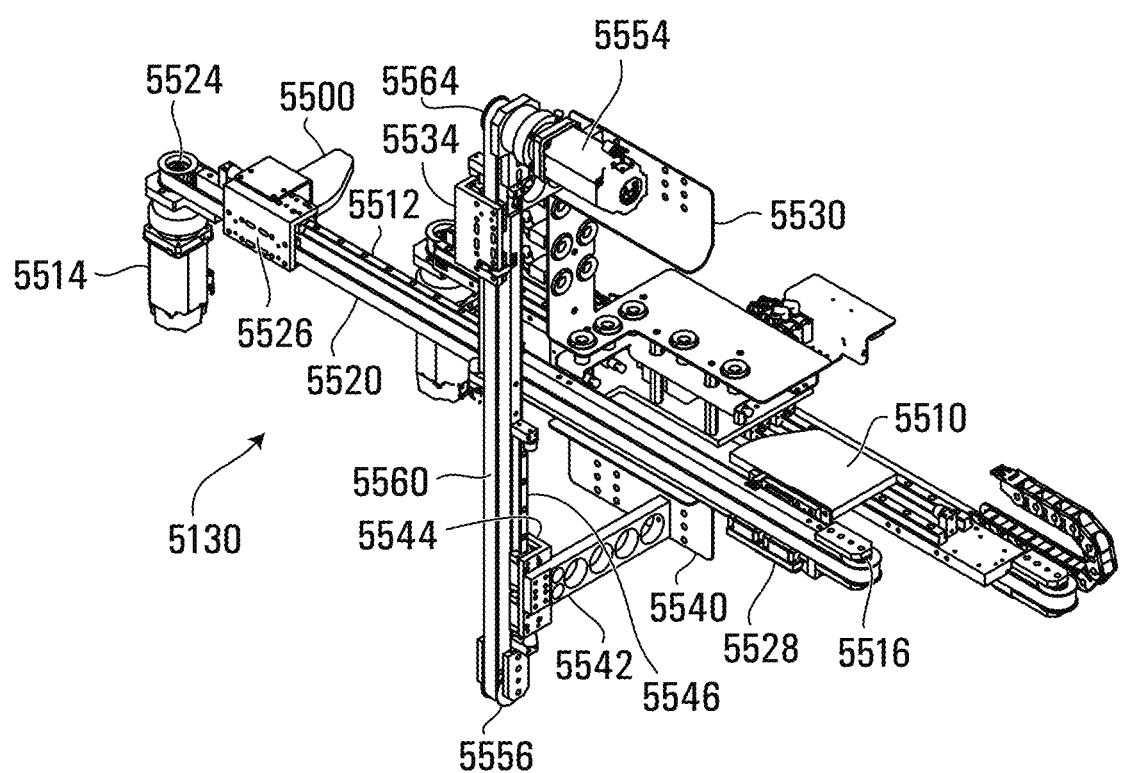
FIG. 36 is an isometric view of a sub-assembly of the random case erector of FIG. 13.
Figure 37:
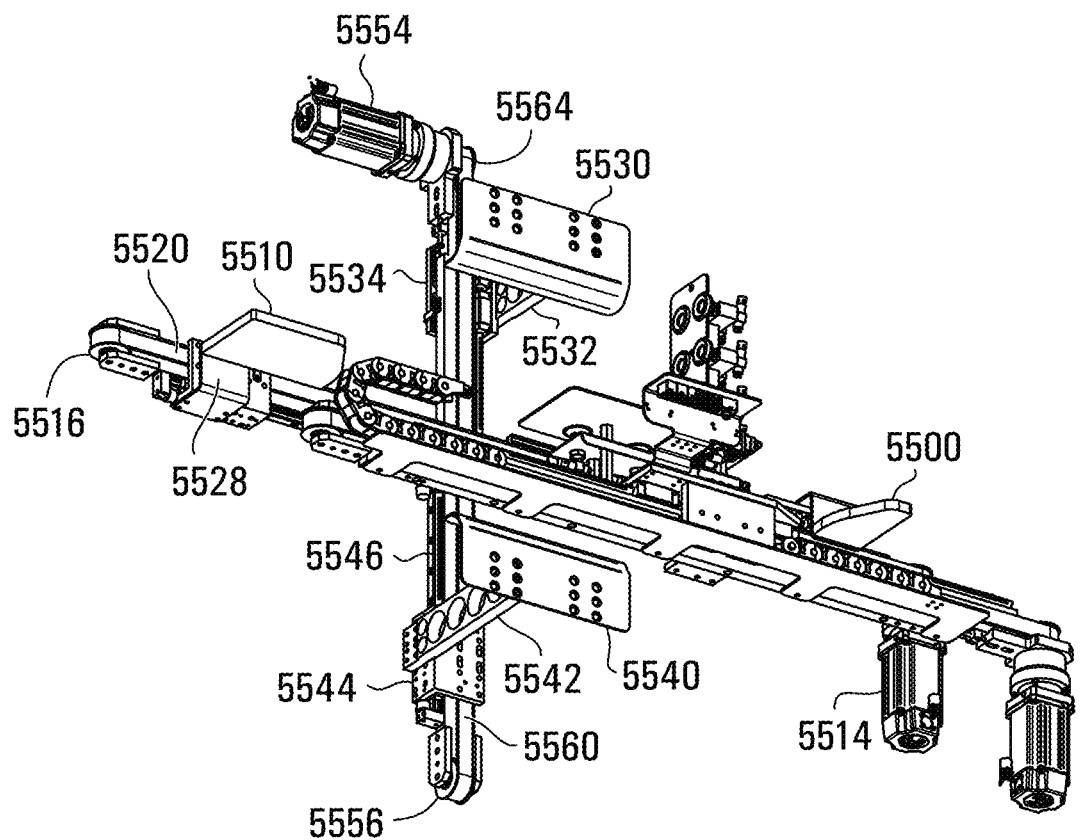
FIG. 37 is an isometric view of a sub-assembly of the random case erector of FIG. 13.
Figure 45:
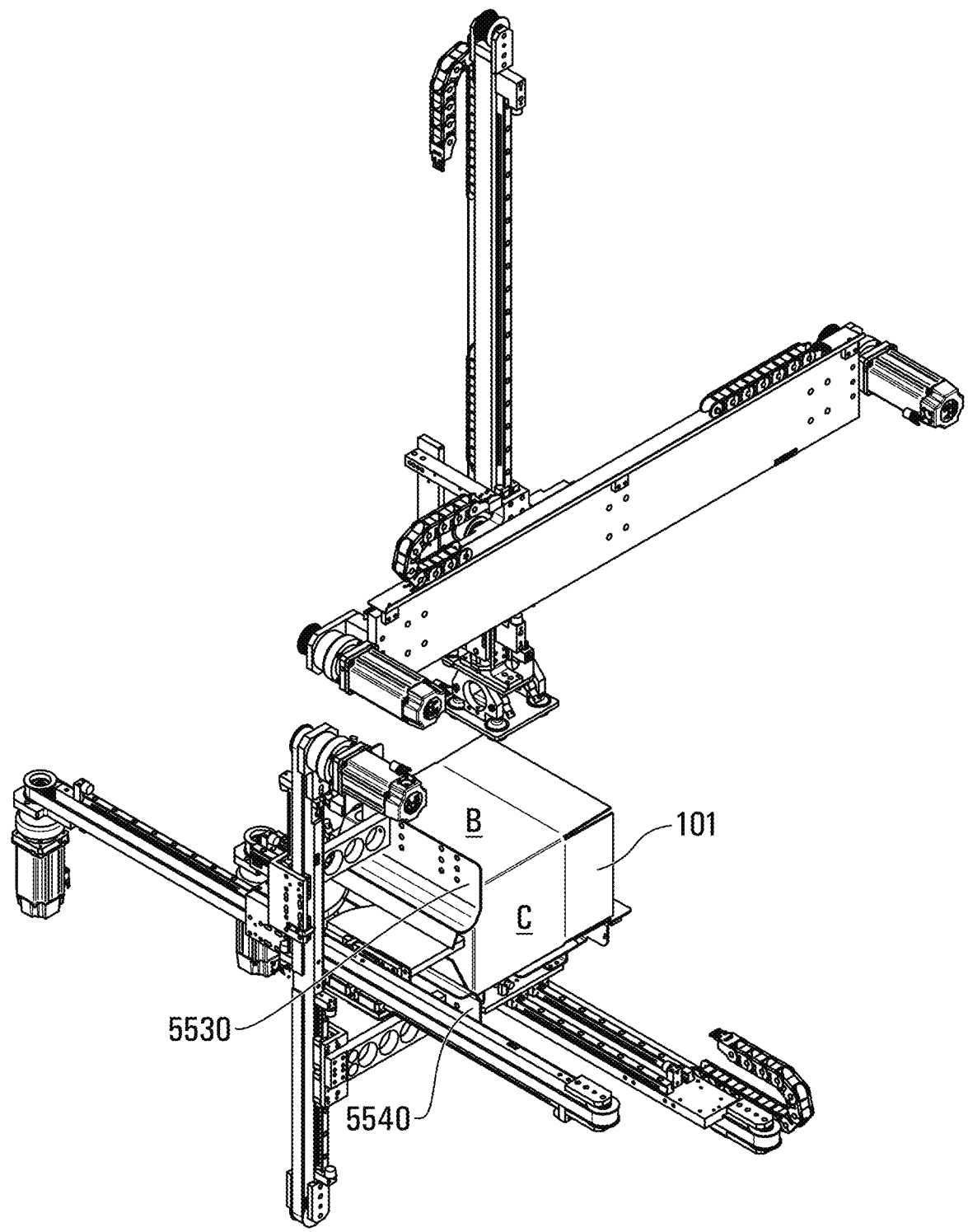
FIG. 45 is an isometric view of a sub-assembly of the random case erector of FIG. 13.

FIGS. 36, 37, and 45 detail folding apparatus 5130. Turning to these Figures, the folding apparatus has opposed horizontally reciprocating fin ploughs, namely an upstream fin plough 5500 and a downstream fin plough 5510. These fins are slidably supported on a horizontal rail 5512 that extends in the X-direction. A servo motor 5514 is attached to the upstream end of rail 5512 and a free-wheel 5516 is attached to the downstream end of the rail. A continuous drive belt 5520 runs around the drive wheel 5524 of servo motor 5514 and the free-wheel 5516. Upstream fin 5500 has a back plate 5526 which is attached to the drive belt and downstream fin 5510 has a front plate 5528 attached to the drive belt. With this arrangement, if the servo motor 5514 is operated in a counter-clockwise direction, fins 5500, 5510 move toward each other and when servo motor is operated in a clockwise direction, fins 5500, 5510 move away from each other. The folding apparatus also has opposed vertically reciprocating folding ploughs, namely an upper plough 5530 and a lower plough 5540. Each folding plough has a planar base terminating in a curved ploughing face. The ploughs 5530, 5540 are mounted to the ends of respective support arms 5532, 5542 and the arms are mounted to carriages 5534, 5544 slidably supported on a vertical rail 5546 (i.e., a rail extending in the Z-direction). A servo motor 5554 is attached to the upper end of vertical rail 5546 and a free-wheel 5556 is attached to the lower end of the rail. A continuous drive belt 5560 runs around the drive wheel 5564 of the servo motor 5554 and the free-wheel 5556. A back of the upper carriage 5534 is attached to belt 5560 and a front of lower carriage 5544 is attached to the belt. With this arrangement, if the servo motor 5554 is operated in a counter-clockwise direction, folding ploughs 5530, 5540 move toward each other and if the servo motor is operated in a clockwise direction, folding ploughs 5530, 5540 move away from each other.

Referencing FIGS. 17A and 17B along with FIGS. 38, 39, 45 and 46, the horizontal rail 5512 on which fins 5500, 5510 run is attached at either end to the base of L-shaped supports 5560a, 5560b. The L-shaped supports ride in channels 5562 of vertical ribs 5109a, 5109b of frame 5109. A servo motor 5568 is geared to a common drive shaft 5570 to turn pinions (not shown) inside hubs 5572a, 5573A. The pinions mesh with ring gear portions of shafts 5574a, 5574b in order to turn, and thereby adjust, the vertical position of the shafts. The shafts are rotatably connected to the top of L-shaped supports 5560a, 5560b. The result is that operation of the servo motor 5568 in one rotational direction raises the L-shaped supports 5560a, 5560b—and therefore fins 5500, 5510—and operation of the servo motor 5568 in the opposite rotational direction lowers the L-shaped supports 5560a, 5560b.

Similarly, vertical rail 5546 on which folding ploughs 5530, 5540 run via support arms 5532, 5542 and carriages 5534, 5544 is attached to a linear support 5580 that rides in a channel of vertical rib 5109c of frame 5109. Common drive shaft 5570 also turns a pinion (not shown) inside hub 5572c and this pinion meshes with a ring gear portion of shaft 5574c in order to turn, and thereby adjust, the vertical position of shaft 5574c. The shaft is rotatably connected to the top of linear support 5580. The result is that operation of the servo motor 5568 in one rotational direction raises the linear support 5580—and therefore folding ploughs 5530, 5540—and operation of the servo motor 5568 in the opposite rotational direction lowers the linear support 5580. Moreover, since all of supports 5560a, 5560b, and 5580 are adjusted by common drive shaft 5570, these supports are all adjusted to the same vertical extent by operation of servo motor 5568.

Figure 38:
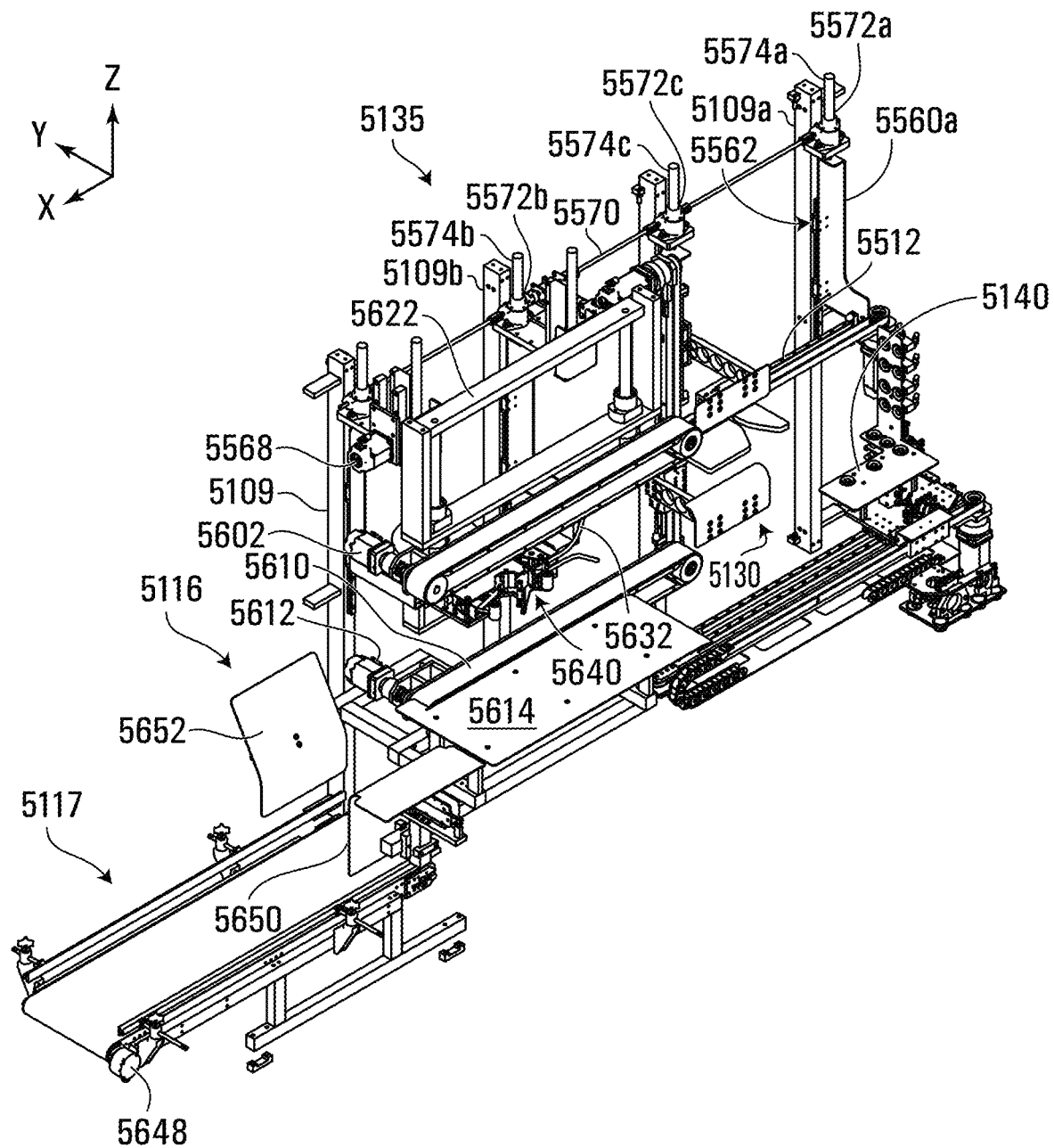
FIG. 38 is an isometric view of a sub-assembly of the random case erector of FIG. 13.
Figure 39:
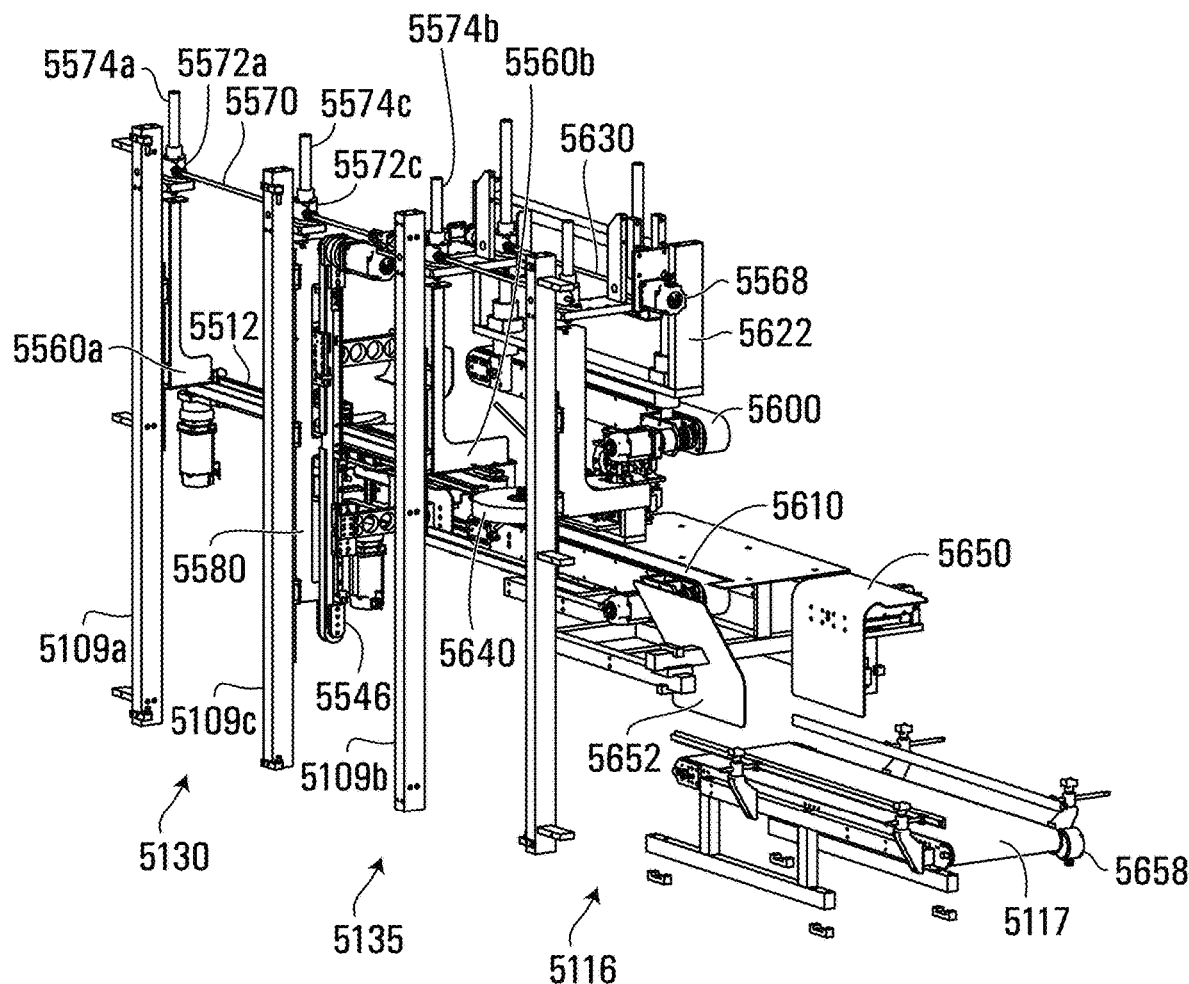
FIG. 39 is an isometric view of a sub-assembly of the random case erector of FIG. 13.

Referring to FIGS. 17A, 38, and 39 the sealing station 5135 has a tape sealer 5640 and flap folding rods 5632 which are supported by fin supporting rail 5512 and so move vertically with fins 5500, 5510. The sealing station also has a pair of opposed conveyor belts, upper conveyor belt 5600 driven by servo motor 5602 and lower conveyor belt 5610 driven by servo motor 5612, with the tape sealer 5640 disposed between the conveyor belts 5600, 5610. The lower conveyor belt 5610 and a supporting platform 5614 are supported by the factory floor. The upper conveyor belt is mounted to a sub-frame 5622. Servo motor 5568 has a second drive shaft 5630 that is operatively associated with a drive train (not shown) so that operation of the servo motor 5568 adjusts the vertical position of sub-frame 5622 and, therefore, the upper conveyor belt 5600 with respect to the lower conveyor belt 5610. Moreover, it will be noted that drive shaft 5630 and common drive shaft 5570 are driven by the same servo motor, motor 5568, such that a vertical adjustment of upper conveyor belt 5600 is mirrored by a vertical adjustment of fins 5500, 5510 and ploughs 5530, 5540. However, the drive train is configured with a 2:1 drive ratio so that the drive shaft 5630 rotates twice for any rotation of common drive shaft 5570. The result is that a vertical adjustment of n cm of the fins, folding ploughs, tape sealer and flap supporting rods results in a vertical adjustment of 2n cm of the upper conveyor belt 5610. This ensures that the centreline of a case sleeve remains at the level of the fins and tape sealer for any position of the upper conveyor belt 5600.

The sealing station terminates at case re-orienting station 5116. The case re-orienting station has a pair of deflection plates 5650, 5652 which re-orient a case as it falls off the end of the sealing station to the discharge conveyor 5117 from a position lying on its side at the sealing station 5135 to an upright position on the discharge conveyor with its open top facing upwardly. The discharge conveyor 5117 is a simple endless belt conveyor driven by a servo motor 5658.

A sensor 5243 (FIG. 18) such as an electronic eye model 42KL-P2LB-F4 made by ALLEN BRADLEY may be located at the input of the discharge conveyor. Sensor 5243 may be positioned and operable to detect the presence or absence of an erected case at the input to the discharge conveyor 5117. In this way, PLC 5132 can be digitally signalled if an erected case blank 101 remains at the input of the discharge conveyor such that another erected case cannot be discharged. If so, the case forming system 5100 can be stopped by PLC 5132 until any fault at discharge conveyor 5117 can be rectified.

A sensor (not shown) such as an electronic eye model 42KL-D1LB-F4 made by ALLEN BRADLEY, may be located within the horizontal gap between case conveyor 324 and alignment conveyor 5206. The sensor may be positioned and operable to detect the presence of the front edge of a blank as each blank in turn begins to move over the gap between the conveyors. Upon detecting the front edge, sensor may send a digital signal to PLC 5132 signalling that a particular blank (the size/configuration/type of which PLC 5132 is aware) has moved to a position where conveyor 5206 can start to move. PLC 5132 can then cause the motor for conveyor 5206 to be activated to move the blank downstream. In this way, there can be a "hand-off" of each blank from case conveyor 324 to alignment conveyor 5206.

Once the rear edge of each blank passes the sensor, a signal may be sent to PLC 5132 which can then respond by sending a signal to shut down the motor driving conveyor 324. Conveyor 324 is then in a condition to await a further signal thereafter to feed the next blank in the series of blanks on the conveyor 324 to alignment conveyor 5206. Meanwhile case forming system 5100 can be operated to move the blank on alignment conveyor 5206 to the pick-up location in the manner described in conjunction with case forming system 5100 so that processing of the blank can continue as described in conjunction with case forming system 5100.

Optionally, PLC 5132 may verify that the type/size/configuration of the case blank at the pick-up location matches the expected case blank. For example, the top surface of each case blank may include a bar code identifying its type/size/configuration, and this bar code may be read at the pick-up location by a suitably positioned bar code reader. The type/size/configuration of the case blank read from this bar code may be compared to the expected type/size/configuration of case blank, which may be determined from a record of the next scheduled case blank stored in memory of the PLC, as described above. Verification is successful when there is a match. When there is not a match, PLC 5132 may issue a signal requesting manual operator intervention.

The system has been described as having a PLC 5132. Optionally, any other suitable controller may be substituted, such as a programmed general purpose computer.

The case blank 101, and resulting sleeve, has been described as being gripped with suction cups. Of course, any other suitable grippers may be employed As noted above, it is contemplated that within a certain range of types/sizes/shapes of blanks, case forming system 5100 can process different types/sizes/shapes of blanks (within certain constraints/limits) without manual adjustment of any components of case forming system 5100. Also, it is contemplated that PLC 5132 in case forming system 5100 may store information about the dimensions of different types/sizes/shapes of blanks 101 (e.g. a height dimension "Ht"; a length dimension "L"; a major panel Length "Q" and also a case depth DP—as shown in FIG. 19A) and then PLC 5132 can determine adjustments, if any, that need to be made to (a) the components of the magazine; (b) the movement of the end effector 5120; (c) the movement of the shuttle 5140; and (d) at least some of the components of the folding apparatus 5130 and some components at the sealing station 5135 to be able to process a particular blank. The result is that case forming system 5100 may be able to automatically process several different types of blanks to form different size/shape/type cases, without having to make manual operator adjustments to any components of case forming system 5100.

With reference to FIG. 19A, it is contemplated that, by way of example only, that case forming system 5100 can process case blanks have the following ranges of dimensions:
- Height Ht—in the range of 7" to 30" (17.78 cm to 76.2 cm)
- Length L—in the range of 9" to 40" (22.86 cm to 101.6 cm)
- Depth DP—in the range of 4.5" to 20" (11.43 cm to 50.8 cm)
- Major Panel Length Q—in the range of 4" to 20" (10.16 cm to 50.8 cm).

Figure 21:
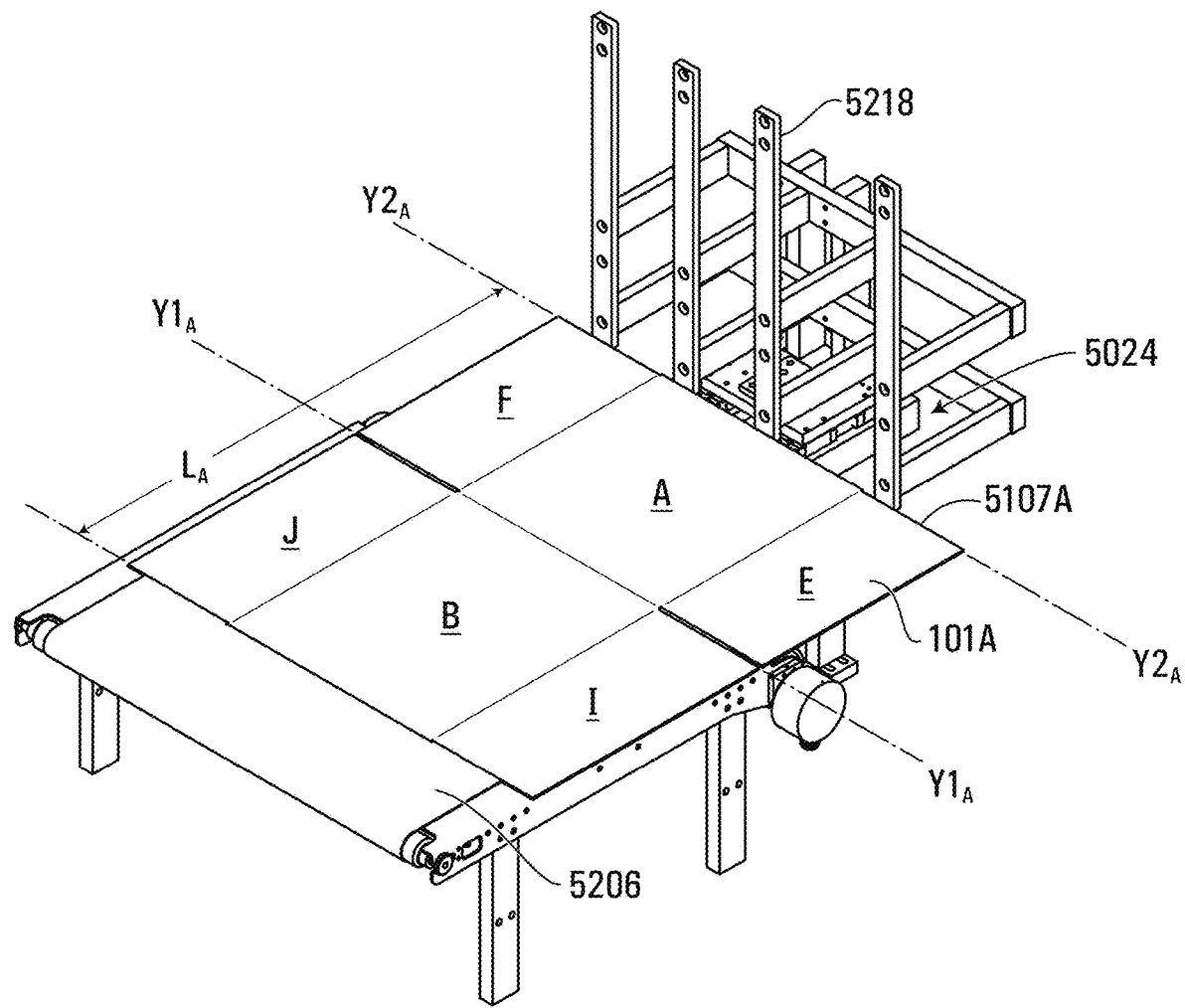
FIG. 21 is an isometric view of a sub-assembly of the random case erector of FIG. 13.
Figure 22:
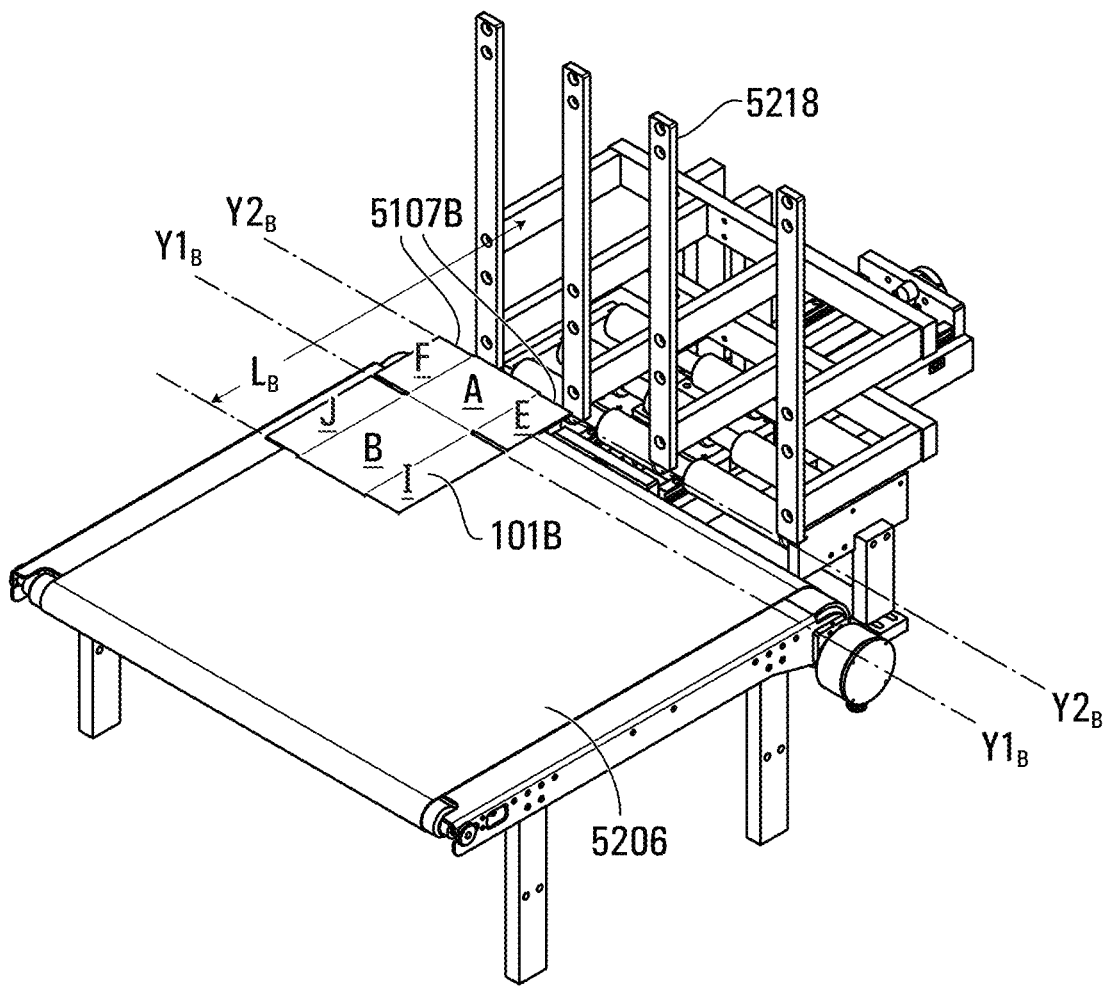
FIG. 22 is an isometric view of a sub-assembly of the random case erector of FIG. 13.

To further assist in the handling of case blanks 101 of different sizes/types/shapes, case forming system 5100 may include some additional features, as described hereinafter. With reference to FIGS. 21, and 22, a case blank 101A is shown resting in a pick-up position on alignment conveyor 5206, with a leading edge 5107A defined by the aligned, front horizontal and transverse edges of top panels F, A and E and opposite bottom panels L, D, and K (see also corresponding edges 5107 in FIGS. 19A and 19B). Leading transverse edge 5107A is proximate to, and preferably abuts up against the facing surfaces of picket wall 5218 such that leading transverse edge 5107A is substantially aligned with a transverse horizontal axis $Y2_A$ which extends along the facing surfaces of front picket wall 5218 (also referred to herein as blank front edge guide 5218). Axis $Y2_A$ also continues to run transversely and horizontally parallel to axis Y through case forming system 5100 including, preferably, along the forward facing surface 5404A (FIGS. 28 and 29) of back wall 5404 of shuttle 5140 when the shuttle is in the longitudinal start position before it commences its advancement to open the case blank—in the manner as described above.

Figure 27:
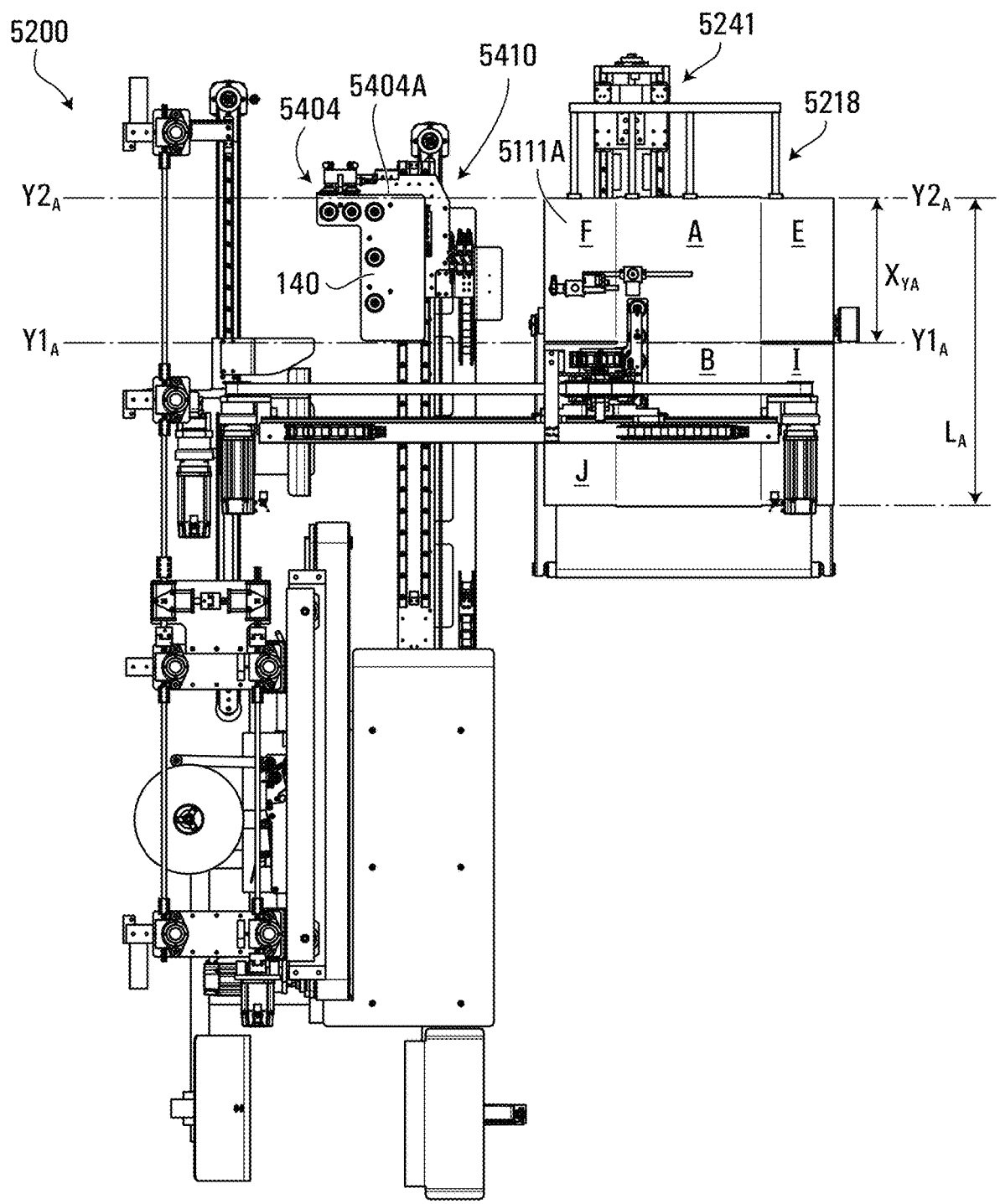
FIG. 27 is a side elevation view of a sub-assembly of the random case erector of FIG. 13.
Figure 28:
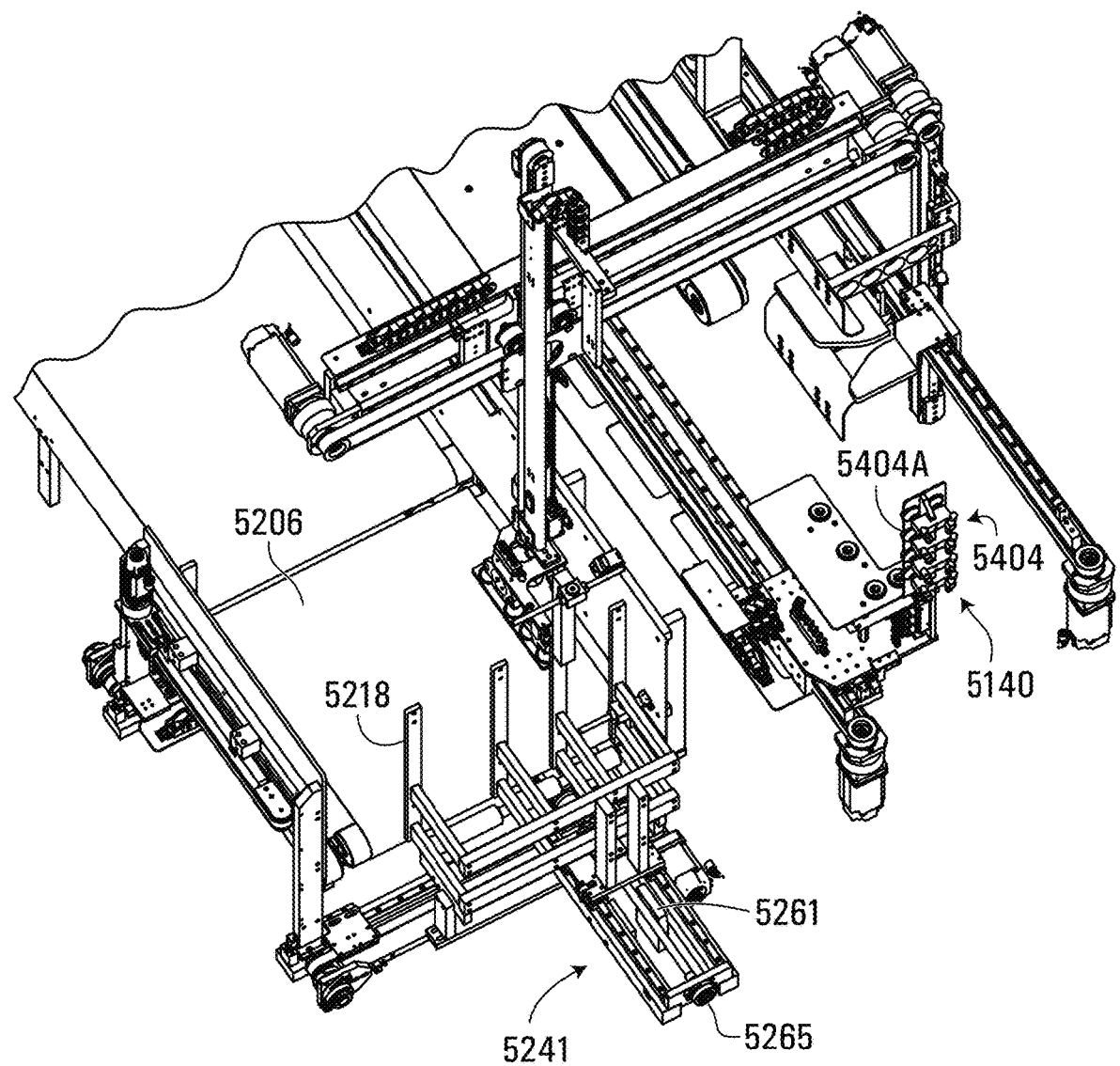
FIG. 28 is an isometric view of a sub-assembly of the random case erector of FIG. 13.
Figure 29:
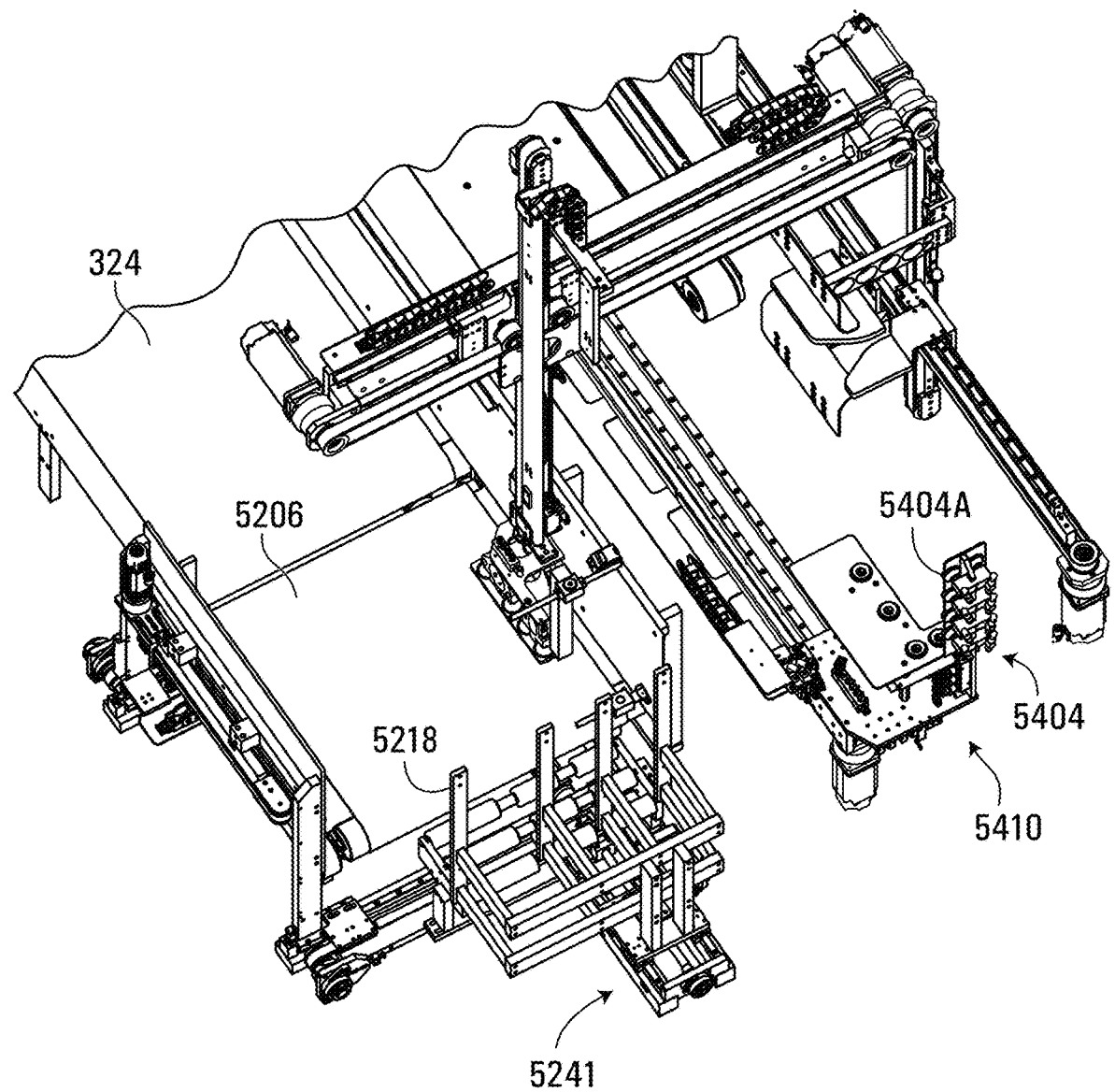
FIG. 29 is an isometric view of a sub-assembly of the random case erector of FIG. 13.
Figure 30:
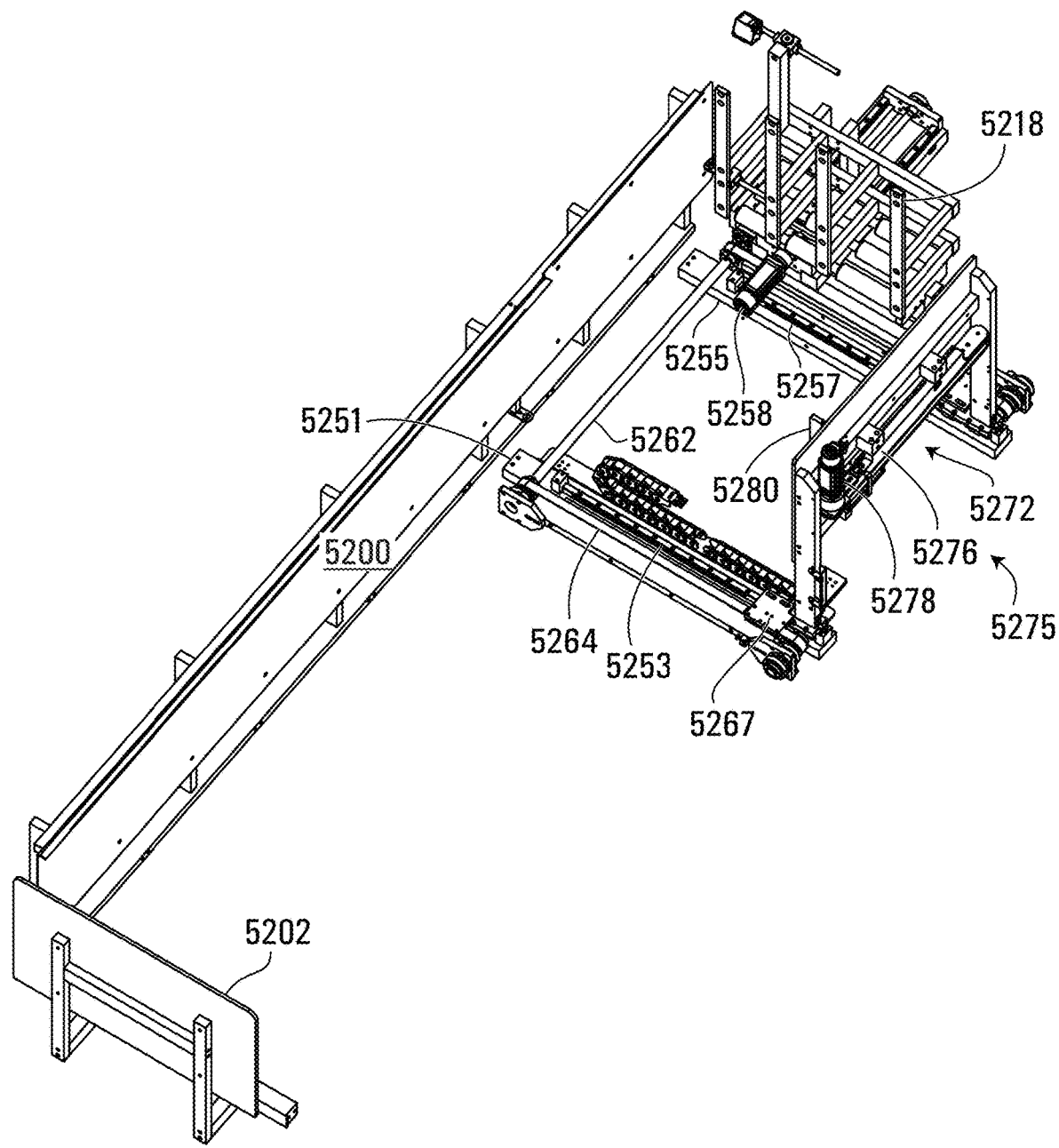
FIG. 30 is an isometric view of a sub-assembly of the random case erector of FIG. 13.
Figure 31:
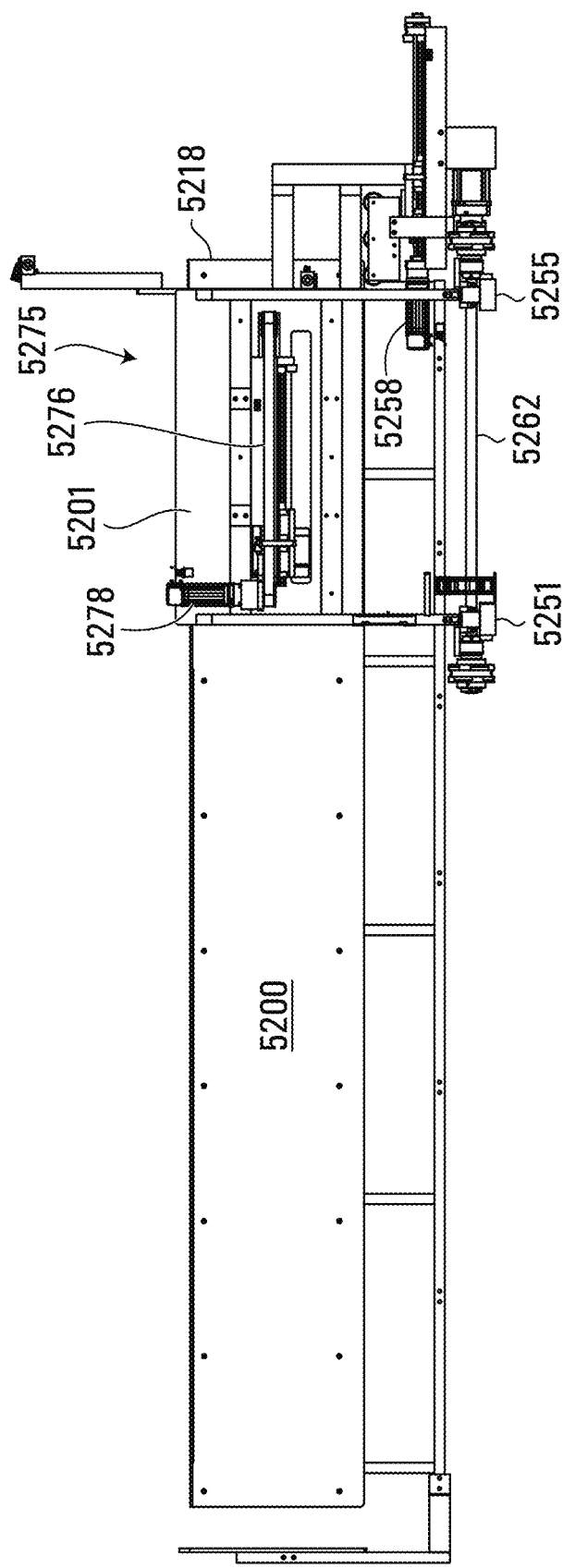
FIG. 31 is a side elevation view of a sub-assembly of the random case erector of FIG. 13.

The adjacent inner horizontal and transverse edges of upper panels F, A and E and respective adjacent upper panels J, B, and I, form a transverse horizontal crease line that is substantially aligned with a transverse horizontal axis $Y1_A$ which runs transversely and horizontally, and parallel to axis $Y2_A$ through case forming system 5100. A corresponding, but slightly lower, axis $Y1_A'$ (that is vertically aligned with and parallel to axis $Y1_A$) also runs through inner horizontal and transverse edges of opposite lower panels L, D, and D and respective adjacent lower panels H, C, and G to form a corresponding lower crease line. These two crease lines typically will lie in the same vertical and transverse plane. Axis $Y1_A$ and axis Y2 are separated by a distance $X_{YA}$ (FIG. 27).

Figure 26:
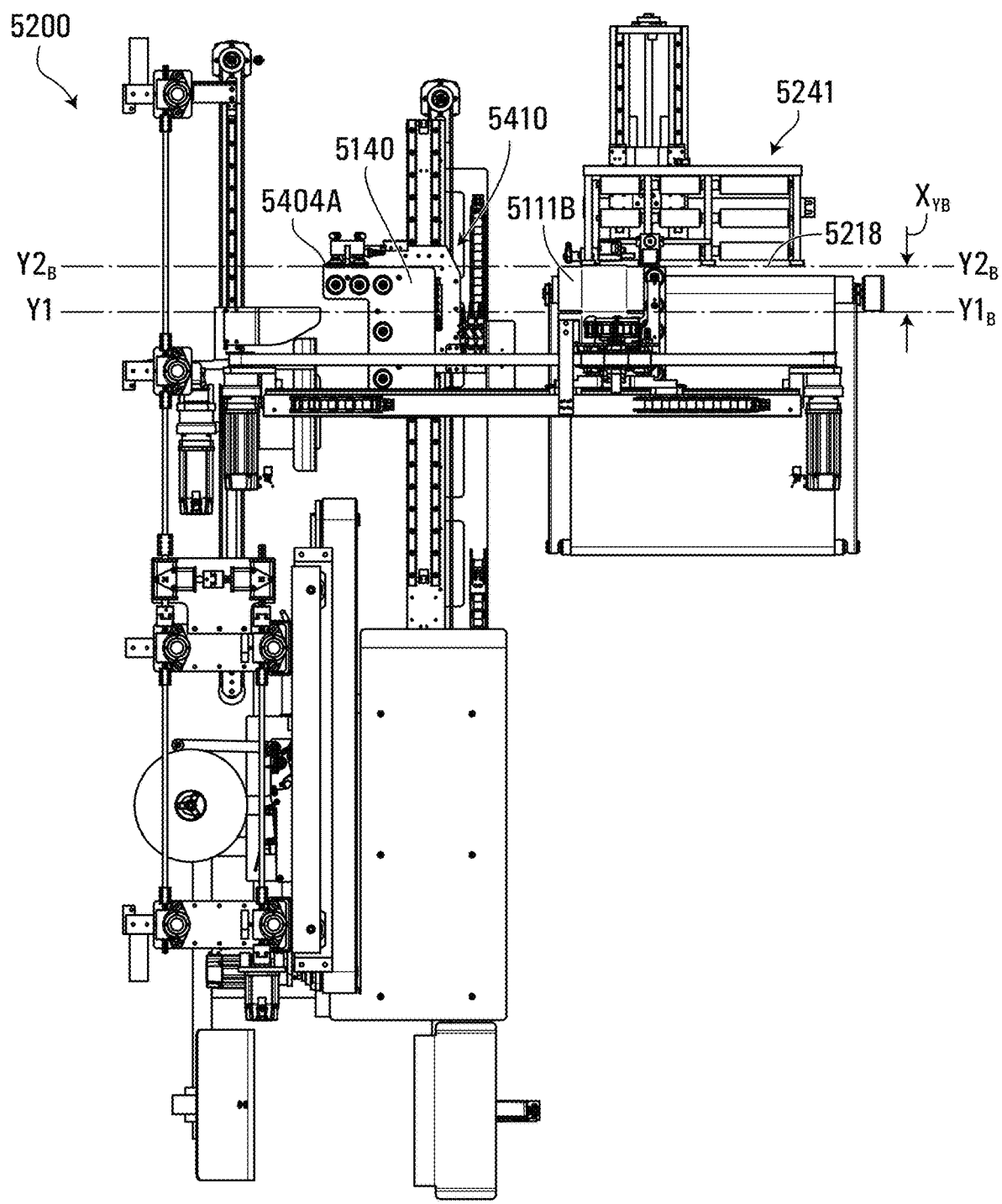
FIG. 26 is a top elevation view of a sub-assembly of the random case erector of FIG. 13.

By contrast, with reference to FIG. 22, a blank 101B (which has generally smaller dimensions than blank 101A—including a length $L_B$ that is shorter than length $L_A$, and which may also have a height Ht that is shorter than height Ht of blank 101A) is shown resting in a pick-up position on conveyor 5206, with a leading transverse edge 5107B defined by the aligned, front edges of panels I, B and J. Leading transverse edge 5107B of blank 101B is also positioned proximate to, and preferably is in abutment with the facing surfaces of picket wall 5218 such that leading edge 5107B is substantially aligned with a transverse horizontal axis Y2B which extends along the forward edge surfaces of front picket wall 5218. Axis Y2B also continues to run transversely and horizontally parallel to axis Y through case forming system 5100 including also preferably, along the front surface of back wall 5404 of shuttle 5140, when in the longitudinal start position before it commences its advancement to open the second case blank—as described above. Axis $Y1_B$ and axis $Y2_B$ are separated by a distance $X_{YB}$ (FIG. 26). Distance $X_{YB}$ is shorter than distance $X_{YA}$.

The adjacent inner horizontal and transverse edges of upper panels F, A and E and respective adjacent upper panels J, B and I, form a transverse crease line that is substantially aligned with a transverse horizontal axis $Y1_B$ which runs transversely and horizontally and parallel to axis Y and to axis $Y2_A$ through case forming system 5100. A corresponding, but slightly lower, axis $Y1_B'$ (that is vertically aligned with and parallel to axis $Y1_B$) also runs through inner horizontal and transverse edges of opposite lower panels L, D, and K, and respective adjacent lower panels H, C and G to form another transverse crease line. These two crease lines typically will lie in the same vertical and transverse plane.

During the operation of case forming system 5100 in processing blanks having different lengths $L_A$, $L_B$, the longitudinal axes $Y1_A$ and $Y1_B$ of the two differently sized blanks 101A, 101B are co-linear (the crease lines in both blanks run along the same transverse line/axis—or at least run in the same vertical transverse plane). Similarly, the longitudinal axes $Y1_A'$ and $Y1_B$ of the two differently sized blanks 101A, 101B are co-linear (the crease lines may also run along the same transverse line/axis—or at least run in the same vertical transverse plane). Thus, in case forming system 5100, no matter what length L of case blank that is being processed, a transverse and vertical plane through the crease lines between panels I, B and J and respective adjacent panels E, A and F remains in a constant longitudinal (ie. X direction) position, and similarly, a transverse and vertical plane through the crease lines between panels L, D and K, and respective adjacent panels H, C and G will also typically remain in a constant longitudinal (i.e. X direction) position.

It will be appreciated however, that in case forming system 5100, for blanks 101A, 101B, with different lengths L, the transverse axes Y2 and Y2A will not be not co-linear (e.g. the front edges of the case blanks do not run along the same line/axis parallel to axis Y or through the same vertical and transverse plane). Therefore, in case forming system 5100, if the length L of a case blank that is being erected during operation, changes from case blank to the next case blank, the transverse axis Y2 at the front edge of panels E, A and F will be in a different longitudinal (i.e. X direction) position.

Figure 40:
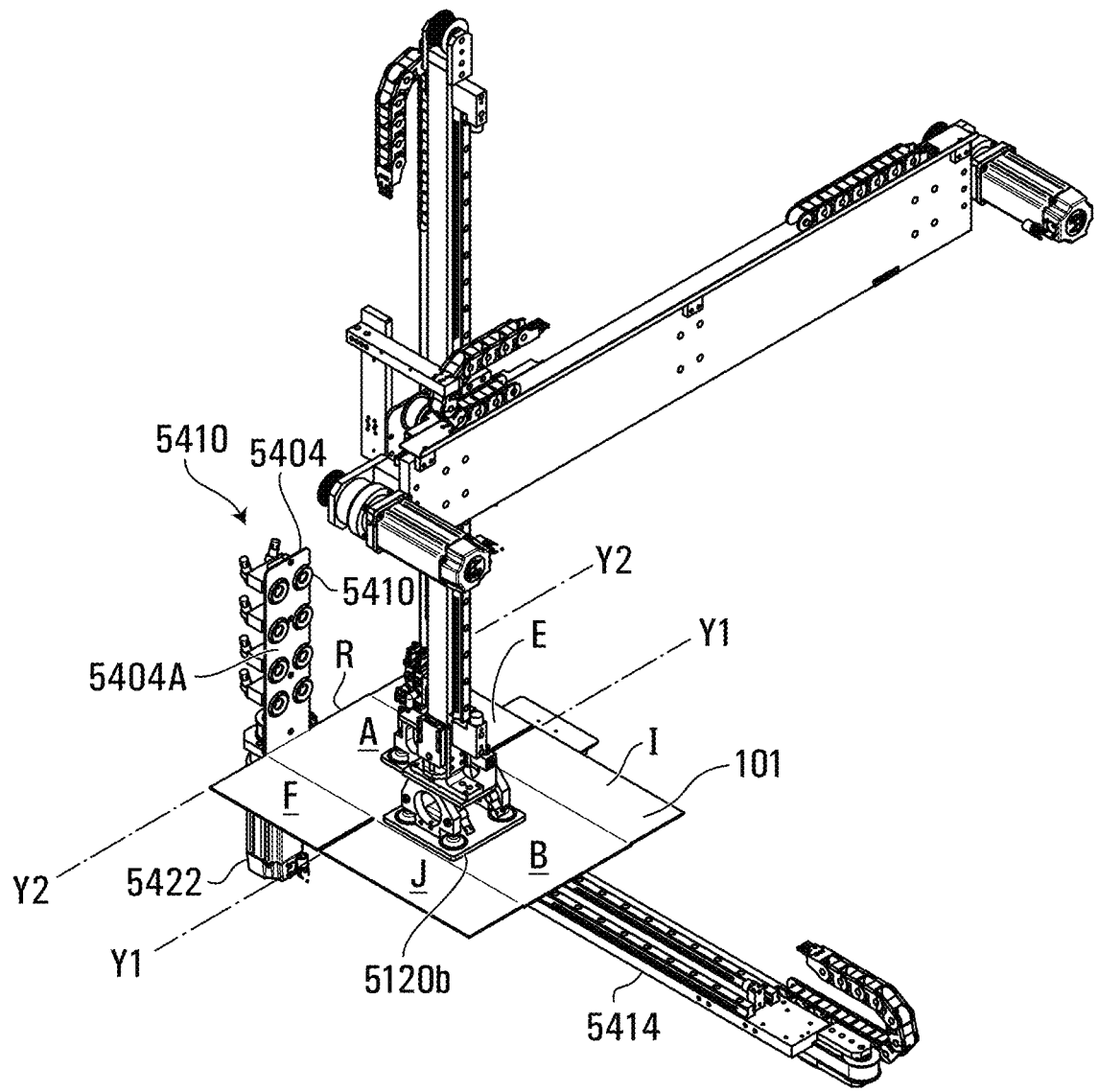
FIG. 40 is an isometric view of a sub-assembly of the random case erector of FIG. 13.

When end effector 5120 is positioned by the control of PLC 5132 at the pick-up location (such as shown in FIG. 40) the end effector is located directly over panel B of a blank 101A and preferably right behind, or a short distance behind, in the X direction, the crease line axis $Y1_A$ and when, when end effector 5120 is positioned by the control of PLC 5132 at the pick-up location (such as shown in FIG. 40) the end effector is directly over panel B of a blank 101B the end effector 5120 will be the distance in the X direction behind the crease line axis $Y1_B$.

Therefore, in order to accommodate case blanks of different lengths L, the forward-facing surfaces of front picket wall/front edge guide 5218, and typically also the start position of the front surface 5404A of back wall 5404 of shuttle 5140 will have to be moved to corresponding different longitudinal start positions. Adjustment of the start position of shuttle 5140 can be controlled by servo motors 5258 and 5278 controlled by PLC 5132, and the corresponding stroke of shuttle 5140 may also be adjusted by PLC 5132.

In order to provide a corresponding varying, appropriate pick-up positions of case blank 101A and case blank 101B, on conveyor 5206, the longitudinal (i.e. in direction of axis X) position of picket wall/front edge guide 5218, must also be adjusted by PLC 5132. Accordingly, a longitudinal, picket wall movement mechanism 5241 may be provided in case forming system 5100. Picket wall movement mechanism 5241 may be controlled by PLC 5132 which can adjust the longitudinal position of picket wall 5218 to provide a proper pick up position for a case blank on conveyor 5206, to ensure that the crease line between panels I, B and J and respective adjacent panels E, A and F (e.g. axes $Y1_A$ and $Y1_B$) will be in the same longitudinal (X axis) position through case forming system 5100, regardless of the length L of case blank 101 that is being processed at any particular time by case forming system 5100. Thus, when end effector 5120 is positioned by the control of PLC 5132 at the pick-up location (such as shown in FIG. 40) the end effector is directly over panel B of a blank 101A a short distance in the X direction behind the crease line axis $Y1_A$ and when, when end effector 5120 is positioned by the control of PLC 5132 at the pick-up location (such as shown in FIG. 40) the end effector is directly over panel B of a blank 101B the end effector 5120 will be the same short distance in the X direction behind the crease line axis $Y1_B$.

It should be noted that if the height Ht of the cases also vary (such as between case blank 101A and case blank 101B) the transverse, pick-up position of the end effector 5120 on the blank while on conveyor 5206, and the transverse, lowering down position of the end effector for lowering the blank onto the base 5402 of shuttle 5140, may vary in the transverse direction (Y direction) by PLC 5132 so that the end effector 5120 is properly positioned transversely at both the pick-up, and lowering, of the blank. When picking up a blank, the end effector 5120 may be positioned movement apparatus 5115 directly over the central area in the transverse position in the Y direction of panel B, dependent upon the height Ht of the respective blank 101A, 5111B—which may vary between blank 101A and blank 101B. PLC 5132 can also adjust the transverse movement of movement apparatus 5115 so that when the end effector 5120 descends towards the base 5402 of bed 5400 of shuttle 5140 such that the front edge 5107 is positioned against the vertically extending back wall 5404 of the shuttle 5140, the end effector will be generally directly above the base 5402 and the blank properly positioned transversely on the bed 5402.

Figure 23:
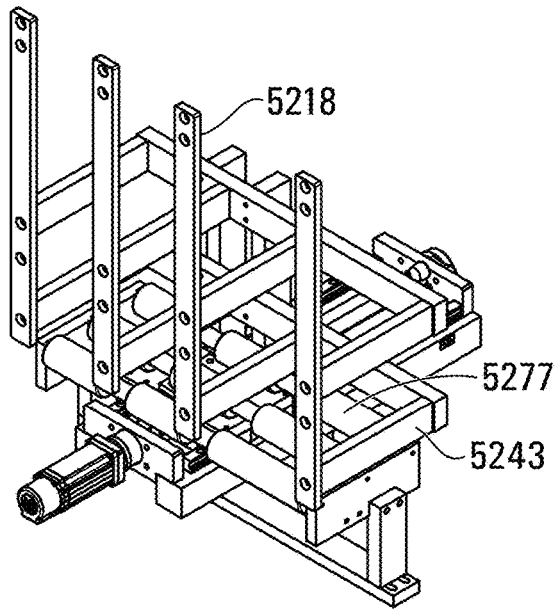
FIG. 23 is an isometric view of a sub-assembly of the random case erector of FIG. 13.
Figure 24:
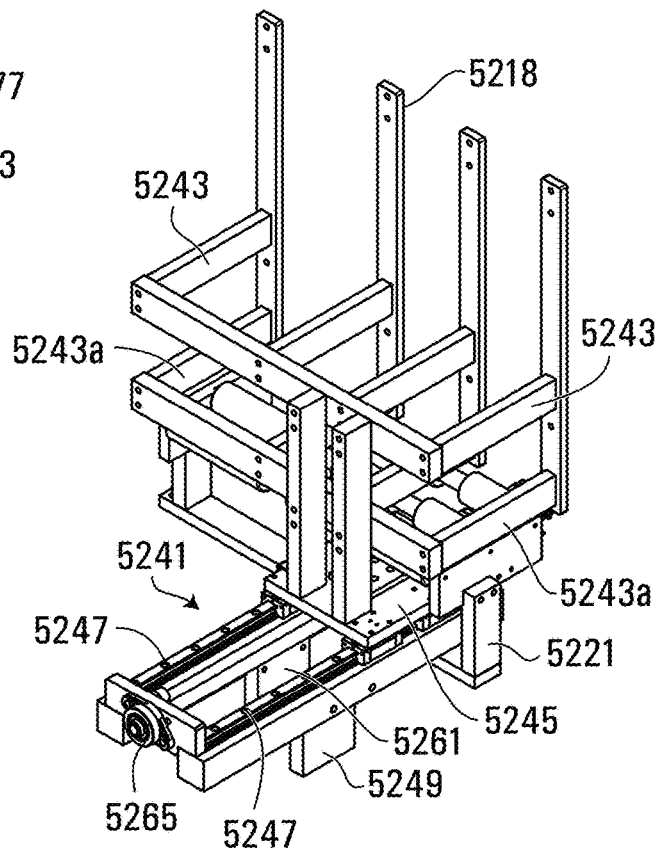
FIG. 24 is an isometric view of a sub-assembly of the random case erector of FIG. 13.
Figure 25:
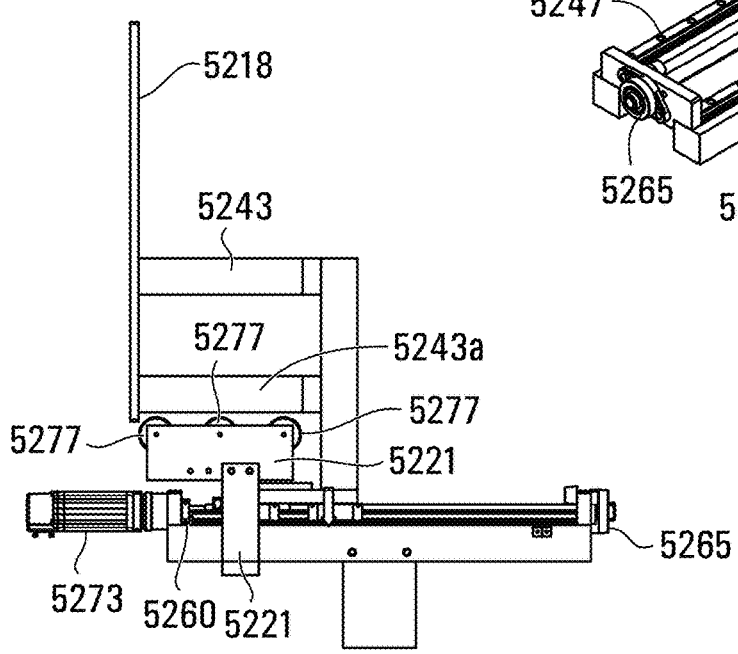
FIG. 25 is a side elevation view of a sub-assembly of the random case erector of FIG. 13.

With reference also to FIGS. 23, 24 and 25, picket wall 5218 may be supported by a support frame generally designated 5243. Support frame 5243 has lower longitudinal members 5243a which may rest on a plurality of transverse rollers 5277 that are supported on a sub-frame 5221. Support frame 5243 is also mounted to a slidable carriage 5245. Carriage 5245 may be operable to ride/slide on a pair of horizontal, longitudinally extending rails 5247 extending in the X-direction. Rails 5247 may be supported by a sub-frame 5249 on the factory floor. Carriage 5245 may have a depending belt block 5261 attached to an endless drive belt From the belt block 5261, the drive belt extends along rails 5247 to free-wheel 5265 device located at one end of rails 5247, around the free-wheel device 5265 and back along the rails 5247 to the its other end where the belt passes around drive wheel of a servo motor 5273 and then returns along the rails 5247 again to the belt block 5261. According to some embodiments, as shown in FIG. 23, the drive belt may include an acme screw arrangement. According to other embodiments, screw type actuators may be alternatively implemented with drive belts for high-speed actuations. Given this arrangement, PLC 5132 may operate the servo motor 5273 to move the belt block 5261, and thus carriage 5245 and also picket wall 5218 (which is supported in such movement by support frame 5243 riding on rollers 5277) such that picket fence 5218 can be moved in forward/backward directions (in the X direction) in order to properly position the picket wall 5218 in the correct longitudinal position for the particular sized case blank to be processed and erected into a case. Thus PLC 5132 can adjust the longitudinal positions of both picket wall 5218 and shuttle 5140, to accommodate changes in the lengths L of the case blanks that are being fed in series by conveyor 5206 to the pick-up location.

In case forming system 5100, a plurality of magazines M1-M16 may be supported by one or more frame structures above a common case conveyor 324 (which may be constructed generally like case conveyor 324, including as depicted in FIGS. 14, 15 and 16). Magazines M1-M16 may be arranged in spaced longitudinal relation to each other vertically above case conveyor 324. Case conveyor 324 feeds an alignment conveyor 5206 (which may be like alignment conveyor 5206 described above).

Magazines M1-M16 may each contain one or more stacks of product packaging, such as case blanks which each may generally be like blanks 111 processed by case forming system 5100, with at least some and possibly each of the magazines M1-M16 containing different types/sizes and/or configurations of packaging/case blanks compared to other magazines. The size, configurations and types of case blanks (and the cases that can be formed therefrom) can vary to provide a range of case sizes, configurations and types that can be automatically processed by the case forming system 5100 without the need for any manual intervention to modify any components of the system. PLC 5132 of case forming system 5100 may be programmed such that the particular dimensions/overall size/configuration (e.g. such as regular slotted case or "RSC")/type of each of the blanks held in each one of the magazines M1-M16 is stored in the memory of the PLC 5132.

Each magazine M1-M16 may provide a vertical stack of case blanks above case conveyor 324 and be operable to dispense single case blanks on demand under the control of PLC 5132, in a flattened orientation onto case conveyor 324. An example arrangement of a suitable type of vertical case dispensing magazine, is the magazine that forms part of the 310E case erector made by Wepackit Inc. of Orangeville, Ontario, Canada (http://www.wepackitmachinery.com/310E/310E.pdf).

PLC 5132 may give an instruction to form a case, and if required, PLC 5132 may cause one of magazines M1-M16 to dispense a blank of an appropriate configuration/size onto case conveyor 324 for delivery to alignment conveyor 5206. PLC 5132 is able to selectively move and transfer a single blank at a time onto case conveyor 324 from any one of magazines M1 to M16. Therefore, separate individual case blanks may be fed in series and longitudinally in a desired sequence by case conveyor 324 to alignment conveyor 5206. The particular sequence/order of case blanks that are placed onto case conveyor 324 of case forming system 5100 may be determined and selected by PLC 5132 or another control system as described hereinafter, such that case blanks may arrive at alignment conveyor 5206 in such a desired sequence in which it is desired to process the blanks within case forming system 5100.

PLC 5132 may maintain in its memory records of the sequence of case blanks that have been placed onto case conveyor 324. For example, this information may include the type/size/configuration of the case blank and, where the case forming system 5100 includes a labeller, the label information to be applied to the case blank. A new record can be added each time a request for a new case is received and, optionally, records can be removed once a case has been formed (and labelled). Thus, such records may be organized and maintained in sequence in the memory of PLC 5132 using a conventional shift registering technique. In this way, the record for the next case blank scheduled to arrive at alignment conveyor 5206 may be provided at the output of the shift registers as that case blank arrives, and the type/configuration/size of that case blank and the label information for that case blank may be determined from the provided output.

Once transferred from case conveyor 324 to alignment conveyor 5206, the alignment conveyor 5206 may then under the control of PLC 5132 move each blank sequentially to the pick-up location in the manner described previously with respect to case forming system 5100.

As described above, a sensor (not shown) such as an electronic eye model 42KL-D1LB-F4 made by ALLEN BRADLEY, may be located within the horizontal gap between case conveyor 324 and alignment conveyor 5206. The sensor may be positioned and operable to detect the presence of the front edge of a blank as each blank in turn begins to move over the gap between the conveyors. Upon detecting the front edge, sensor may send a digital signal to PLC 5132 signalling that a particular blank (the size/configuration/type of which PLC 5132 is aware) has moved to a position where conveyor 5206 can start to move. PLC 5132 can then cause the motor for conveyor 5206 to be activated to move the blank downstream. In this way, there can be a "hand-off" of each blank from case conveyor 324 to alignment conveyor 5206.

Once the rear edge of each blank passes the sensor, a signal may be sent to PLC 5132 which can then respond by sending a signal to shut down the motor driving case conveyor 324. Case conveyor 324 is then in a condition to await a further signal thereafter to feed the next blank in the series of blanks on the case conveyor 324 to alignment conveyor 5206. Meanwhile case forming system 5100 can be operated to move the blank on alignment conveyor 5206 to the pick-up location in the manner described in conjunction with case forming system 5100 so that processing of the blank can continue as described in conjunction with case forming system 5100.

Optionally, and as in the system described above, in case forming system 5100, PLC 5132 may verify that the type/size/configuration of the case blank at the pick-up location matches the expected case blank. For example, the top surface of each case blank may include a bar code identifying its type/size/configuration, and this bar code may be read at the pick-up location by a suitably positioned bar code reader. The type/size/configuration of the case blank read from this bar code may be compared to the expected type/size/configuration of case blank, which may be determined from a record of the next scheduled case blank stored in memory of the PLC, as described above. Verification is successful when there is a match. When there is not a match, PLC 5132 may issue a signal requesting manual operator intervention.

The generally S-shaped path may be achieved by generally reversing the orientation of shuttle 5140 and its components (on an X direction axis), including L-shaped bed 5400 with its horizontally extending base 5402 and vertically extending back wall 5404 such that the shuttle is oriented in a the same downstream—X axis—direction as case conveyor 324 and alignment conveyor 5206. Additionally, end effector 5120 may be positioned so as to engage on a top surface of panel A, —so that during that during opening of the case blank 101, the shuttle 5140 will push against the rearward edges of panels J, B and I, while end effector 5120 lifts panel vertically, causing panel B to rotate from a horizontal orientation to a vertical orientation (See FIGS. 41 and 42). Alternatively, each blank 101 may be fed to the alignment conveyor in an opposite direction (i.e. so that panels J, B and I are leading panels and panels F, A and E are the trailing panels). Thus, the end effector 5120 may then pick up the case blank 101 on panel B and the shuttle 5140 will push against the rearward edges of panels F, A and E, while end effector 5120 lifts panel B vertically, causing panel A to rotate from a horizontal orientation to a vertical orientation. In each such arrangement, the transverse axis through the crease lines Y1 of the panels will remain the same longitudinal position during operation, regardless of the length of the case blank 101.

Figure 42:
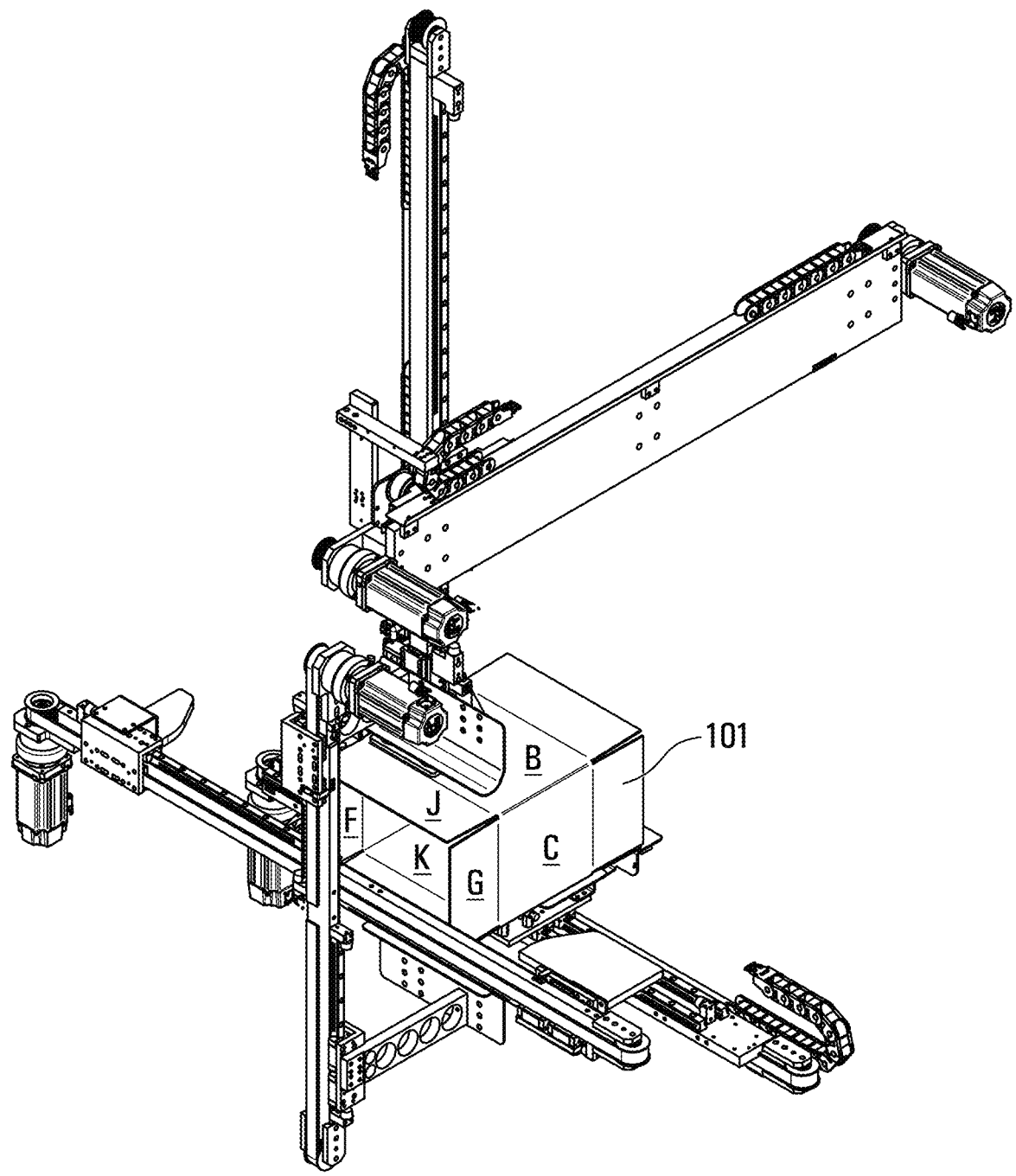
FIG. 42 is an isometric view of a sub-assembly of the random case erector of FIG. 13.
Figure 43:
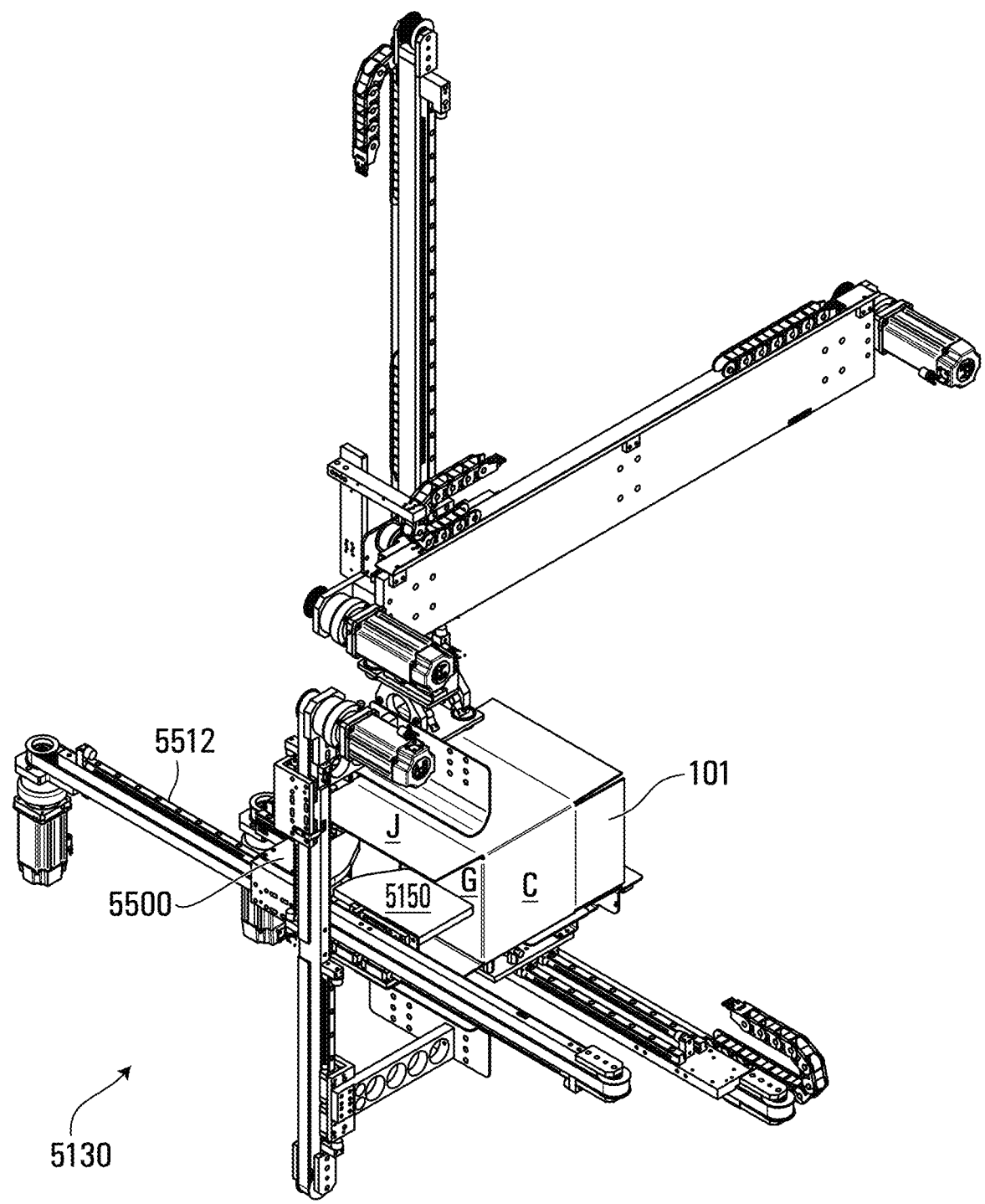
FIG. 43 is an isometric view of a sub-assembly of the random case erector of FIG. 13.

Case forming system 5100 may also have its a folding apparatus generally designated 5130, configured to fold one or more flaps of each sleeve, and a sealing station 5135 at which flaps of the cases are sealed arranged in an opposite direction. Case forming system 5100 may also include a case re-orienting station 5116 and a case discharge conveyor 5117 arranged in an opposite longitudinal direction—as shown. Thus, case forming system 5100 is operable to feed an erected case to a case re-orienting station 5116 and a case discharge conveyor 5117 which are also oriented in the same downstream—longitudinal X-axis—direction from the case erecting station, as depicted in FIG. 42.

The use of case forming case forming systems 5100 described above, has the ability to process a relatively large number of different size case blanks from a relatively small footprint on a factory floor. By moving case blanks in their flattened configuration, on conveyor systems to the end effector 5120 where they are translated transversely, also in their flattened state, and only opened in the combined movements of the shuttle and the end effector, provides a very technically efficient mechanism for erecting cases of different sizes. It will be noted that several steps of the case forming process are able to be performed at the same time (in parallel to each other). For example, the systems may be configured such that infeed and alignment conveyors may be moving to the pick-up position one case blank, while another case blank is being moved transversely by the end effector (of the end effector is at least being moved), while an erected case is completing its sealing/labelling steps. The result is that it is believed that case forming system 5100 may be able to process in the order of at least 20-30 cases per minute.

According to some embodiments, modifications to the case forming case forming system 5100 based on the size of the constructed case and blank may relate additional downstream equipment. For example, with reference to FIG. 39, the distance between upper conveyor belt 5600 and lower conveyor belt 5610. This distance may be adjusted by placing one or both of upper conveyor belt 5600 and lower conveyor belt 5610 (along with its various sub-components) on a vertical actuator. Based on the total height of the constructed case, an operational signal from PLC 5132 will instruct a vertical actuator or actuators to adjust the distance between the two, to either increase or decrease. Similarly, actuators and rails positioned to fold major and minor flaps in the constructed case may be configured to change positioned based on the size of constructed case. For example, the folding apparatus 5130 may be fixed on an actuator configured to adjust upstream fin plough 5500, downstream fin plough 5510, and folding ploughs 5530, 5540 to intersect with a midpoint of the major and minor flaps of the case as necessary. Finally, case sealer 320 and label station 322 may adjust to ensure that the seal and label are placed in a specific position on the constructed case (i.e. along a seam for sealing, or on a visible panel for labelling).

Control System and Methods

Figure 47:
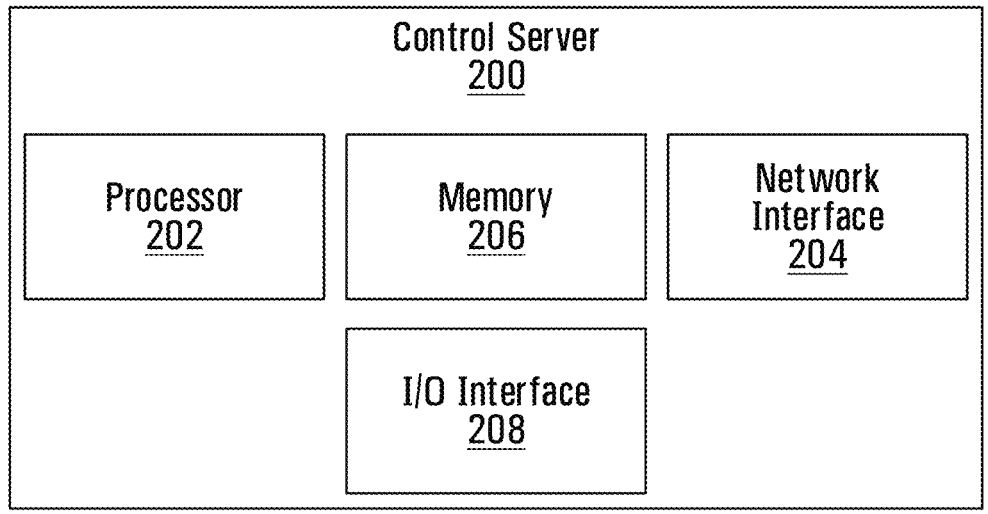
FIG. 47 is a block diagram of an example hardware components of a control server.

FIG. 47 is a block diagram of example hardware components of a control server 200. Control server 200 may be hosted on a computer including processor 202, network interface 204, a suitable combination of persistent storage memory 206, random access memory and read only memory and one or more I/O interfaces 208. Processor 202 may be an Intel x86, PowerPC, ARM processor or the like. Network interface 204 interconnects control server 200 to a network (not shown). Memory 206 may be organized using a conventional filesystem. Control server 200 may include input and output peripherals interconnected to control server 200 by one or more I/O interfaces 208. These peripherals may include a keyboard, display, mouse and one or more devices such as DVD drives, USB ports and the like for reading computer-readable storage media. Software components exemplary of embodiments of the present invention may be loaded into memory 206 over network interface 204 or from one or more peripheral devices.

Figure 48:
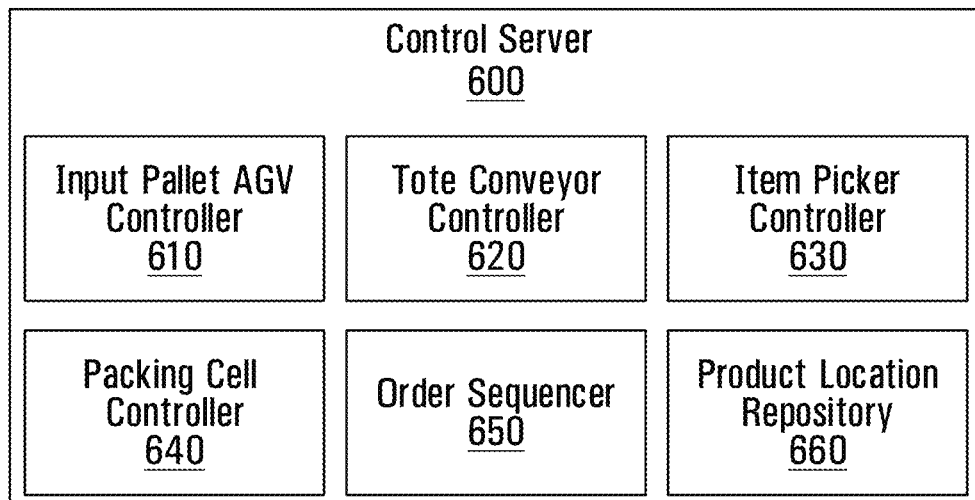
FIG. 48 is a block diagram of an example software components of a control system.

FIG. 48 is a block diagram of simplified organization of example components stored at a computing device of control server 200 to provide a control system 600. Components depicted in FIG. 48 may be implemented in a combination of software and hardware. The control server 200 can include functional modules to control individual components of the warehouse fulfilment system. As depicted, the modules include input pallet AGV controller 610, tote conveyor controller 620, item picker controller 630, packing cell controller 640, order sequencer 650, and product location repository 660. Each functional module in control system 600 able to interface with the electromechanical components of the warehouse fulfillment system via one or more PLCs to cause physical operations to occur as described herein. Further, the software components are able communicate with each other and to access any appropriate database required to complete the functions as will be described. For example, the software components may be configured to communicate with each other via individual function calls between software components or requests to access the information stored at locations in a memory 206.

Each software component may be configured to communicate with the various hardware components within the floor plan. For example, tote conveyor controller 620 may communicate a route or series of commands to transport a tote along main lines 132, branch lines 134, and elevators 117 of conveyor system 130. Item picker controller 630 may communicate with picker arms 114, packing cell controller 640 may communicate with the packing system 120, and input pallet AGV controller 610 may communicate to the forklifts. Communications between hardware and software components may include transmitting operational commands, as well as to receive real-time feedback. This may be used to determine optimized performance in scheduling future events.

Input pallet AGV controller 610 coordinates the forklift automatic guided vehicle movement throughout the warehouse system 100. The input pallet AGV controller 610 receives, as an input, new locations and operations in from order sequencer 650. These locations correspond to either a new shipment coming in, wherein the location includes a specific loading bay 102, and operations for lifting a pallet 112, or for a specific storage location in the warehouse system 100, and operations for lowering the pallet 112 from the AGV. According to some embodiments, the input pallet AGV controller 610 may be used to control multiple automated guided forklifts 119 in the warehouse system 100. Alternatively, for each forklift, a single input pallet AGV controller 610 may be employed. In embodiments including a pallet elevator device 210, input pallet AGV controller 610 may be further configured to control the pallet elevator device 210 to receive the appropriate pallet from the AGV, and bring the pallet to the specific storage location.

Tote conveyor controller 620 is configured to send commands to the conveyor system 130 to transport totes 116 through the warehouse. This includes bringing the totes 116 to each specific product location within the warehouse system 100, and to the packing system 120. Tote conveyor controller 620 can receive, as an input, specific product locations corresponding to items in an individual order. As an output, tote conveyor controller 620 may generate a series of instructions for specific main lines 132, branch lines 134, and elevators 117.

Item picker controller 630 sends operational commands to each picker arm 114. The item picker controller 630 receives indication from tote conveyor controller 620 indicative of the tote being placed in a picking position (i.e. that the necessary route has been completed), then sends instructions to the robotic arm to retrieve an item from the case and place the item in the tote. Once item picker controller 630 has determined that a case has been emptied, the item picker controller 630 will instruct picker arm 114 to move excess cardboard 128 of other waste product off of the pallet and drop to the appropriate waste area.

Packing cell controller 640 sends operational commands to the packing system comprising at least one random case erector 314 and sub-components thereof. The packing cell controller 640 will send commands to erect a case corresponding to each individual order. Using order sequencer 650, each tote being brought to the packing system with its erected cases simultaneously.

Order sequencer 650 receives both the incoming pallets and individual orders for products from the warehouse. Order sequencer 650 instructs the software components of the specific order they should operate. Order sequencer 650 has access to a plurality of repositories and databases which will be described in relation to later figures, that instruct the series of individual operations of other software components of control system 600. These are used to generate a queue for operation of the conveyor system 130, picker arms 114, and packing system 120.

Finally, product location repository 660 stores a database comprising the locations of each pallet in the warehouse system 100. The form of these locations may be in (x, y, z) components, or in another computer-readable format. The locations stored in product location repository 660 are used by order sequencer 650 to guide the input pallet AGV controller 610 and tote conveyor controller 620. As new pallets are received in the warehouse, the order sequencer 650 will query product location repository 660 for the specific product location to leave the pallet 112. Once determined, the input pallet AGV controller 610 may communicate with the forklift 119 or material handling machine to pick up and drop off the pallet 112 from loading bay 102 to specific location as determined. Similarly, when an order is received by control system 600, order sequencer 650 will query product location repository 660 for the specific product locations, and instruct tote conveyor controller 620 to transport a tote 116 to the location, then item picker controller will instruct picker arm 114 to pick an item from pallet 112 stored at the location. After all items in an order have been picked, order sequencer 650 will transport a tote 116 to a packing cell for packing and shipping.

FIG. 49 is an example of data stored at the product location repository 660. The product location repository 660 includes, for each product ID 1402, a specific product location 1410, comprising a value in x, y, and z dimensions. Alternatively or additionally, a unique identifier for each location may be used, wherein the identifier logically identifies each product and is associated with a specific spatial location. Entries in the product location repository 660 may be pre-defined or entered manually. According to some embodiments, product location repository 660 may further include data related to an amount of stock left in an individual product ID 1402, and the specific location within a palletized pattern or structure for a picker end effector 121 to select the next item for the next order.

Upon receiving a new pallet 112 at loading bay 102, control system 600 will receive an indication of a product ID 1402 associated with the individual items on the pallet. This may be entered by a user into a user interface of an electronic device using a keyboard or touch screen, or by scanning a bar code (or other machine-readable data format) from the pallet 112. If the product ID 1402 associated with the pallet 112 exists in the product location repository 660, a forklift 119 may be instructed by input pallet AGV controller 610 to lift and transport the pallet 112 to the appropriate cell 111 location as defined in the product location repository 660. If the product ID does not exist, a new entry in the product location repository 660 may be defined for the pallet. According to embodiments where a pallet elevator device 210 is used to bring a pallet to the specific storage location, forklift 119 may bring the pallet 112 to an input of the pallet elevator device 210. The pallet elevator device may then transport the pallet 112 to the appropriate cell 111.

FIG. 50 is an example of sequence 1000 for operation managed by the order sequencer 650. Sequence 1000 functions to keep a record of all orders in the system. An order includes at least one product, and can comprise multiple products to be shipped to a location. As depicted, the sequence 1000 is a list used to track the orders having an order ID, to be filled in totes 116, each tote having a tote ID 1004. The specific product ID 1006 for each order ID 1002 will correspond to a product ID stored in product location repository 660 (and thereby on a specific cell 111). Each order ID 1002 may also include additional information such as a shipping address for the order ID 1002, any shipping preferences, and financial information. The order ID 1002 may be used to query additional databases or repositories for associated information. The sequence 1000 may additionally include for each order, a shipping address to send the order to, or may link to another table including shipping addresses.

Additionally, sequence 1000 may include shipping preferences (such as, for example, if there is a preference to use a particular carrier, packaging material, or dunnage type).

For each order ID 1002, tote conveyor controller 620 will instruct conveyor system 130 to transport a lined tote 118 from tote staging system 138 to the product location 1410 corresponding to the cell 111 containing the pallet 112 for each product in the order ID 1002. There, picker arm 114 will place an item from the palletized stack into the lined tote 118. Conveyor controller 620 will generate a path to each product cell location 1410, and instruct conveyor system 130 to transport the tote via the path for products in the order. As noted, electronic sensors such as barcode scanners or RFID sensors may be employed to detect where a lined tote 118 is within the conveyor system 130. Based on a detection and identification of lined tote 118, tote conveyor controller 620 may instruct a diverter how to transport the specific tote for a route. Once all the lined tote 118 has been filled with all items in the order ID 1002, conveyor controller 620 will instruct conveyor system 130 to transport the tote to a specific packing cell 1014 in packing system 120.

Order sequencer 650 may be configured to deliver the filled totes 116 (i.e. totes 116 that have completed traversal through all necessary storage units, and have been filled with all products in the order) to the order packing system 120 and the chosen packing cell 1014 simultaneously as the packing cell 1014 constructs an appropriate case for the order ID 1002.

New orders may be added to sequence 1000 upon receipt by the order sequencer. Orders may be removed from sequence 1000 upon being transferred to an output bay 104.

Packing cell controller 640 may determine a case size 1008 for the order ID 1002, as well as additional considerations such as a dunnage type 1010 and length 1012, along with a specific packing cell 1014 for packing the order ID 1002. Based on this determination, order sequencer 650 may determine when operational parameters will be communicated from packing cell controller 640, such as case size 1008, dunnage type 1010, dunnage length 1012. Accordingly, the operation of the specific packing cell 1014 will be synchronized with the conveyor system 130.

Order sequencer 650 may further assign a delivery vehicle for the order ID 1002 based on previously completed orders, and communicate a delivery path to a user interface on a vehicle for the vehicle to take. Based on this, output conveyor 140 will transport the sealed case to the delivery vehicle. The communicated delivery route for the delivery vehicle may be used by a delivery vehicle driver or autonomous driving system for case delivery.

Figures 51, 52:
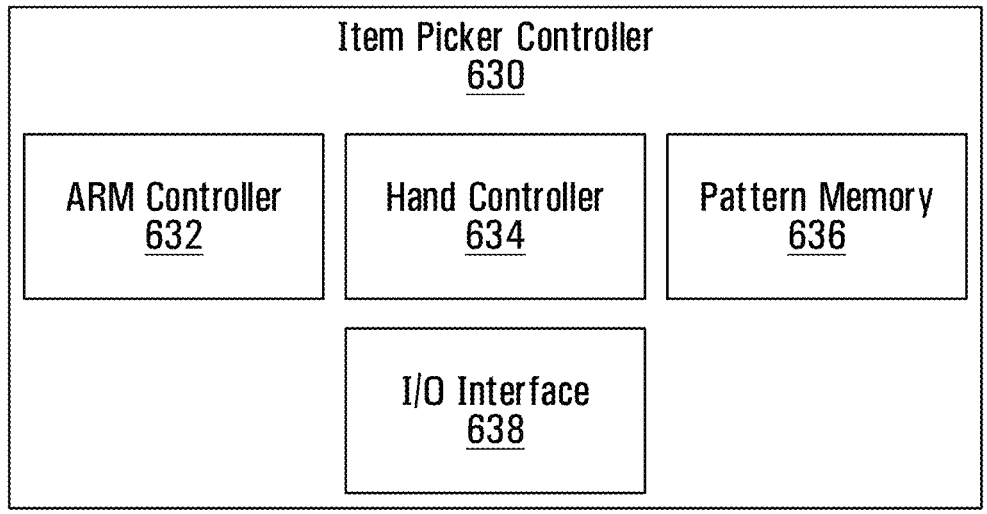
FIG. 51 is a block diagram of software components of the picker arm of FIG. 2.
FIG. 52 is an example case size repository for the packing station of FIG. 11.

FIG. 51 is a block diagram illustrating a detailed view of the software components of the item picker controller 630 of FIG. 10. The item picker controller 630 includes an arm controller 632, a end effector controller 634, a pattern memory 636, and an I/O interface 638. When item picker controller 630 receives indication that a tote 116 has been placed in the picking position, arm controller 632 will send operational signals to motors of the picker arm 114 to position the end effector 121 over an available item for picking. Then, hand controller 634 will send operational signals to the end effector 121 to pick up the item. After, the arm controller 632 will send signals to picker arm 114 to position end effector 121 over tote 116, and send signals to end effector 121 to release the item. In some embodiments, picker arm 114 is guided based on a stored representation of a pallet, stored in pattern memory 636. The representation may depict the locations of objects and boundaries thereof in a coordinate system. Pattern memory 636 is also able to track, using the pattern and previous order history, the amount of product left in a single case on a pallet 112. Additionally or alternatively, picker arm 114 may be guided using machine vision. Specifically, one or more optical sensors may acquire images of pallet 112 and its contents. Image processing techniques such as edge detection and pattern matching may be employed to determine object locations and boundaries in a two-dimensional or three-dimensional coordinate system.

Similarly, when item picker controller 630 has determined that there is no product left in a case (either by use of a vision system or virtual representation), the case will be discarded. When the item picker controller 630 has determined that there are no cases left on a pallet, the pallet base will be discarded. This is accomplished in a similar fashion to picking a specific item from the case itself. Picker arm 114 is positioned, and end effector 121 engages, moves, and disengages with the waste.

FIG. 52 is an example of case size repository 1450 used by order controller 650. As depicted, case size repository is a database table. Each case size is identifiable by a unique case size ID 1452. For each case size ID 1452, case dimensions 1458 for height, width, and depth are defined. Optionally, additional capacity parameters may be recorded. For example, as shown, case size repository includes a volume minimum 1454 and volume maximum 1456. Additionally or alternatively, other suitable parameters could be recorded such as minimum and maximum order weights. Case size repository further includes an indicator 1460 of which packing cells 310 includes blanks in magazines M1-M16 corresponding to the case size having ID 1102. Packing cell controller 640 may access the case size repository to determine the appropriate size case and packing configuration for the order ID 1002. Packing cell controller 640 sends operational commands to the packing system comprising a random case erector 314. The packing cell controller 640 will send commands to erect a case corresponding to each individual order. The sequence of commands sent to the random case erector 314 may be communicated such that as a completed order tote arrives at a packing station, the appropriate case has already been constructed and filled with dunnage.

Figure 53:
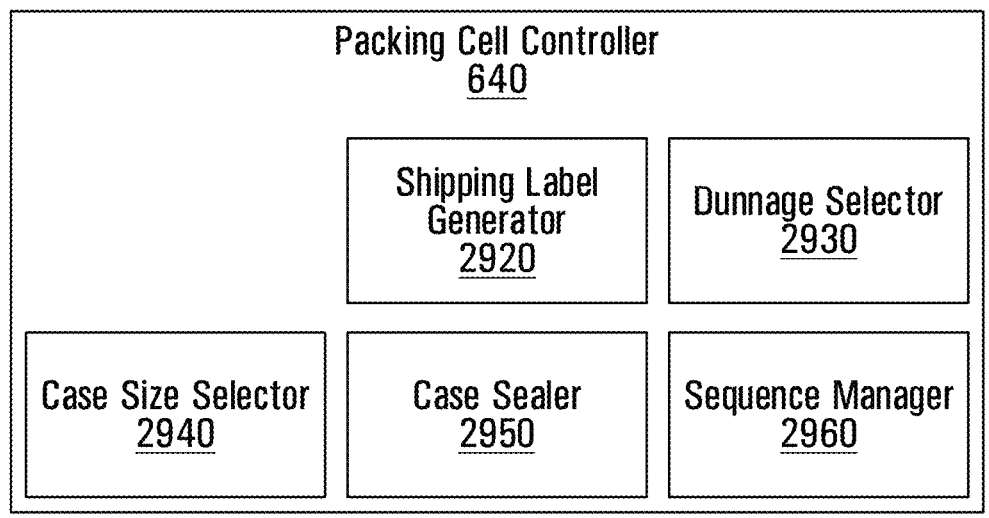
FIG. 53 is a block diagram of software components of a case erector controller.

FIG. 53 is a block diagram of simplified organization of example software components of packing cell controller 640. The packing cell controller 640 can include functional modules to control individual components of one or more packing cells. As depicted, the modules include shipping label generator 2920, dunnage selector 2930, case size selector 2940, and case sealer 2950 and sequence manager 2960, each are able to interface with the components of one or more packing cells 310 and order packing system 120 via one or more PLCs (such as PLC 5132) to cause physical operations to occur as described herein. Further, the software components are able communicate with each other and to access any appropriate database required to complete the functions as will be described. For example, the software components may be configured to communicate with each other via individual function calls between software components or requests to access the information stored at locations in a memory 206.

Order sequencer 650 maintains records of orders being fulfilled and details, e.g. physical dimensions, of products within such orders.

Figure 54:
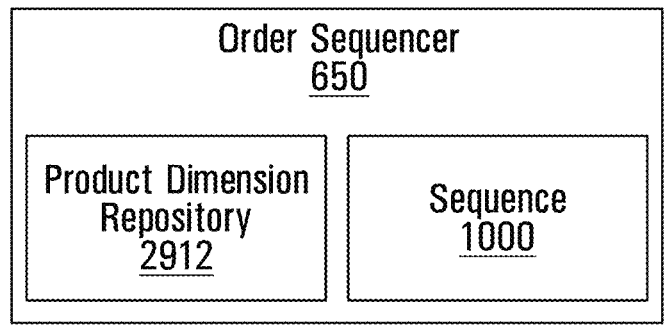
FIG. 54 is a block diagram of software components of an order sequencer.

As shown in FIG. 54, the order sequencer 650 includes a product dimension repository 2912 (e.g. a database or database table) and sequence 1000 (e.g. a database or database table). Sequence 1000 may have the same or similar structure to sequence 1000 of FIG. 50. The product dimensions repository 2912 can include the dimensions of each product, such as height, width, and depth. Individual products may have a unique SKU ID number associated with them. According to some embodiments, the database is stored locally in memory 206. According to other embodiments, this database is stored in a memory accessible on another server by way of a network. According to some embodiments, the order sequencer 650 further includes weights for each product and an indication of the product fragility.

Figure 55:
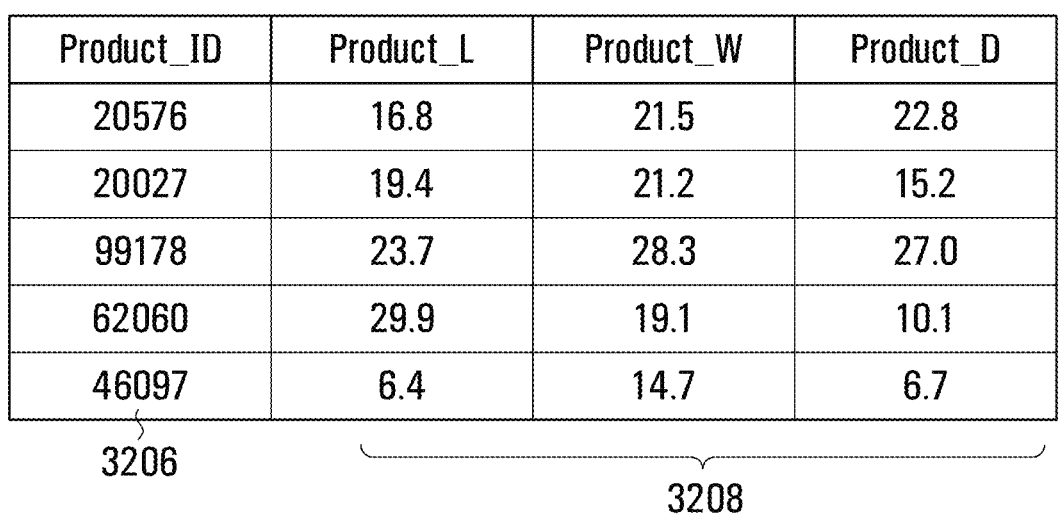
FIG. 55 is an example product dimension repository.

FIG. 55 is an example of a product dimension repository 2912 stored in the order sequencer 650, made up of information about the products in the order and their dimensions. As depicted, product dimension repository 2912 is a database table. The product dimension repository 2912 comprises products each having a unique product ID 3206. Each product ID 3206 has dimensions 3208. The product dimension repository 2912 would have entries for each possible product that could be used in orders within the order packing system 120.

Order sequencer 650 may also access sequence 1000, (FIG. 50). For example, sequence 1000 is stored as a table to track a sequence of orders having an order ID 1002, wherein each order corresponds to an individual tote containing at least one product 1006. Each product 1006 corresponds to a product that can be found in product dimensions 2912. Each individual tote may be tracked using an individual bin ID 1004. The order database, as will be described later, can also keep track of the case size 1008 selected to be constructed from the case construction apparatus, the dunnage type 1010 to be used in packing the case, the dunnage length 1012 to be used when packing the case, and the specific packing cell 1014 that the tote will be transported to. The case size 1008, dunnage type 1010, dunnage length 1012, and packing cell 1014 can serve as operational parameters delivered to order packing system 120 and a packing cell 310.

As will be apparent, product dimension repository 2912 and sequence 1000 may be linked tables within a database schema of order sequencer 650.

Figure 56:
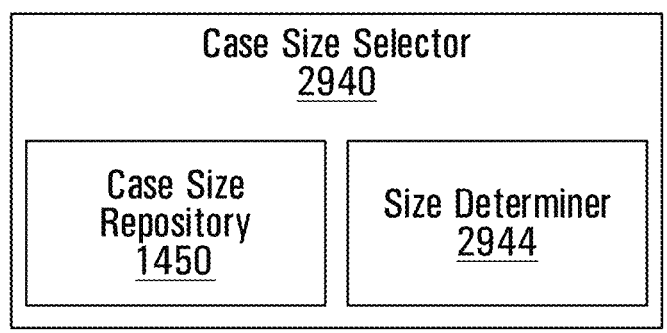
FIG. 56 is a block diagram of software components of a case size selector.

Case size selector 2940, as shown in FIG. 56 comprises a case size repository 1450 (FIG. 52) and size determiner 2944. In operation, case size repository 1450 comprises a database of available case sizes and the volume of the constructed case, along with the packing cell or cells 310 that includes blanks for the case size. Size determiner 2944 receives an input comprising an order ID 1002, including the product IDs 1006 and the individual product dimensions 3208, and calculates a volume for the order. Based on the order volume, the most appropriate case size is selected for use for the order.

Figures 57, 58:
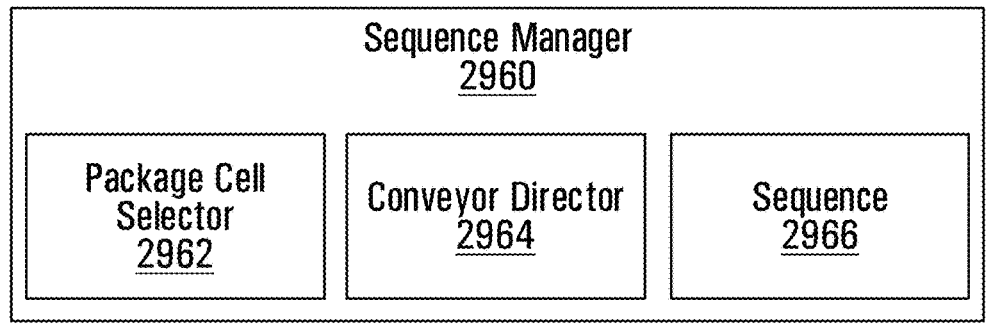
FIG. 57 is a block diagram of software components of a sequence manager.
FIG. 58 is an example sequence.

FIG. 57 is a block diagram showing sequence manager 2960, comprising a packing cell selector 2962, conveyor director 2964, and sequence 2966. The packing cell selector 2962 functions to select, based on the case size or any other optimization algorithm, the appropriate packing cell 310 to manage the order fulfilment. Sequence manager 2960, using the packing cell selector 2962, will generate and modify a sequence 2966 of cases constructed in the packing cell 310. The conveyor director 2964, based on input from the packing cell selector 2962, will supply operational signals to conveyors (such as order bin conveyor 2782 and case conveyor 324) to transport the blanks from case magazine M1-M16 in sequence 2966 to the appropriate packing cell 310. In operation, the filled totes 116/118 will be directed towards the packing cell 310, where each corresponding case will transported by the tote conveyor 382 to the packing station 318.

The conveyor director 2964 can define a path, i.e. a set of conveyors to be traversed for the case or tote to take to reach the appropriate packing cell. At intersections of conveyors, the system may include a diverter mechanism, to divert a tote or case from one conveyor path to a next conveyor path.

FIG. 58 is an example of sequence 2966 for a chosen packing cell 3314 managed by the sequence manager 2960. As depicted, the sequence 2966 is a list to track the filled totes, and the properties of the corresponding erected case 326. Sequence manager 2960 will generate an individual sequence 2966 for each packing cell 310 in the order packing system 120. The sequence 2966 may be linked to product dimension repository 2912 and sequence 1000 within a database schema of order sequencer 650.

As new orders 3302 having bins 3304 enter the order packing system 120, the sequence manager 2960 can add the order ID 3302 to the sequence 2966 for the chosen packing cell 3314. As completed cases 334 and empty totes 352 leave the chosen packing cell 3314, sequence manager 2960 can remove the order ID 3302 from the sequence 2966. In the same order as the sequence 2966, the filled totes will be delivered by order packing system 120 to the chosen packing cell 3314. Similarly, in the same order as the sequence 2966, the chosen packing cell 3314 will be given operational parameters for the order 3302, such as case size 3308, dunnage type 3310, dunnage length 3312.

Figure 59:
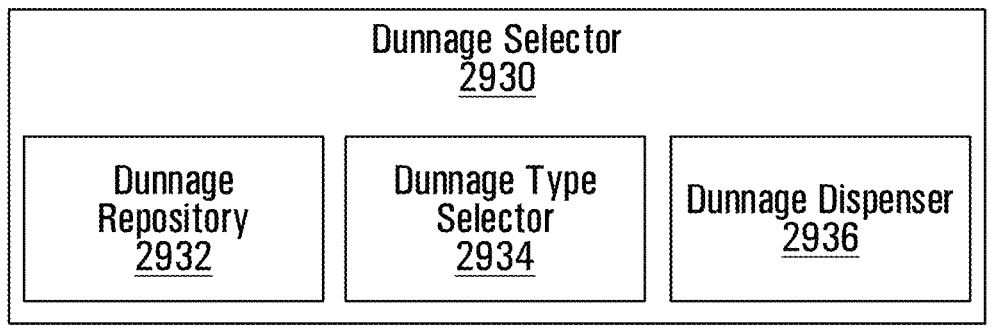
FIG. 59 is a block diagram of software components of a dunnage selector.

FIG. 59 is a block diagram showing components of the dunnage selector 2930. Dunnage selector 2930 includes a dunnage repository 2932, a dunnage type selector 2934 and dunnage dispenser 2936. In operation, an order ID 3302 is provided to dunnage selector 2930. Based on order information such as product dimensions 3208, weights and fragility, a type of dunnage and quantity of dunnage is determined, then dispensed. Examples of dunnage types include bubble wrap, packing peanuts, or loose paper. In some embodiments, dunnage types or quantities may be selected based on customer preference in addition to the product information (such as size or weight). For example paper dunnage may be selected for orders by customers who have expressed a preference for eco-friendly packaging.

The dunnage repository 2932 stores the types of dunnage available to be dispensed, and quantity increments in which it may be dispensed. For example, packing peanuts may be dispensed in defined volume increments and bubble wrap may be dispensed in discrete sheet sizes. Dunnage type selector 2924, based on the information in the order sequencer 650, determines the type and length to be dispensed by the dunnage dispenser 2926 of a packing cell 310. Determinations by the dunnage selector 2930 can be passed as operational parameters to a packing cell 310.

Figure 60:
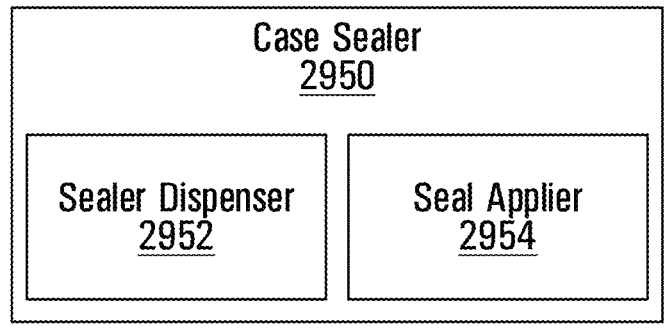
FIG. 60 is a block diagram of software components of a case sealer.

Case sealer 2950, as shown in FIG. 60, operates to seal the constructed cases once they have been filled at packing station 318. Case sealer 2950 includes sealer dispenser 2952 and seal applier 2954. In operation, seal dispenser 2952 will dispense the appropriate amount of sealing material (such as tape, for example) for the seal applier 2952 to apply to the constructed case.

Case sealer 2950, in operation, will receive an order ID 3302. The order ID 3302 can be used to query a database stored in a memory in a network for additional information. The database can include product information such as weight, or a case size previously determined for the order. Based on this information, case sealer will determine the appropriate amount of sealing material to dispense. For example, based on the order ID 3302, the case sealer 2950 can determine that the box has a depth of 50 cm, and then instruct the seal dispenser 2952 to dispense 50 cm of tape for the seal applier 2954 to apply.

Figure 61:
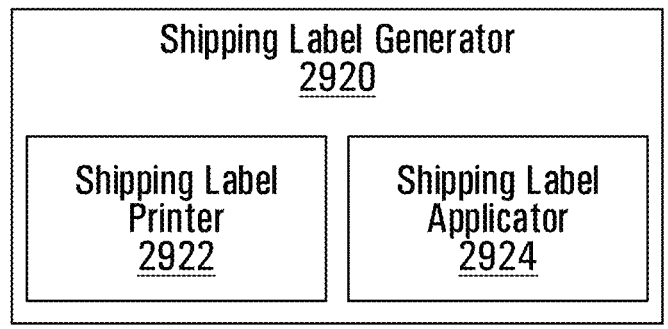
FIG. 61 is a block diagram of software components of a shipping label generator.

Shipping label generator 2920, as shown in FIG. 61, operates to print and apply shipping labels to the sealed cases for shipping. Shipping label generator 2920 includes shipping label printer 2922 and shipping label applicator 2924. In operation, shipping label printer 2922 will print the necessary details, for example a shipping address or bar code, for an order to a paper or sticker that can be applied to the case. Shipping label applicator 2924 will take the printed shipping label and apply the label to the sealed case.

Shipping label generator 2920, in operation, will receive an order ID 3302. The order ID 3302 can be used to query a database stored in a memory (such as the repositories in order sequencer 650) in a network for additional information. The database can include information such as shipping address, shipping type, and any information. Based on this information, shipping label printer 2922 will print the appropriate label for the shipping label applicator 2924 to apply to the case.

Methods

Figure 62:
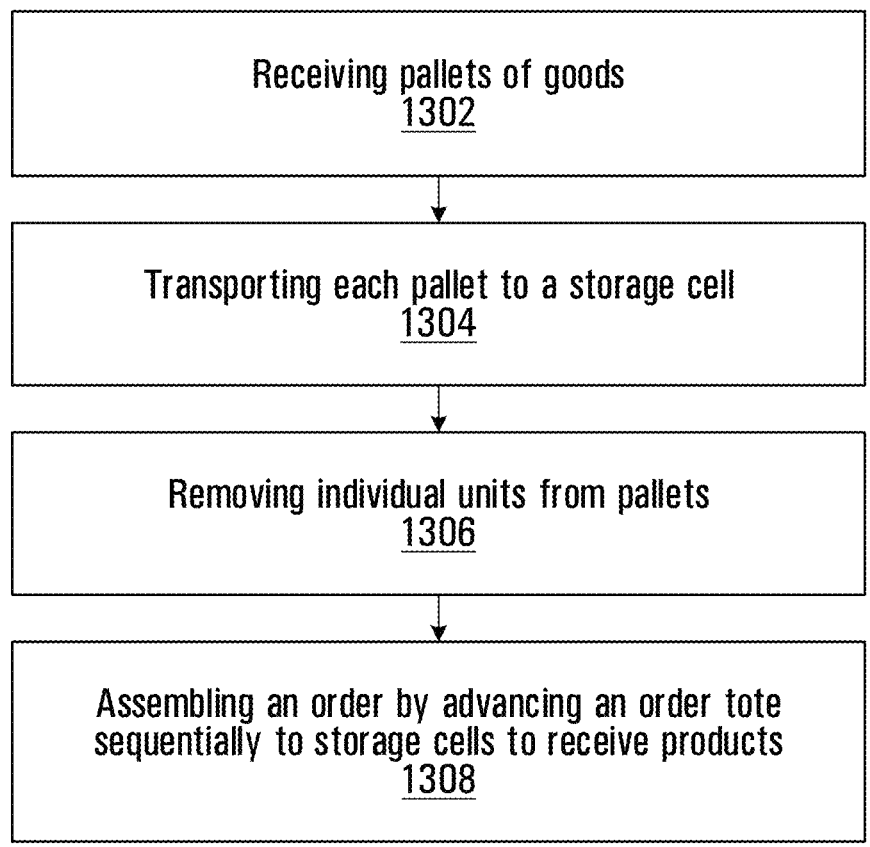
FIG. 62 is a flowchart showing an example method for fulfilling orders.

FIG. 62 is a flowchart illustrating a method for fulfilling orders and operating a fulfillment centre such as a warehouse.

At block 1302, a plurality of pallets 112 of goods is received. The pallets 112 contain a plurality of cases, each case containing a plurality of individual units of the goods. The pallet may be received at a loading bay 102, and lifted by a forklift 119 operating as an automated guided vehicle (AGV) configured to detect the pallet 112 location. The received pallet will have a unique identifier corresponding to the SKU the pallet holds. The unique identifier may be entered into an electronic device, either manually using a touch screen or keyboard, or by scanning a bar code or similar means. Based on the unique identifier for the pallet, a location within the product location repository 660 associated to the pallet is determined.

At block 1304, each pallet is transported to a storage cell corresponding to goods on the pallet. Input pallet AGV controller 610 may communicate operational commands (such as a route or specific location) to direct a forklift 119 to transport the pallet 112 to a specific storage cell or location as indicated in the product location repository 660. There, the forklift 119 will automatically disengage from the pallet base. According to some embodiments, multiple pallets may be stored at a specific location, and a pallet conveyor may be employed to transport a pallet to a picking position. According to embodiments where a pallet elevator device 210 is used to bring a pallet to the specific storage location, input pallet AGV controller 610 may be configured to instruct the forklift 119 to bring the pallet 112 to the pickup point 220 for the pallet elevator device 210. Then, input pallet AGV controller 610 may instruct the pallet elevator device 210 to transport the pallet to the specific storage location as indicated in product location repository 660.

According to some embodiments, responsive to a new order entering the system, a tote may be sent to tote staging system 138. There, tote may be lined by a liner machine. Once lined, totes may be transported along a route in tote conveyor system 130 via main lines, branch lines, and conveyors to a specific cell associated with an item in the order. When a tote has been deliver to a picking position (i.e. within an operable radius of the picker arm 114, picker arm may determine an individual item to remove from the pallet 112, using a vision system or a virtual representation of items and cases in the pallet 112.

At block 1306, individual units of goods from the pallet 112 are removed with picker arms 114 at the storage cell. Based on the determined individual item to remove from the pallet 112, the picker arm 114 will move to a position to engage with the individual item. An end effector 121 of the picker arm may be configured to engage with the individual item to lift, then move to the tote 116, and disengage, placing the item in the tote.

The cases 126 on pallet 112 may be half slotted cases or regular slotted cases. If the cases are regular slotted cases, the picker arm 114 may be configured to have an end effector 121 operable to cut open cases 126 to access the item inside. Similarly, picker arm 114 may be further configured to have an end effector 121 capable of slicing any packaging, shrink wraps, strapping etc.

According to some embodiments, when a case 126 or pallet 112 is completely picked, the picker arm 114 may discard of any waste product, pallet base, or excess cardboard such as a slip sheet.

At block 1308, an order of products is assembled by advancing an order tote sequentially to a plurality of storage cells to receive products from the robotic pickers. The individual products corresponding to the individual orders may be specified in the order received. An order sequencer 650 may be configured to communicate with tote conveyor controller 620 and product location repository 660 to determine a route from a previous picking position to a next picking position, and instruct tote conveyor system 130 the appropriate movements along branch lines 134 and main lines 132 to deliver the tote from a first position to a second position. Once there, the picker arm at the second position may engage with and transfer a second object from a case stored in a palletized form into the lined tote 118. This step may be repeated for all products within an order. If a product has more than one quantity of a single item, the picker arm will transfer multiple items, one at a time, at the same picking position.

Once the order has been completely assembled, the tote may be transported to a packing station. There, the products will be removed from the tote, and placed into an erected cardboard box for shipment. According to embodiments where the tote has a liner, the entire liner may be removed from the tote and placed, with the order items inside, into the erected cardboard box. The erected cardboard box may include dunnage and a printed shipping label according to the order specification. The box will then be sealed, labelled and placed on a delivery vehicle at output bay 104 for delivery.

According to some embodiments, the delivery may be selected according to a determined route, the route then provided to a computer interface on a delivery vehicle for driver instruction. According to some embodiments, the delivery vehicle may be an autonomous vehicle guided by the determined route as defined.

Figure 63:
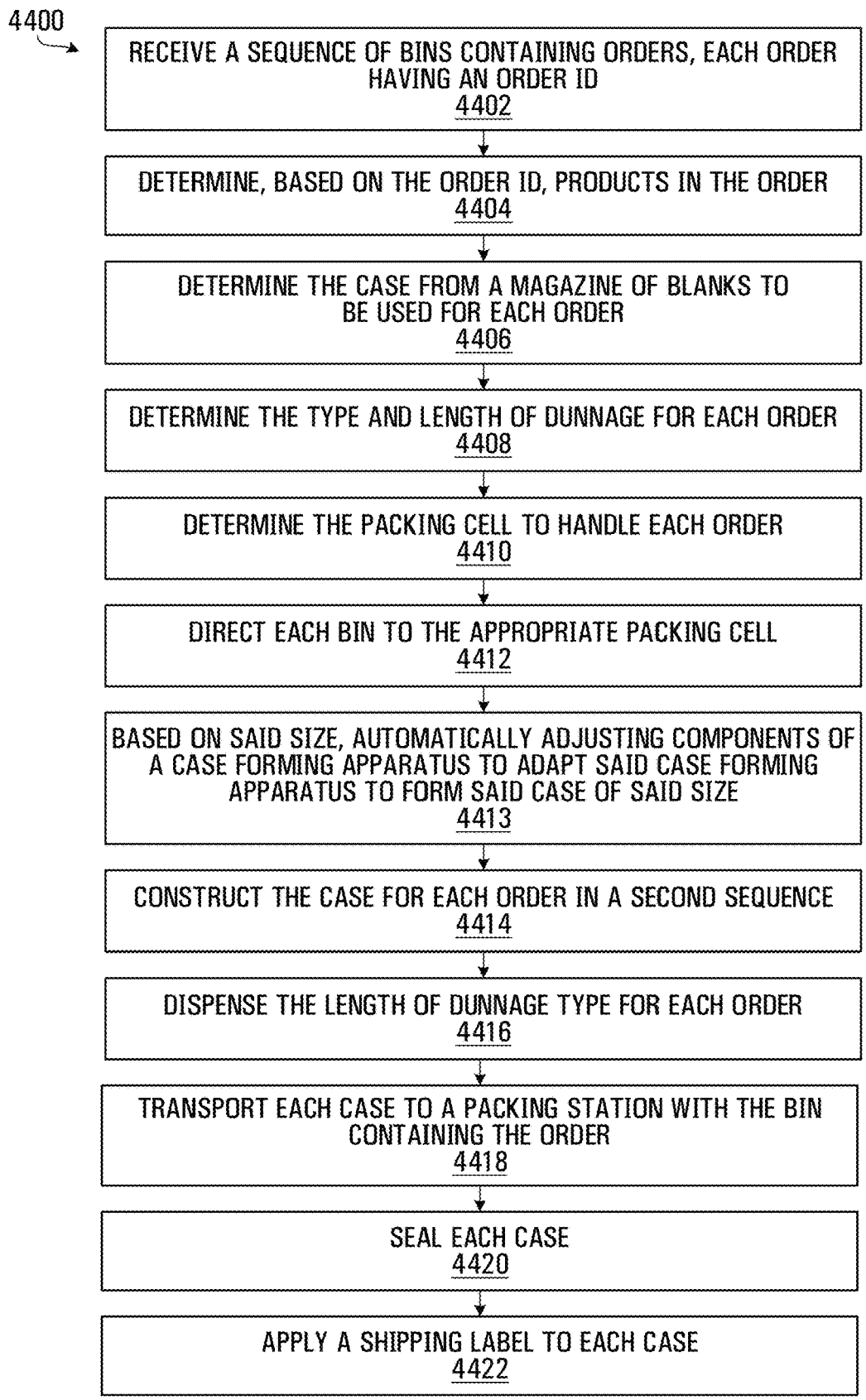
FIG. 63 is a flowchart showing an example method of packing orders.

FIG. 63 is flowchart illustrating an example method 4400 of packing product orders.

At block 4402, a unique sequence of totes containing orders, each order having corresponding order ID 3302, are received via order bin conveyor 2782. Each order ID 3302, is associated with information about the order, for example the products in the order, their dimensions, their weight, the shipping address for the order, etc.

Accordingly, at block 4404, based on the product ID, products in the order are determined. This can be done by querying a database or repository (such as those in order sequencer 650) for the products in each order.

Next, at block 4406, based on the products in the order, a case from a magazine of blanks is selected for use with the order. This can be done by a case size selector 2940 as described above with reference to the method 3600 of FIG. 65. The case size selector 2940 will determine, based on the products in the order determined at block 4404, and the available case sizes to case constructors in packing cells 310, the appropriate case size to be constructed for the order.

Next, at block 4408, the type and length of dunnage are selected. The available case volume from the case determined at block 4406, along with the fragility and weight of the products in the order are considered when selecting the type and amount of dunnage to dispense. An example method of dunnage selection is described in greater detail with reference to FIG. 66.

Next, at block 4410, based on the size of case, type of dunnage, and any optimization algorithm, a packing cell 310 is selected by the sequence manager 2960 for fulfilling the order as described above with reference to the method 3500 of FIG. 64. For example, if the size of cases in only available at a specific packing cell 310, this will be the packing cell 310 selected.

The determinations of steps 4406, 4408, and 4410, may be given to the order bin conveyor 2782, case conveyor 324, and packing cell 310 as operational parameters. For example, such parameters may be passed to the respective controllers of order bin conveyor 2782, case conveyor 324 and packing cell 310.

At block 4412, each tote is directed to the appropriate packing cell 310. According to embodiments where order bin conveyor 2782 comprises multiple sub-conveyors, the path instructions and diversion mechanisms will be defined for delivering the tote to the packing cell 310. The totes will be delivered in a sequence.

At block 4413, if necessary, components of the modified case forming system 5100 is adjusted to adapt the modified case forming system 5100 to form the case of the appropriate size. It is noted that components of the modified case forming system 5100 may not need to be adjusted in all situations, for example when selected case size is the same or similar to the size of the case most recently constructed prior to the selected case size in the sequence.

According to some embodiments, at block 4413, a position of an alignment component of a case blank alignment device is set so that when said case blank abuts said alignment component, said case blank has a predetermined position.

Additionally or alternatively, at block 4413, based on said size of said case, a stroke of a second alignment component may be adjusted. The first alignment component, according to some embodiments, is a laterally moveable first side guide for abutting a first side of said case blank in order to set a predetermined lateral position of said case blank and wherein the second alignment component is a laterally moveable second side guide for urging said case blank into abutment with said first side guide.

Next, at block 4414, modified case forming system 5100 constructs a sequence of cases. The sequence of cases corresponds to the totes being delivered from block 4412. That is, for each order at a particular packing cell 310, a corresponding case will be constructed of the size determined at block 4406. In operation, a blank will be transported by a conveyor from a magazine storing a plurality of case blanks to a case construction apparatus able to construct cases of various sizes.

Next, at block 4416, the length of dunnage type is dispensed for each order. The case is transported from case construction apparatus to a dunnage dispenser. The length and type of dunnage dispensed into a constructed case will correspond to that determined at block 4408.

At block 4418, each case is transported to a packing station with the tote containing the order that corresponds to that case. At the packing station, products are transferred from the tote to the constructed case. According to some embodiments, product transfer can be done by a person. According to other embodiments, product transfer can be done by a robotic device.

Next, at block 4420, each case is transported to a case sealer, configured to seal the case with the appropriate amount and type of sealer. The type of seal can be determined based on the case size.

Finally, at block 4422, a shipping label is applied to each case. The shipping label can include information such as the shipping address, a barcode, and any other information required to ship the case.

Figure 64:
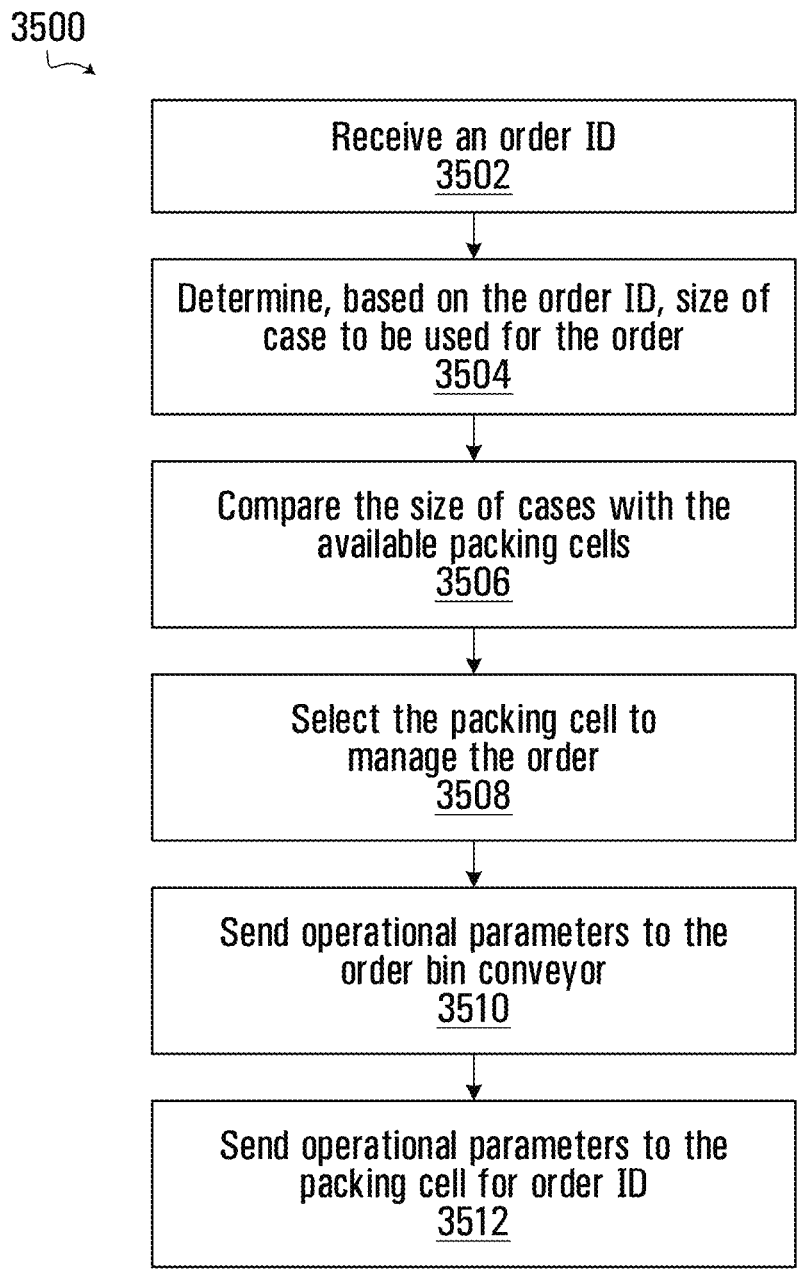
FIG. 64 is a flowchart showing an example method of use of the sequence manager.

FIG. 64 is flowchart illustrating an example method 3500 for the use of the sequence manager 2960.

At block 3502, an order ID 3302 corresponding to a filled tote on order bin conveyor 2782 is received.

Figure 65:
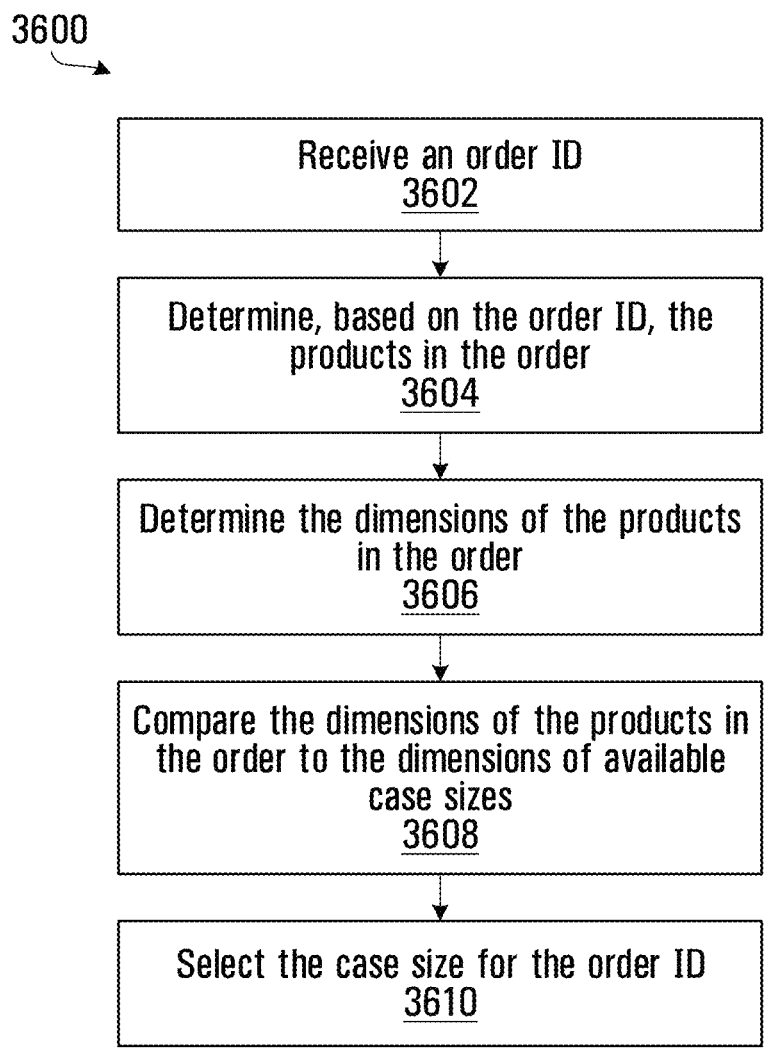
FIG. 65 is a flowchart showing an example method of use of the case size selector.

Next, at block 3504, the size of case to be used for the order is determined. This can be done using a case size selector 2940 and the method as shown in FIG. 65.

Next, at block 3506, the case size for the order from block 3904 is compared with the cases available at each of packing cells 310. This can be done by case size repository 1450 (FIG. 52) across the different packing cells 310. The packing cells 310 that have magazines containing blanks for the case size determined from block 3904 are identified.

Next, at block 3508, a packing cell 310 to handle the order is selected. According to embodiments where there are multiple packing cells 310, it is possible that the different packing cells 310 may be configured based on specific sizes of cases (i.e. a specific packing cell 310 for smaller cases, and a specific packing cell 310 for larger cases). Alternatively, in other non-limiting embodiments, the packing cell 310 selected may be random or evenly distributed.

Next, at block 3510, parameters are sent to the order bin conveyor to direct the filled tote to the selected packing cell 310 selected at block 3508. The individual path for the tote across the conveyors will be defined and any instructions for intersection conveyors or diverter mechanisms may also be defined and communicated.

Finally, at block 3512, operational parameters are sent to the packing cell 310 for the order ID 3302. This can include the case size to construct as determined in block 3504, among any other operational parameters.

FIG. 65 is flowchart illustrating an example method 3600 of selecting a case size. First, at block 3602, an order ID 3302 is received. The order ID 3302 may be a unique identifier for an individual order such as, for example, a purchase of products from an online marketplace. The order ID 3302 can be used to query a database stored in a memory in a network for additional information.

At block 3604, the products in the order are determined, based on the order ID 3302. This may be done, for example, by querying sequence 1000 (FIG. 54) stored in a memory on a network to return all product IDs 3306 for the individual order ID 3302.

At block 3606, the dimensions of the products in the order are determined. This may be done, for example, by performing a lookup in product dimension repository 2912 (FIG. 55) to return the dimensions 3208 for each individual product ID 3206 in for the product IDs 3306 associated with individual order ID 3302.

At block 3608, a query of case size repository 1450 (FIG. 52) is performed to identify candidate case types, namely, those case types that are capable of holding the products in the order. In an example, the dimensions of the products in the order are compared with the dimensions of available case sizes. Candidate cases may, for example, be those with length, width and height greater than the largest product in the order. Candidate cases may be filtered according to other capacity values. For example, according to some embodiments, a total volume of the products in the order is calculated and compared that to the total volume available in all cases in case size repository 1450. Cases with internal volume less than the total volume of products in the order, or with internal volume less than a defined multiple of the total product volume (e.g. 1.5×) may be eliminated as candidates. According to other embodiments the individual product dimensions are compared to those of cases in case size repository 1450.

Finally, at block 3610, the case size for the order ID 3302 is selected. According to some embodiments, the candidate case with the smallest internal volume is selected as the generated case size to use for the order. According to other embodiments, the case size selected as the case size for the order ID 3302 is the case in case size repository 1450 with the smallest maximum dimension, i.e. the case for which the maximum of its length, weight or height is the smallest.

An example approach for selecting case size is disclosed in U.S. Pat. No. 6,876,958 to Chowdhury et al., issued to assignee New Breed Corporation on Apr. 5, 2005 (hereinafter, "Chowdhury"), the contents of which is hereby incorporated by reference herein in its entirety. In particular, Chowdhury's product packaging utility processes each order placed by a customer to automatically identify, from available case types/sizes/configurations, a type/size/configuration of suitable case (or cases) suitable for packaging the products in the order. Chowdhury's a product packaging utility identifies/determine suitable case(s) according to an algorithm/function that accesses and uses one or more electronically-stored characteristics of each product in the order (e.g., dimensions, weight, etc.) and one or more electronically-stored characteristics of available case types (e.g., dimensions, size, configuration, type, maximum volume that can be held, maximum weight that can be held, etc.). This algorithm identifies suitable cases such that a minimum number of cases and the smallest size cases suitable for packaging the products in the order may be provided. Thus, identification of suitable case types/sizes/configurations can be optimized to provide an optimal case type/size/configuration which minimizes packaging material used and to minimize empty space in cases, and a case identified as suitable may be referred to as an "optimal" case. It will be appreciated that identification of suitable case types/sizes/configurations may also be identified or optimized according other pre-defined criteria. The case identification algorithm of Chowdhury's product packaging utility may also take into account other factors and constraints such as, e.g., the availability of each type/size/configuration of case, the maximum fill ratio of each type/size/configuration of case, the maximum number of products that can be placed into each type/size/configuration of case, and whether certain products are pre-packaged together and therefore must be placed in the same case. Thus, using Chowhury's product packaging utility, case size selector 2940 may process a customer order for specific products by accessing information in it memory and utilizing an algorithm/function to identify a suitable case (or cases) for packaging those products from a plurality of available cases.

It should be noted that the size of the case may be the overall internal available volume of the case in which items may be held. The size may also be the specific dimensions of the case. The type of case may include the reference to what material the blanks is made from (e.g. paperboard or corrugated cardboard). Its configuration may an indication of it being a top opening case which is generally cuboid in shape when closed, or another configuration such as a regular slotted case, etc.

Chowdhury's product packaging utility may also generate, for each case of a particular type/size/configuration identified to fulfil an order, a packing list indicating the order in which each of the products is to be preferably placed into the case, as well as placement information indicating where each product is to be preferable placed in the case. For example, this placement information may be expressed using coordinates (e.g., 0, 0, 0) in a coordinates system defined for the case and/or descriptors of locations in the case (e.g., front, right hand side, second layer, etc.). Thus, when order the case size selector 2940 includes a product packaging utility such as Chowdhury's product packaging utility, case size selector 2940 may generate a packing list and/or placement information for each identified case. Case size selector 2940 may also generate a diagram illustrating a desired optimal physical arrangement of the products in each case. Such a diagram may be readily generated using placement coordinates for each product, as provided by Chowdhury's product packaging utility.

The generated case size can be inputted as an operational parameter to one of packing cells 310, wherein the selected case size corresponds to a case blank 101 stored in one of the associated magazines M1-M16. The generated case size can be recorded in the corresponding record of sequence 1000.

Figure 66:
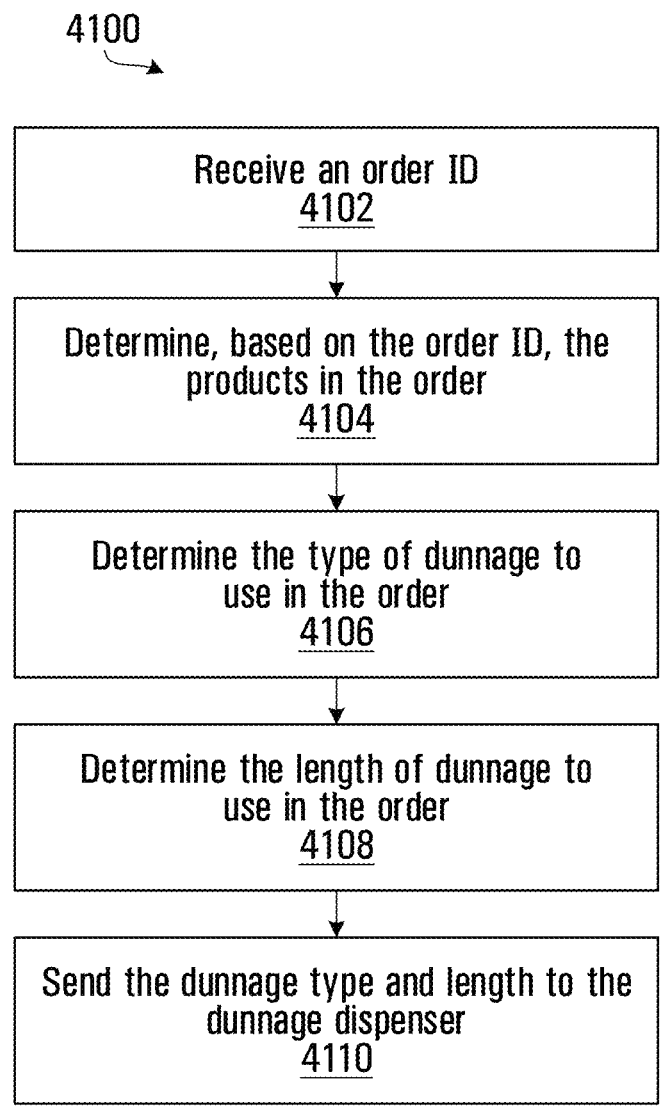
FIG. 66 is a flowchart showing an example method of use of the dunnage selector.

FIG. 66 is flowchart illustrating an example method 4100 for selecting dunnage.

At block 4102, an order ID 3302 is received.

At block 4104, the products in the order are determined, based on the order ID 3302. This may be done, for example, by querying a database stored in a memory on a network to return all products IDs 3206 associated with the individual order ID 3302. Individual products, as shown in FIG. 55, may themselves have unique identifiers 3206 and individually recorded dimensions 3208. In some embodiments, blocks 4102, 4104 may be performed based on a single instruction message received by dunnage selector 2930. For example, the instruction message may include order ID 3302 along with all of the corresponding record of sequence 1000. Alternatively, an instruction received at 4102 may include only an order ID 3302 and dunnage selector may responsively query for product information from sequence 1000.

At block 4106, the type of dunnage to use in the order is determined. Examples of dunnage types include bubble wrap, packing peanuts, or loose paper. Dunnage types may be selected based on the product information (such as size or weight), or based on information stored in the database about a user who has made the order, for example that they would prefer an eco-friendly dunnage type.

At block 4108, the quantity (e.g. length or volume) of dunnage to use in the order is determined. According to some embodiments, quantity of dunnage to use in the order may be a function of the empty space left in the case, including the space occupied by the products in the order.

Finally, at block 4110, instructions are sent to the packing cell 310 for the order ID 3302. This can instruct the packing cell 310 that for each case in the sequence of constructed cases, to dispense the amount and type of dunnage determined by the method 4100.

Figure 67:
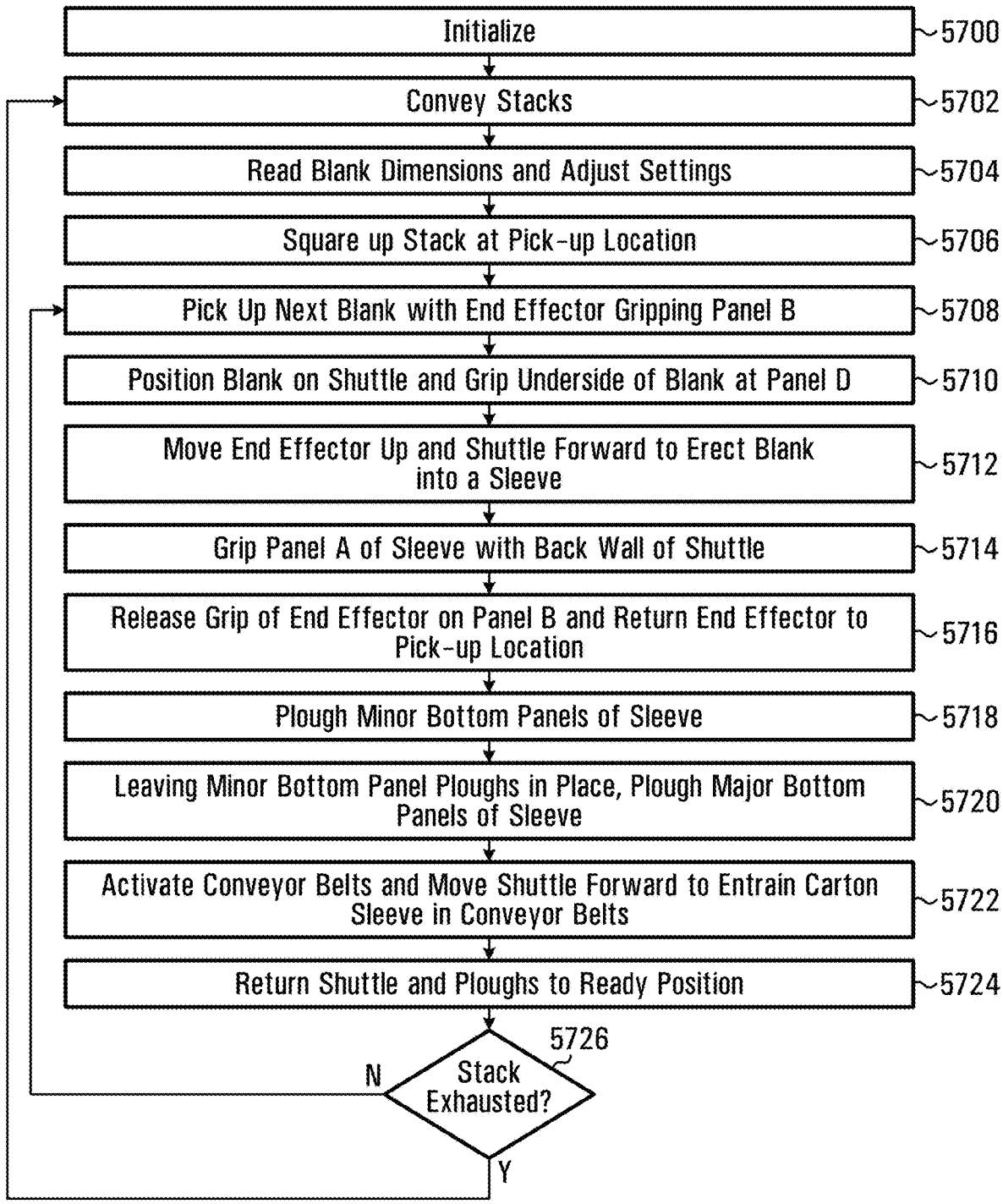
FIG. 67 is a flowchart showing an example method of constructing cases.

The overall operation of case forming system 5100 will now be described further in conjunction with FIG. 67, which is a flowchart of the sequence of operations of the PLC.

To prepare case forming system 5100 for operation, one or more stacks of knock-down case blanks 101 may be placed at the input end of case conveyor 324. In this regard, it is assumed the blanks are placed on the case conveyor 324 with panels A and B, and flaps E, F, I, and J facing up, as shown in FIG. 19A, and the common edge of end flaps F and J facing side wall 5200 as shown by the blank 101 in FIG. 17A. Case forming system 5100 may then be activated, such as by PLC 5132 being instructed through HMI 5133 to commence the processing of blanks 101. As an initial step PLC 5132 may initialize the system by ensuring that all components are put in their "start" positions (step 5700). PLC 5132 may then send an instruction to the drive motor of case conveyor 324 causing stack(s) of blanks 101 to be conveyed downstream in the X-direction (step 5702) toward an identification reader. An identifier on the first stack may then be read by the identification reader 5205 which identifies the dimensions of the blanks in the first stack. With this information and in order to adapt case forming system 5100 to process blanks of the size in the first stack, the PLC adjusts the stroke of both the outer side wall 5201 and the shuttle 5140, the path of end effector 5120, the vertical position of the folding fins 5500, 5510, the folding ploughs 5530, 5540, the tape sealer 5640 and flap folding rods 5632, and upper conveyor 5600 (step 5704).

Sometime prior to a blank reaching alignment conveyor 5206, the outer side guide wall 5201 under control of PLC 5132 will be driven by servo motor 5260 to expand wide enough to allow the blank to enter alignment conveyor 5206, even if the stack is misaligned and/or the blanks in the stack are not perfectly square with each other. The stack(s) of blanks moves downstream, until the front edge of the (first) blank passes the downstream edge of case conveyor 324 at which time sensor 5242 sends a signal to PLC 5132 indicating that the front edge of the stack has reached the input to alignment conveyor 5206. In response, PLC 5132 may stop case conveyor 324 and send an instruction to the drive motor of alignment conveyor 5206 to cause the blank 101 to move downstream towards end picket wall 5218. Once the front edge of the blank 101 reaches end wall 5218, sensor 5240 will send a signal to PLC 5132 indicating that the front edge of the blank has reached end wall 5218. In response, PLC 5132 can then move the outer side wall 5201 inwardly to straighten the stack laterally and initiate the tamping sequence to "square up" the blank longitudinally, as detailed above (step 5706).

In review, the sequence for ensuring the blanks are properly squared up at the pick-up location may include the following steps. The side guide wall 5201 moves inwardly to make contact with the side of the blank and press the stack against the left hand side guide wall 5200. This aligns the blanks so the lateral edges of the blanks are aligned with each other. This also moves the tamping plate 5280 in behind the stack. The tamping plate 5280 may then move forwardly to press the stack forward against the picket wall 5218, thereby aligning the blanks in the stack longitudinally so that their front and rear edges are vertically aligned with each other. The blank 101 is then properly positioned at the pick-up location so that the end effector 5120 can begin picking up blanks from the stack.

End effector 5120 will be positioned by the control of PLC 5132 over movement apparatus 5115, at the zero position calibrated for the end effector 5120. PLC 5132 may then cause servo motors 5150 and 5154 to be operated to achieve the following sequence of operations.

First the end effector 5120 may be moved to the pick-up location as shown in FIG. 14A such that the end effector is directly over panel B of the top blank in the blank at the pick-up location.

As the end effector 5120 is brought vertically downwards to retrieve the top blank on the blank 101, the end effector's movement just prior to suction cups 5312 contacting with the upper surface of the blank will be generally vertically downwards. Prior to the suction cups 5312 contacting the surface of a panel B of a blank, sensor rod 5380 will contact the surface of panel B and be pushed upwardly. This upward movement of sensor rod 5380 relative to plate 5327 will cause a sensor to be activated and send a signal to PLC 5132. PLC 5132 responds to that signal by causing servo motors 5150 and 5154 to slow down so that the final few centimeters (e.g. 3.5 cm) of movement downwards towards contact between cups 5312 and the upper surface of panel B occurs at a much slower rate. Also, PLC knows how much further vertically downwards the end effector 5120 must be lowered to establish proper contact between suction cups 5312 and panel B. PLC 5132 will then operate the valve device 5330 on end effector 5120 to cause suction force to be developed at suction cups 5312. Sensor rod 5380 and its associated sensor device can also be used to ensure that PLC 5132 is aware of whether, once a blank has been engaged in the magazine, it remains engaged with end effector 5120 until it is intentionally released.

With the end effector 5120 in the pick-up location and the suction force being applied at suction cups 5312, the end effector 5120 engages panel B of the top blank and then lifts the blank lift upwards (step 5708).

When the end effector 5120 has reached a determined height it is moved laterally in the Y-direction until it is positioned over shuttle 5140.

Next, with reference to FIG. 40, the end effector descends until the blank sits on the bed 5400 of the shuttle with the hinge line R between side panel A and side panel D (FIG. 19B) positioned against the vertically extending back wall 5404 of the shuttle 5140. The PLC then activates the suction cups 5408 at the base 5402 of the shuttle bed to grip the underside of the blank, and specifically side panel D of the blank (step 5710). Notably, side panel D, being the panel directly underneath side panel A in the knock-down blank, is not directly hinged to panel B, which panel is gripped by the end effector.

Figure 41:
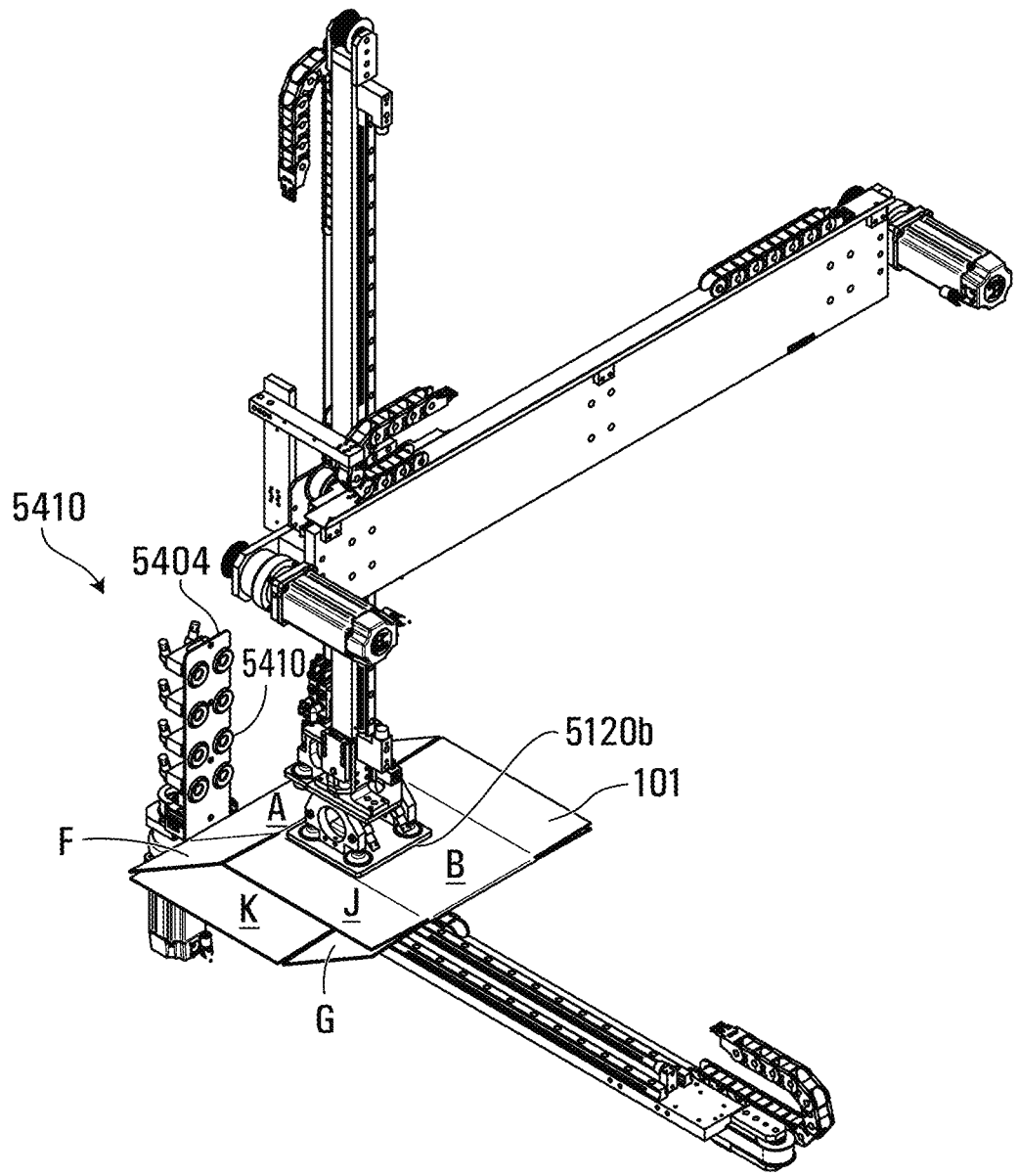
FIG. 41 is an isometric view of a sub-assembly of the random case erector of FIG. 13.

The end effector 5120 is then raised vertically in the Z-direction while, simultaneously, the shuttle 5140 is moved forwardly in the X-direction. In consequence of these operations, provided the simultaneous motions of the end effector and shuttle are appropriately co-ordinated, since underside panel D of the blank is gripped at the base of the shuttle and top panel B of the blank is gripped by the end effector, the blank begins to open up as illustrated in FIG. 41.

The end effector 5120 continues to move vertically upwardly and the shuttle simultaneously continues to move forwardly until the blank is fully erected into a case sleeve as illustrated in FIG. 42. The PLC will recognize this end point due to its knowledge of the dimensions of the sleeve. With the blank formed into a case sleeve, panel A of the sleeve (seen in FIG. 41) abuts the back wall 5404 of the shuttle 5140 (step 5712).

With panel A abutting the back wall 5404 of the shuttle, the suction cups 5410 of the back wall are activated so that panel A is gripped by the back wall 5404 of the shuttle (step 5714). With both panels A and D held by the shuttle, the case sleeve is held in its erect position without need of support from end effector 5120. Therefore, at this stage, the suctions cups 5312 of the end effector 5120 are de-activated and the end effector is moved away from the shuttle 5140 back to the pick-up location (step 5716).

Figure 44:
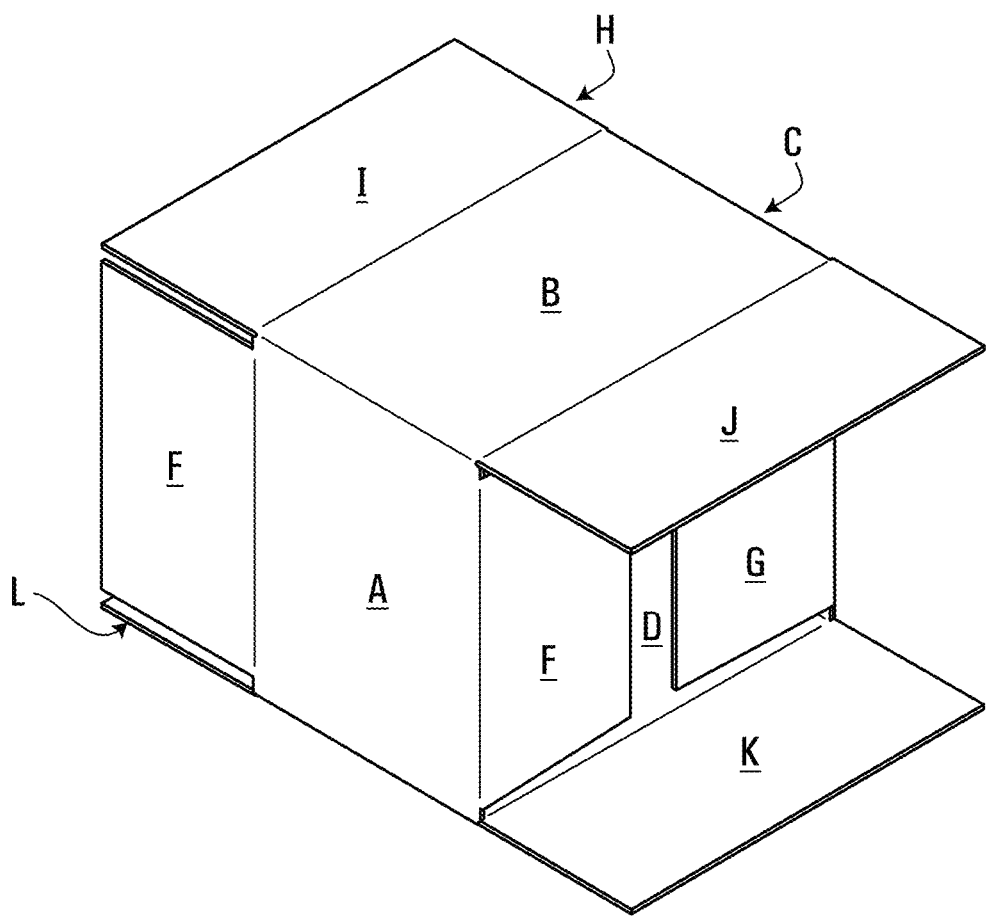
FIG. 44 is an isometric view of a case erected from the knock-down blank of FIGS. 19A and 19B.

Next, with shuttle 5140 held stationary, fin ploughs 5500, 5510 are moved toward one another until they are adjacent one another as shown in FIG. 33 (step 5718). This has the effect of folding minor bottom end panels F and G of the case sleeve inwardly, as shown in FIG. 44. In this regard, it will be recalled that the vertical position of the fin ploughs 5500, 5510 was set based on the size of the blank. This setting is so as to result in the fin ploughs contacting panels F and G at their midpoint.

Figure 46:
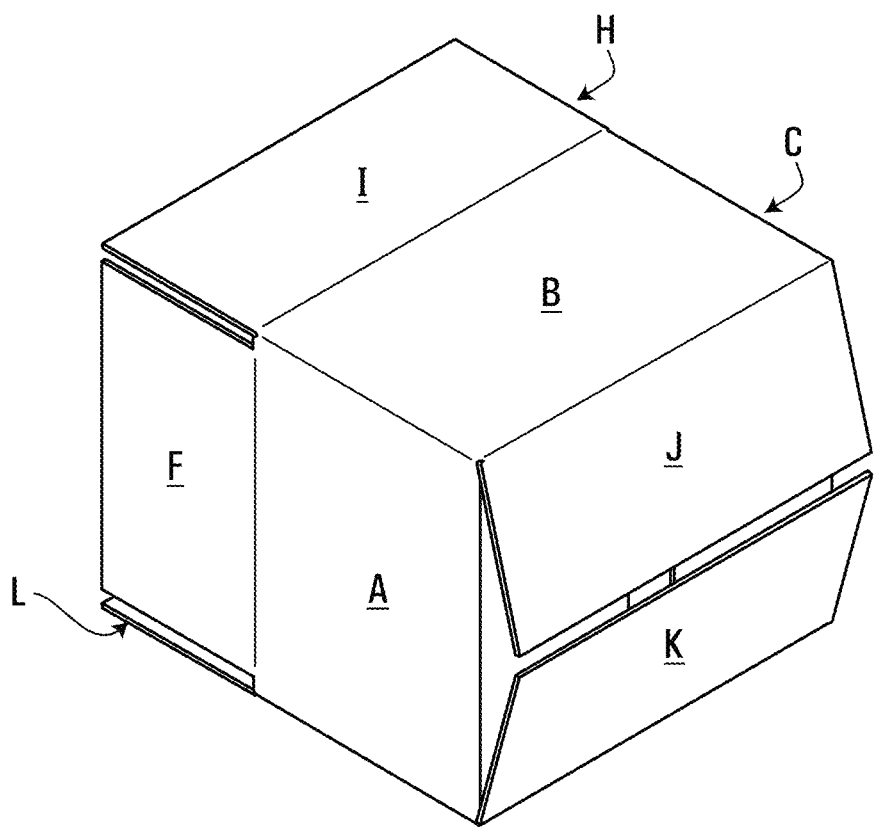
FIG. 46 is an isometric view of a case erected from the knock-down blank of FIGS. 19A and 19B.

With the shuttle remaining stationary and the fin ploughs remaining adjacent one another, the upper and lower ploughs 5530, 5540 are next moved toward one another until these ploughs are positioned at a small stand off from fin ploughs 5500, 5510 as shown in FIG. 45 (step 5720). This has the effect of folding major bottom flaps J and K of the case sleeve inwardly, as shown in FIG. 46.

Leaving all of the ploughs in place, the PLC next activates conveyor belts 5600, 5610 and moves the shuttle 5140 downstream until the belts frictionally grip side panels B and D of the case sleeve and pull it downstream, extracting it from the ploughs (step 5722).

As the sleeve is pulled downstream from the ploughs 5500, 5510, 5530, 5540, the outside surface of major bottom flaps J and K are brought into contact with folding rods 5632 which progressively complete the fold of flaps J and K. The case sleeve is then pulled past tape sealer 5640 by conveyor belts 5600, 5610 at which sealer the seam between flaps J and K is taped in order to tape closed the bottom of the case sleeve to form a case. The case is then ejected to the re-orienting station where it is deflected by deflector plates 5650, 5652 as it falls onto the discharge conveyor 5117 so that the bottom of the case (i.e., flaps J and K) rest on the discharge conveyor. The discharge conveyor then conveys the case to the output of case forming system 5100.

Once the case sleeve has moved downstream from the ploughs 5500, 5510, 5530, 5540, these ploughs are retracted from one another and the shuttle 5140 is returned to its initial position in order to prepare case forming system 5100 for processing the next case blank (step 5724); the end effector can then pick up the next blank in the stack (step 5726).

After exhausting the current blank 101, the next stack is conveyed to the information reader 5205 and the PLC will read the dimensions of blanks in the next stack (step 5726). Thereafter, once the last blank in the current stack has moved downstream of the conveyor belts 5600, 5610, if the blanks in the next stack have different dimensions from the dimensions of blanks in the now exhausted stack, the PLC adjusts the stroke of the outer side wall 5201 and the shuttle 5140, the path of end effector 5120, and the vertical position of the folding fins 5500, 5510, the folding ploughs 5530, 5540, tape sealer 5640 with folding rods 5632, and upper conveyor 5600. Case forming system 5100 is then readied to handle the next stack and it is moved to the pick-up location and the described processing operations repeated.

The system provides a relatively high processing capacity in part due to the relatively short "stroke" (i.e. longitudinal distance) that the end effector and shuttle must travel when carrying out the blank retrieval and erection. This means that the components do not have to travel such a great distance as in conventional case erectors.

The system also has a relatively small footprint due to the U-shaped path provided for cases blanks erected into cases by the system. More specifically, incoming blanks are conveyed in an upstream X-direction to the pick-up location. These blanks are then conveyed in a Y (and Z) direction to the shuttle where they are then conveyed downstream in the X-direction.

Many variations of the embodiments described above are possible. By way of example the system may employ a second movement apparatus and end effector, identical in construction to movement apparatus 5115 and end effector 5120, but a mirror image thereof. With such an arrangement, the two devices may be mounted side-by-side with the two end effectors operating in the same plane. Collisions between the two end effectors can be avoided by operating the two movement apparatus such that the two end effectors are always 180° out of phase with one another.

Once transferred from case conveyor 324 to alignment conveyor 5206, the alignment conveyor 5206 may then under the control of PLC 5132 move each blank sequentially to the pick-up location in the manner described previously with respect to case forming system 5100.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

As described above, data structures are depicted as database tables. However, other types of data structures or methods of storing information may be used. For example, data repositories described herein may be stored in text files or other delimited files or other information storage structures. As another example, graph databases, key-value stores, wide column stores, document stores, or any other form may be used.

Although physical control and input/output devices may have been described and depicted above, such devices may be implemented using virtualised versions. For example, PLCs may be implemented using a virtual PLC system. Similarly, network interfaces and I/O interfaces may be implemented virtually.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

What is claimed is:

1. A warehouse system for fulfilling an order comprising a plurality of products, comprising:
    a plurality of storage cells defined by a frame, each storage cell for receiving palletized products, the palletized products packed in cases each comprising a plurality of units, said cases arranged on a pallet in a shipping configuration;
    a transport system operable to sequentially advance a product container to a selected plurality of said plurality of storage cells corresponding to a plurality of products in said order, for collecting at least a portion of said order in said product container;
    a plurality of robotic pickers at said storage cells, each operable for engaging individual units of a product, to transfer said individual units from said pallets to said product container;
    wherein a robotic picker of said plurality of robotic pickers is mounted on said frame at a respective storage cell of said plurality of storage cells, and each said robotic picker is dedicated to each said respective storage cell, and each said robotic picker at said respective storage cell has an operating envelope that provides for engagement by each said robotic picker of all said individual units of said product on said pallet in its respective storage cell and for releasing products into said product container.

2. A warehouse system as claimed in claim 1, wherein the product container comprises a tote for holding said at least portion of an order, and wherein said robotic picker of said plurality of robotic pickers is operable to transfer said at least a portion of an order from said tote to a shipping case.

3. The warehouse system of claim 2, further comprising a case erector operable to erect said shipping case.

4. The warehouse system of claim 3, wherein said case erector is operable to erect cases of a plurality of different sizes.

5. The warehouse system of claim 4, wherein said case erector is operable to erect a case of a selected one of the plurality of different sizes, based on sizes of said products of said order.

6. The warehouse system of claim 1, wherein each robotic picker of said plurality of robotic pickers is mounted overhead on said frame at each of said storage cells.

7. The warehouse system of claim 1, wherein said robotic pickers are operable to remove packing material from pallets at said storage cells.

8. The warehouse system of claim 7, wherein said robotic pickers are operable to cut said packing material.

9. The warehouse system of claim 1, wherein said robotic pickers are operable to remove empty cases from pallets at said storage cells.

10. The warehouse system of claim 1, comprising a plurality of zones maintained at different temperature conditions.

11. The warehouse system of claim 1, wherein said transport system comprises a plurality of branching conveyors, each of said branching conveyors passing proximate a subset of said plurality of storage cells.

12. A warehouse system as claimed in claim 1, wherein at least some robotic pickers of said plurality of robotic pickers are further operable for cutting or removing tops of the cases on said pallets to permit removal of the individual units of said product from the cases.

13. A warehouse system as claimed in claim 1, wherein at least some robotic pickers of said plurality of robotic pickers comprise a picker arm having a first end region mounted above said pallets in each said storage cell, and said arm has an opposite end region to which is mounted an end effector.

14. A warehouse system as claimed in claim 13, wherein at least some robotic pickers of said plurality of robotic pickers are under the control of a guidance system.

15. A warehouse system as claimed in claim 14, wherein said guidance system comprises at least one camera mounted proximate to each picker arm, said at least one camera operable to capture overhead images of said pallets.

16. A warehouse system as claimed in claim 15, wherein said guidance system further comprises at least one camera positioned laterally of each respective storage cell and operable to capture side images of said pallets.

17. A warehouse system as claimed in claim 16, further comprising an image processor operable to process said side images and overhead images to detect locations of said individual units on said pallets.

18. A warehousing method, comprising:
receiving a plurality of pallets of goods, each of said plurality of pallets containing a plurality of cases, each of said plurality of cases containing a plurality of individual units of said goods;
transporting each said pallet of said plurality of pallets to a storage cell corresponding to goods on that pallet;
cutting or removing tops of the cases on each pallet of the plurality of pallets at said storage cells with the robotic pickers to permit removal of said individual units of said goods from the cases;
removing individual units of said goods from said pallets with a robotic picker of a plurality of robotic pickers located at each of said plurality of storage cells;
assembling at least a portion of an order of products by advancing a product container sequentially using an automated product container transport system to a multiple of said plurality of storage cells to receive products from each of said plurality of robotic pickers;
wherein each robotic picker of said plurality of robotic pickers is dedicated to and mounted on a frame defining each respective storage cell of said plurality of storage cells and each said robotic picker has an operating envelope that provides for engagement by each said robotic picker of all said individual units of a product on said pallet in its respective storage cell and releasing said individual units into said product container.

19. The warehousing method of claim 18, wherein the product container comprises a tote for holding said at least portion of an order, and wherein said method further comprises transferring said order from said tote to a shipping case.

20. The warehousing method of claim 18, comprising automatically erecting said shipping case.

21. The warehousing method of claim 20, wherein automatically erecting said shipping case comprises selecting one of a plurality of possible case sizes based on sizes of said products of said order, and conveying a blank corresponding to said selected one of a plurality of case sizes to a case erector.

22. The warehousing method of claim 18, comprising removing packing material from said pallets with said robotic pickers.

23. The warehousing method of claim 22, comprising cutting said packing material with said robotic pickers.

24. The warehousing method of claim 18, comprising maintaining multiple warehouse zones at different temperatures.

25. The warehousing method of claim 18, wherein said assembling an order comprises conveying said product container along a branching conveyor, wherein each branch of said branching conveyor passes proximate a subset of said plurality of storage cells.

26. A warehouse system for fulfilling orders comprising a plurality of products, comprising:
a plurality of storage cells, each storage cell for receiving palletized products, the palletized products packed in cases each comprising a plurality of units, said cases arranged on a pallet in a shipping configuration;
a transport system operable to sequentially advance a product container to a plurality of said storage cells corresponding to a plurality of products in an order, for collecting at least a portion of said order in said product container;
a plurality of robotic pickers, each of said plurality of robotic pickers operable for engaging individual units of a product at said storage cells, to transfer said individual units from said pallets to said product container;
wherein said warehouse comprises a first zone, and a second zone, wherein the first zone and the second zone are maintained at different environmental conditions, and wherein a first storage cell of said plurality of storage cells in situated in the first zone and a second storage cell is situated in the second zone;
and wherein a first type of product is stored in the first zone and a separate type of product is stored in the second zone;
and wherein said transport system is operable to advance said product container to the first storage cell in the first zone to receive from a robotic picker a first type of product, and the transport system is further operable to advance said product container to the second storage cell in the second zone to receive at least one unit of the second type of product.

27. A warehouse system as claimed in claim 26, wherein the first zone is maintained at a moderate temperature and the second zone is maintained at a reduced temperature.

28. A warehouse system as claimed in claim 27, wherein non-perishable goods are stored in a plurality of storage cells in the first zone and perishable goods are stored in a plurality of storage cells in the second zone.

29. A warehouse system as claimed in claim 26, wherein the first zone is maintained at a moderate temperature and the second zone is maintained at a temperature at or below freezing temperature.

30. A warehouse system as claimed in claim 29, wherein non-perishable goods are stored in a plurality of storage cells in the first zone and frozen goods are stored in a plurality of storage cells in the second zone.

31. A warehouse system for fulfilling orders comprising a plurality of products, comprising:
a plurality of storage cells defined by a frame, each storage cell for receiving palletized products, the palletized products packed in cases each comprising a plurality of units, said cases arranged on a pallet in a shipping configuration;
a transport system operable to sequentially advance a product container to a plurality of said storage cells corresponding to a plurality of products in an order, for collecting at least a portion of said order in said product container;
a plurality of robotic pickers at said storage cells, each operable for engaging individual units of a product, to transfer said individual units from said pallets to said product container;
wherein a robot picker of said plurality of robotic pickers is mounted on said frame at a respective storage cell of said plurality of storage cells, and each said robotic picker is dedicated to each said respective storage cell, and each said robotic picker at said respective storage cell has an operating envelope that provides for engagement by each said robotic picker of all said individual units of said product on said pallet in its respective storage cell and for releasing products into said product container;

wherein at least some robotic pickers of said plurality of robotic pickers comprise a picker arm having a first end region mounted above said pallets in each said storage cell, and said arm has an opposite end region to which is mounted an end effector; and wherein at least some robotic pickers of said plurality of robotic pickers are under the control of a guidance system.

32. A warehouse system as claimed in claim 31, wherein said guidance system comprises at least one camera mounted proximate to each picker arm, said at least one camera operable to capture overhead images of said pallets.

33. A warehouse system as claimed in claim 32, wherein said guidance system further comprises at least one camera positioned laterally of each respective storage cell and operable to capture side images of said pallets.

34. A warehouse system as claimed in claim 33, further comprising an image processor operable to process said side images and overhead images to detect locations of said individual items on said pallets.

* * * * *